United States Patent
Shimomura

[11] Patent Number: 6,028,961
[45] Date of Patent: Feb. 22, 2000

[54] IMAGE PROCESSING METHOD AND APPARATUS

[75] Inventor: Yukari Shimomura, Yokohama, Japan

[73] Assignee: Canon Kabushiki Kaisha, Tokyo, Japan

[21] Appl. No.: 08/521,466

[22] Filed: Aug. 30, 1995

Related U.S. Application Data

[63] Continuation of application No. 08/098,870, Jul. 29, 1993, abandoned.

[30] Foreign Application Priority Data

Jul. 31, 1992 [JP] Japan .................................. 4-204940
Jul. 31, 1992 [JP] Japan .................................. 4-205249

[51] Int. Cl.[7] ............................................... G06K 9/36
[52] U.S. Cl. ........................................ 382/239; 348/419
[58] Field of Search .................................. 358/426, 427, 358/261.2, 433; 348/384, 404, 419; 382/234, 239, 240, 244, 245, 246, 248, 251

[56] References Cited

U.S. PATENT DOCUMENTS 3,215,773  11/1965  Chatten et al. ........................... 178/6.8
3,483,317  12/1969  Groat ......................................... 178/6

(List continued on next page.)

FOREIGN PATENT DOCUMENTS

| 469852 | 2/1992 | European Pat. Off. | ........ G06F 15/64 |
| 0487282 | 5/1992 | European Pat. Off. | ........ G06F 15/64 |
| 487282 | 5/1992 | European Pat. Off. | ........ G06F 15/64 |
| 0510933 | 10/1992 | European Pat. Off. | ......... H04N 1/41 |
| 075773 | 4/1987 | Japan | .............................. G06F 15/62 |
| 62-075773 | 4/1987 | Japan | .............................. G06F 15/62 |
| 2122763 | 5/1990 | Japan | .............................. H04N 1/383 |
| 276263 | 12/1991 | Japan | .............................. G06F 15/62 |
| 3-276263 | 12/1991 | Japan | .............................. G06F 15/62 |
| 2102240 | 1/1983 | United Kingdom | ............. H04N 1/28 |
| 2259824 | 3/1993 | United Kingdom | ............. H04N 7/13 |

OTHER PUBLICATIONS

ICASSP–89:1989 International Conference On Acoustics, Speech and Signal Processing (IEEE CAT.NO. 89 CH2673–2), Glasgow, UK, May 23–26, 1989, 1671–1674, vol. 3, Saito, T. et al. "Self–Organizing Pattern–Matching Coding for Picture Signals".

Proceedings of the I.R.E., vol. 40, No. 9, Sep. 1952, pp. 1098–1101, Huffman, D.A. "A Method For The Construction of Minimum–Redundancy Codes".

"Self–Organizing Pattern–Matching Coding For Picture Signals", Saito, T. et al., ICASSP–89: 1989 International Conference On Accoustics, Speech and Signal Processing (IEEE Cat.No.89CH2673–2), Glasgow, U.K., 23–26 May 89, 1671–67 vol. 3.

(List continued on next page.)

*Primary Examiner*—Christopher S. Kelly
*Attorney, Agent, or Firm*—Fitzpatrick, Cella, Harper & Scinto

[57] ABSTRACT

When image data is compressed in units of blocks, if a compressed data amount D obtained by reversibly compressing a block, and a predetermined value L satisfy $D \leq L$, the block is reversibly compressed; if they satisfy $D > L$, the block is irreversibly compressed, so that computer-created image data is compressed while preventing deterioration of image quality, and a gradation image or a natural image is efficiently compressed. When a pixel of interest has the same value as color data ($C_1$) of the immediately preceding pixel, the shortest code '1' is output; when the pixel of interest has the same value as color data ($C_2$) of a pixel, which has color data different from $C_1$, and appears latest, the second shortest code '01' is output; when the pixel of interest has the same value as color data ($C_3$) of a pixel, which has color data different from $C_1$ and $C_2$, and appears latest, the third shortest code '001' is output; when the pixel of interest has color data different from $C_1$, $C_2$, and $C_3$, an unused code '000' is output, and the color data at that time is output. Thus, a computer-created image is compressed at a high compression ratio without causing deterioration of image quality.

9 Claims, 58 Drawing Sheets

U.S. PATENT DOCUMENTS

| | | | |
|---|---|---|---|
| 3,992,572 | 11/1976 | Nakogome et al. | 178/6 |
| 4,225,885 | 9/1980 | Lux et al. | 340/146.3 |
| 4,394,774 | 7/1983 | Widergren et al. | 382/56 |
| 4,546,385 | 10/1985 | Anastassiou | 358/426 |
| 4,586,082 | 4/1986 | Wilkinson | 358/160 |
| 4,772,956 | 9/1988 | Roche et al. | 358/260 |
| 4,920,426 | 4/1990 | Hatori et al. | 358/433 |
| 4,965,754 | 10/1990 | Stansfield et al. | 382/239 |
| 4,969,040 | 11/1990 | Gharavi | 358/136 |
| 4,987,480 | 1/1991 | Lippman et al. | 358/13 |
| 5,034,990 | 7/1991 | Klees | 382/22 |
| 5,038,390 | 8/1991 | Ravi Chandra | 382/248 |
| 5,040,233 | 8/1991 | Davy et al. | 358/433 |
| 5,047,852 | 9/1991 | Hanyu et al. | 358/133 |
| 5,063,608 | 11/1991 | Siegel | 382/56 |
| 5,073,820 | 12/1991 | Nakagawa et al. | 358/133 |
| 5,073,821 | 12/1991 | Juri | 358/133 |
| 5,086,439 | 2/1992 | Asai et al. | 375/122 |
| 5,086,488 | 2/1992 | Kato et al. | 382/56 |
| 5,101,280 | 3/1992 | Moronaga et al. | 358/426 |
| 5,109,451 | 4/1992 | Aono et al. | 382/56 |
| 5,148,271 | 9/1992 | Kato et al. | 358/133 |
| 5,148,498 | 9/1992 | Resnikoff et al. | 382/248 |
| 5,162,923 | 11/1992 | Yoshida et al. | 358/433 |
| 5,204,756 | 4/1993 | Chevion et al. | 358/426 |
| 5,216,518 | 6/1993 | Yamagami | 358/426 |
| 5,243,420 | 9/1993 | Hibi | 358/136 |
| 5,249,053 | 9/1993 | Jain | 358/209 |
| 5,249,066 | 9/1993 | Fukada et al. | 358/433 |
| 5,253,075 | 10/1993 | Sugiyama | 358/261.2 |
| 5,267,333 | 11/1993 | Aono et al. | 382/284 |
| 5,295,203 | 3/1994 | Krause et al. | 382/248 |
| 5,301,040 | 4/1994 | Hoshi et al. | 358/465 |
| 5,307,163 | 4/1994 | Hatano et al. | 348/415 |
| 5,309,525 | 5/1994 | Shimomura et al. | 382/50 |
| 5,325,448 | 6/1994 | Katayama et al. | 382/50 |
| 5,339,164 | 8/1994 | Lim | 358/261.1 |
| 5,367,629 | 11/1994 | Chu et al. | 395/162 |
| 5,379,070 | 1/1995 | Retter et al. | 348/403 |
| 5,416,603 | 5/1995 | Suzuki et al. | 358/433 |
| 5,517,327 | 5/1996 | Nakatani | 358/462 |
| 5,588,075 | 12/1996 | Chiba et al. | 358/433 |

OTHER PUBLICATIONS

"A Method For The Construction Of Minimum–Redundancy Codes", Huffman,D.A., Proceedings OF The I.R.E., vol. 40, No. 9, Sep. 1952, pp. 1098–1101.

"A Single Chim Compression/Decompression LSI Based On JPEG", K. Ogawa, et al., International Conference On Consumer Electronics, Digest of Technical Papers, ICCE, 2–4 Jun. 92, Rosemont, Illinois, US, IEEE, 1992, pp. 386–387.

FIG. 9

| 0 | 15 | 16 |  |  |  | • | 63 |
|---|----|----|---|---|---|---|----|
| 1 | 14 | 17 |  |  |  | • | 62 |
| 2 | 13 | •  |  |  |  | • | 61 |
| 3 | 12 | •  |  |  |  | • | 60 |
| 4 | 11 | •  |  |  |  | 52 | 59 |
| 5 | 10 | •  |  |  |  | 53 | 58 |
| 6 | 9  | •  |  |  |  | 54 | 57 |
| 7 | 8  | •  |  |  |  | 55 | 56 |

| 3401a | | | | | | | | 3401b | | | | | | | |
|---|---|---|---|---|---|---|---|---|---|---|---|---|---|---|---|
| 61 | 61 | 61 | 209 | 209 | 209 | 209 | 61 | 61 | 209 | 209 | 209 | 209 | 209 | 61 | 61 |
| 209 | 61 | 61 | 61 | 209 | 209 | 209 | 61 | 61 | 209 | 209 | 209 | 209 | 209 | 209 | 61 |
| 209 | 209 | 209 | 61 | 61 | 209 | 209 | 61 | 61 | 209 | 209 | 209 | 209 | 209 | 209 | 209 |
| 209 | 61 | 61 | 209 | 209 | 209 | 209 | 61 | 209 | 209 | 209 | 209 | 209 | 209 | 209 | 209 |
| 61 | 61 | 61 | 61 | 209 | 209 | 209 | 209 | 209 | 209 | 209 | 209 | 209 | 209 | 209 | 209 |
| 61 | 61 | 61 | 61 | 61 | 61 | 61 | 61 | 209 | 209 | 209 | 209 | 209 | 209 | 209 | 209 |
| 209 | 61 | 61 | 61 | 61 | 61 | 61 | 61 | 61 | 61 | 209 | 209 | 209 | 209 | 209 | 209 |
| 209 | 61 | 61 | 209 | 209 | 61 | 61 | 61 | 61 | 61 | 61 | 61 | 61 | 209 | 209 | 209 |
| 209 | 61 | 61 | 209 | 209 | 209 | 209 | 209 | 61 | 61 | 61 | 61 | 61 | 61 | 209 | 209 |
| 209 | 61 | 61 | 209 | 209 | 209 | 209 | 209 | 209 | 61 | 61 | 61 | 61 | 61 | 61 | 61 |
| 61 | 61 | 61 | 209 | 209 | 209 | 209 | 61 | 61 | 61 | 61 | 61 | 61 | 61 | 61 | 61 |
| 61 | 61 | 61 | 61 | 61 | 209 | 209 | 61 | 61 | 61 | 61 | 209 | 209 | 209 | 209 | 61 |
| 61 | 61 | 61 | 61 | 61 | 61 | 61 | 61 | 61 | 61 | 61 | 209 | 209 | 209 | 209 | 209 |
| 209 | 209 | 61 | 61 | 61 | 61 | 61 | 61 | 209 | 209 | 209 | 209 | 209 | 209 | 209 | 209 |
| 209 | 209 | 209 | 209 | 209 | 61 | 61 | 61 | 61 | 61 | 209 | 209 | 209 | 209 | 209 | 209 |
| 209 | 209 | 209 | 209 | 209 | 209 | 209 | 209 | 61 | 61 | 61 | 209 | 209 | 209 | 209 | 209 |

3401, 3401c, 3401d

| 114 | * | 121 | * | 128 | * | 121 | * | 121 | * | 128 | * | 128 | * | 114 | * |
| 121 | * | 114 | * | 128 | * | 121 | * | 121 | * | 128 | * | 128 | * | 121 | * |
| 128 | * | 121 | * | 121 | * | 121 | * | 121 | * | 128 | * | 128 | * | 128 | * |
| 121 | * | 121 | * | 128 | * | 121 | * | 128 | * | 128 | * | 128 | * | 128 | * |
| 114 | * | 114 | * | 128 | * | 128 | * | 128 | * | 128 | * | 128 | * | 128 | * |
| 114 | * | 114 | * | 114 | * | 114 | * | 128 | * | 128 | * | 128 | * | 128 | * |
| 114 | * | 114 | * | 114 | * | 114 | * | 114 | * | 128 | * | 128 | * | 128 | * |
| 121 | * | 121 | * | 114 | * | 114 | * | 114 | * | 128 | * | 121 | * | 128 | * |
| 121 | * | 121 | * | 128 | * | 128 | * | 114 | * | 114 | * | 114 | * | 128 | * |
| 121 | * | 121 | * | 128 | * | 128 | * | 121 | * | 114 | * | 114 | * | 128 | * |
| 114 | * | 121 | * | 128 | * | 121 | * | 114 | * | 114 | * | 114 | * | 114 | * |
| 114 | * | 114 | * | 121 | * | 121 | * | 114 | * | 121 | * | 128 | * | 121 | * |
| 114 | * | 114 | * | 114 | * | 114 | * | 121 | * | 128 | * | 128 | * | 128 | * |
| 128 | * | 114 | * | 114 | * | 114 | * | 128 | * | 128 | * | 128 | * | 128 | * |
| 128 | * | 128 | * | 121 | * | 114 | * | 114 | * | 128 | * | 128 | * | 128 | * |
| 128 | * | 128 | * | 128 | * | 128 | * | 114 | * | 121 | * | 128 | * | 128 | * |

3402, 3402a, 3402b

| 214 | * | 171 | * | 128 | * | 171 | * | 171 | * | 128 | * | 128 | * | 214 | * |
| 171 | * | 214 | * | 128 | * | 171 | * | 171 | * | 128 | * | 128 | * | 171 | * |
| 128 | * | 171 | * | 171 | * | 171 | * | 171 | * | 128 | * | 128 | * | 128 | * |
| 171 | * | 171 | * | 128 | * | 171 | * | 128 | * | 128 | * | 128 | * | 128 | * |
| 214 | * | 214 | * | 128 | * | 128 | * | 128 | * | 128 | * | 128 | * | 128 | * |
| 214 | * | 214 | * | 214 | * | 214 | * | 128 | * | 128 | * | 128 | * | 128 | * |
| 171 | * | 214 | * | 214 | * | 214 | * | 214 | * | 128 | * | 128 | * | 128 | * |
| 171 | * | 171 | * | 171 | * | 214 | * | 214 | * | 214 | * | 171 | * | 128 | * |
| 171 | * | 171 | * | 128 | * | 128 | * | 214 | * | 214 | * | 214 | * | 128 | * |
| 171 | * | 171 | * | 128 | * | 128 | * | 171 | * | 214 | * | 214 | * | 214 | * |
| 214 | * | 171 | * | 128 | * | 171 | * | 214 | * | 214 | * | 214 | * | 214 | * |
| 214 | * | 214 | * | 171 | * | 171 | * | 214 | * | 171 | * | 128 | * | 171 | * |
| 214 | * | 214 | * | 214 | * | 214 | * | 171 | * | 128 | * | 128 | * | 128 | * |
| 128 | * | 214 | * | 214 | * | 214 | * | 128 | * | 128 | * | 128 | * | 128 | * |
| 128 | * | 128 | * | 171 | * | 214 | * | 214 | * | 128 | * | 128 | * | 128 | * |
| 128 | * | 128 | * | 128 | * | 128 | * | 214 | * | 171 | * | 128 | * | 128 | * |

| | | | | | | | |
|---|---|---|---|---|---|---|---|
| -55.0 | -52.7 | -48.3 | 239.1 | 37.0 | 95.9 | -20.0 | 42.9 |
| 168.7 | -98.9 | -49.6 | 90.9 | -137.2 | 32.4 | -20.6 | 4.3 |
| -48.3 | 79.1 | -63.2 | 5.5 | 88.4 | 27.8 | -26.2 | -4.7 |
| -136.4 | -141.3 | -36.3 | -54.8 | 2.3 | -52.7 | -15.0 | -14.5 |
| 111.0 | -123.9 | -145.0 | 18.0 | 111.0 | 12.0 | -60.1 | -24.6 |
| -15.2 | 82.2 | -7.2 | -15.7 | -11.5 | 70.2 | -3.0 | -52.0 |
| -20.0 | 56.8 | -26.2 | -100.4 | -76.7 | -8.9 | -10.8 | -38.0 |
| 44.6 | -32.7 | 74.3 | -47.7 | -91.7 | -50.8 | 30.8 | 9.5 |

⎯ 3501a

| | | | | | | | |
|---|---|---|---|---|---|---|---|
| 407.5 | -113.3 | -140.9 | -34.5 | -92.5 | -23.0 | -1.7 | -22.5 |
| 36.8 | 151.7 | -150.1 | -17.1 | -58.0 | -68.4 | -56.2 | -18.2 |
| -233.4 | -64.3 | -76.2 | 7.9 | -58.4 | -11.8 | 20.7 | -27.2 |
| 69.2 | 120.9 | -59.6 | 9.0 | 35.9 | -14.0 | 16.4 | 7.1 |
| -55.5 | 32.9 | 72.5 | 42.3 | 18.5 | -16.2 | 30.0 | -31.2 |
| 24.0 | -7.1 | -51.9 | -40.2 | 46.2 | -13.5 | 40.0 | 9.9 |
| -7.6 | 6.7 | 57.7 | -4.6 | 4.1 | -44.2 | 2.2 | -33.5 |
| -11.5 | -44.3 | -40.1 | -42.6 | 7.3 | -17.1 | 13.5 | 0.8 |

⎯ 3501b

⎯ 3501

| | | | | | | | |
|---|---|---|---|---|---|---|---|
| 74.5 | -35.8 | -38.3 | 130.7 | 55.5 | 65.1 | -44.2 | -26.0 |
| 9.7 | -241.6 | -36.4 | 109.0 | 62.9 | 90.3 | 7.2 | -33.2 |
| 340.1 | 7.9 | -5.4 | -13.9 | 126.7 | 2.8 | 13.1 | 11.8 |
| -129.0 | 129.0 | 107.8 | -18.5 | 67.5 | -43.3 | 5.4 | -0.5 |
| -18.5 | -109.4 | 38.3 | -7.6 | -55.5 | 17.1 | 44.2 | -2.9 |
| -1.0 | 42.0 | -56.3 | 9.1 | -40.1 | 12.2 | -15.5 | 13.6 |
| -0.7 | -19.0 | 13.1 | 33.5 | -32.5 | -6.7 | -31.6 | -28.4 |
| -32.6 | 19.1 | -116.0 | -48.8 | 47.0 | -6.5 | -14.8 | 26.0 |

⎯ 3501c

| | | | | | | | |
|---|---|---|---|---|---|---|---|
| 74.5 | -193.1 | -72.5 | 6.5 | 18.5 | 48.8 | -30.0 | -0.7 |
| -317.3 | 103.2 | 142.9 | 24.1 | 1.2 | 20.8 | -13.4 | 24.5 |
| -106.7 | -73.7 | 102.4 | -19.0 | 58.4 | 28.4 | 20.7 | 20.2 |
| 209.1 | 5.3 | 71.5 | -82.0 | -41.4 | -22.5 | 4.1 | 28.4 |
| 55.5 | -149.6 | -52.5 | -3.7 | -18.5 | -2.5 | -78.4 | -29.7 |
| -21.4 | -102.4 | -63.5 | -11.7 | -18.4 | 40.5 | -9.3 | 20.6 |
| -15.9 | 2.8 | 57.7 | -15.7 | -4.1 | -27.5 | -28.4 | -13.9 |
| -39.7 | -38.7 | 3.8 | -110.1 | -45.3 | -49.9 | 16.0 | 12.3 |

⎯ 3501d

| | | | | | | | |
|---|---|---|---|---|---|---|---|
| -44.6 | -23.3 | 2.2 | 2.4 | -7.9 | 4.5 | 7.6 | 5.4 |
| 9.7 | 6.5 | -11.8 | 1.6 | -7.3 | 5.2 | 1.6 | 1.5 |
| -12.9 | 7.8 | 6.4 | -1.1 | -6.0 | 2.6 | -1.1 | -1.7 |
| -3.2 | -9.3 | -12.0 | 3.2 | -4.2 | -0.6 | -1.5 | 0.9 |
| 2.6 | 6.2 | -7.3 | -9.7 | -2.6 | -1.9 | -1.7 | 2.7 |
| 0.4 | -0.4 | 4.7 | 5.4 | -3.3 | -1.5 | -1.2 | -2.8 |
| -1.3 | 1.2 | 2.4 | 1.5 | 1.5 | -5.4 | -4.7 | 0.0 |
| 1.6 | 0.5 | 0.5 | -1.2 | 0.7 | 4.6 | 0.7 | -4.8 |

⎯ 3502a

⎯ 3502

| | | | | | | | |
|---|---|---|---|---|---|---|---|
| -54.2 | -4.4 | 7.5 | -7.5 | -3.5 | 6.2 | 4.5 | -1.5 |
| -14.6 | 12.0 | -15.5 | -14.4 | 4.8 | 0.4 | 1.5 | 0.5 |
| 11.0 | 18.0 | 3.9 | -11.5 | 3.6 | 1.1 | 0.9 | -4.9 |
| 3.8 | -12.2 | 6.0 | 10.8 | 7.7 | -5.4 | 3.0 | 2.0 |
| 1.7 | -8.2 | 1.6 | -7.2 | -0.0 | 4.3 | -0.7 | -4.0 |
| -1.1 | -0.5 | 6.8 | -2.4 | -4.8 | 0.9 | 1.6 | -2.5 |
| -0.8 | 0.7 | -0.9 | -1.6 | 4.2 | -0.4 | 1.4 | 1.9 |
| -3.4 | 0.0 | 2.6 | -3.0 | -4.9 | -5.4 | 1.3 | -2.8 |

⎯ 3502b

| | | | | | | | |
|---|---|---|---|---|---|---|---|
| 274.1 | 143.1 | -13.5 | -14.6 | 48.4 | -27.6 | -46.7 | -33.2 |
| -59.7 | -40.1 | 72.7 | -9.8 | 45.1 | -31.8 | -9.8 | -9.3 |
| 79.0 | -48.0 | -39.6 | 7.0 | 36.8 | -15.7 | 6.9 | 10.2 |
| 19.5 | 57.1 | 73.5 | -19.8 | 25.9 | 3.5 | 9.2 | -5.3 |
| -16.1 | -38.3 | 45.0 | 59.7 | 16.1 | 11.4 | 10.4 | -16.3 |
| -2.6 | 2.2 | -28.9 | -33.2 | 20.0 | 9.0 | 7.6 | 17.2 |
| 8.8 | -7.1 | -14.6 | -9.5 | -9.4 | 33.0 | 28.8 | -0.2 |
| -9.6 | -3.0 | -2.8 | 7.2 | -4.3 | -28.2 | -4.2 | 29.4 |

⎯ 3503a

⎯ 3503

| | | | | | | | |
|---|---|---|---|---|---|---|---|
| 333.2 | 26.9 | -46.3 | 46.3 | 21.5 | -37.9 | -27.4 | 9.0 |
| 89.4 | -74.0 | 95.0 | 88.3 | -29.3 | -2.2 | -9.3 | -3.3 |
| -67.8 | -110.9 | -23.7 | 70.7 | -22.3 | -6.9 | -5.4 | 29.8 |
| -23.3 | 74.8 | -36.9 | -66.6 | -47.1 | 33.2 | -18.7 | -12.5 |
| -10.8 | 50.3 | -9.9 | 44.0 | 0.0 | -26.5 | 4.1 | 24.6 |
| 6.5 | 3.0 | -41.5 | 14.8 | 29.4 | -5.5 | -9.6 | 15.3 |
| 4.8 | -4.2 | 5.4 | 10.1 | -25.7 | 2.4 | -8.5 | -11.5 |
| 21.0 | -0.1 | -15.7 | 18.7 | 30.3 | 33.3 | -7.8 | 17.1 |

| 32  | 22  | 20  | 32  | 48  | 80  | 102 | 122 |
|-----|-----|-----|-----|-----|-----|-----|-----|
| 24  | 24  | 28  | 38  | 52  | 116 | 120 | 110 |
| 28  | 26  | 32  | 48  | 80  | 114 | 138 | 112 |
| 28  | 34  | 44  | 58  | 102 | 174 | 160 | 124 |
| 36  | 44  | 74  | 116 | 136 | 218 | 206 | 154 |
| 48  | 70  | 110 | 128 | 162 | 208 | 226 | 184 |
| 98  | 128 | 156 | 174 | 206 | 242 | 240 | 202 |
| 144 | 184 | 190 | 196 | 224 | 200 | 206 | 198 |

4002

| 34  | 36  | 48  | 94  | 132 | 198 | 198 | 198 |
|-----|-----|-----|-----|-----|-----|-----|-----|
| 36  | 42  | 52  | 132 | 198 | 198 | 198 | 198 |
| 48  | 52  | 112 | 198 | 198 | 198 | 198 | 198 |
| 94  | 132 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |

FIG. 20
(PRIOR ART)

| | | | | | | | | |
|---|---|---|---|---|---|---|---|---|
| -2 | -2 | -2 | 7 | 1 | 1 | 0 | 0 | |
| 7 | -4 | -2 | 2 | -3 | 0 | 0 | 0 | |
| -2 | 3 | -2 | 0 | 1 | 0 | 0 | 0 | |
| -5 | -4 | -1 | -1 | 0 | 0 | 0 | 0 | |
| 3 | -3 | -2 | 0 | 1 | 0 | 0 | 0 | |
| 0 | 1 | 0 | 0 | 0 | 0 | 0 | 0 | — 3601a |
| 0 | 0 | 0 | -1 | 0 | 0 | 0 | 0 | |
| 0 | 0 | 0 | 0 | 0 | 0 | 0 | 0 | |
| 13 | -5 | -7 | -1 | -2 | 0 | 0 | 0 | |
| 2 | 6 | -5 | 0 | -1 | -1 | 0 | 0 | |
| -8 | -2 | -2 | 0 | -1 | 0 | 0 | 0 | |
| 2 | 4 | -1 | 0 | 0 | 0 | 0 | 0 | — 3601b |
| -2 | 1 | 1 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | — 3601 |
| 0 | 0 | 0 | 0 | 0 | 0 | 0 | 0 | |
| 2 | -2 | -2 | 4 | 1 | 1 | 0 | 0 | |
| 0 | -10 | -1 | 3 | 1 | 1 | 0 | 0 | |
| 12 | 0 | 0 | 0 | 2 | 0 | 0 | 0 | |
| -5 | 4 | 2 | 0 | 1 | 0 | 0 | 0 | — 3601c |
| -1 | -2 | 1 | 0 | 0 | 0 | 0 | 0 | |
| 0 | 1 | -1 | 0 | 0 | 0 | 0 | 0 | |
| 0 | 0 | 0 | 0 | 0 | 0 | 0 | 0 | |
| 0 | 0 | -1 | 0 | 0 | 0 | 0 | 0 | |
| 2 | -9 | -4 | 0 | 0 | 1 | 0 | 0 | |
| -13 | 4 | 5 | 1 | 0 | 0 | 0 | 0 | |
| -4 | -3 | 3 | 0 | 1 | 0 | 0 | 0 | |
| 7 | 0 | 2 | -1 | 0 | 0 | 0 | 0 | — 3601d |
| 2 | -3 | -1 | 0 | 0 | 0 | 0 | 0 | |
| 0 | -1 | -1 | 0 | 0 | 0 | 0 | 0 | |
| 0 | 0 | 0 | 0 | 0 | 0 | 0 | 0 | |
| 0 | 0 | 0 | -1 | 0 | 0 | 0 | 0 | |
| -1 | -1 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | — 3602a |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | — 3602 |
| -2 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | — 3602b |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 8 | 4 | 0 | 0 | 0 | 0 | 0 | 0 | |
| -2 | -1 | 1 | 0 | 0 | 0 | 0 | 0 | |
| 2 | -1 | 0 | 0 | 0 | 0 | 0 | 0 | |
| 0 | 0 | 0 | 0 | 0 | 0 | 0 | 0 | — 3603a |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | — 3603 |
| 0 | 0 | 0 | 0 | 0 | 0 | 0 | 0 | |
| 10 | 1 | -1 | 0 | 0 | 0 | 0 | 0 | |
| 2 | -2 | 2 | 1 | 0 | 0 | 0 | 0 | |
| -1 | -2 | 0 | 0 | 0 | 0 | 0 | 0 | |
| 0 | 0 | 0 | 0 | 0 | 0 | 0 | 0 | — 3603b |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |

| | | | | | | | | | | | | | | | |
|---|---|---|---|---|---|---|---|---|---|---|---|---|---|---|---|
| 55 | 31 | 94 | 192 | 223 | 208 | 162 | 98 | 71 | 220 | 234 | 169 | 194 | 190 | 96 | 34 |
| 189 | 123 | 62 | 56 | 145 | 255 | 201 | 25 | 62 | 194 | 227 | 201 | 238 | 235 | 160 | 115 |
| 204 | 201 | 169 | 98 | 89 | 175 | 186 | 87 | 102 | 163 | 209 | 208 | 242 | 244 | 208 | 199 |
| 197 | 108 | 88 | 151 | 211 | 239 | 196 | 108 | 186 | 202 | 202 | 197 | 205 | 206 | 208 | 224 |
| 87 | 12 | 32 | 130 | 187 | 200 | 187 | 150 | 228 | 216 | 221 | 221 | 201 | 194 | 204 | 207 |
| 51 | 57 | 81 | 71 | 25 | 43 | 101 | 117 | 182 | 180 | 223 | 244 | 214 | 216 | 224 | 191 |
| 222 | 83 | 20 | 58 | 82 | 75 | 46 | 0 | 98 | 103 | 154 | 187 | 162 | 206 | 241 | 189 |
| 206 | 50 | 65 | 210 | 194 | 60 | 36 | 106 | 43 | 41 | 90 | 96 | 76 | 165 | 240 | 192 |
| 238 | 19 | 47 | 227 | 230 | 178 | 195 | 193 | 81 | 37 | 56 | 91 | 78 | 95 | 164 | 208 |
| 205 | 55 | 64 | 161 | 174 | 213 | 255 | 215 | 185 | 78 | 14 | 11 | 23 | 63 | 91 | 71 |
| 35 | 42 | 131 | 201 | 215 | 255 | 208 | 47 | 44 | 64 | 109 | 106 | 56 | 55 | 74 | 52 |
| 73 | 67 | 67 | 40 | 54 | 158 | 183 | 81 | 55 | 50 | 94 | 162 | 222 | 255 | 184 | 42 |
| 59 | 55 | 57 | 51 | 59 | 95 | 91 | 35 | 90 | 170 | 255 | 238 | 162 | 172 | 226 | 231 |
| 222 | 165 | 99 | 63 | 46 | 34 | 45 | 73 | 203 | 174 | 180 | 194 | 199 | 232 | 233 | 180 |
| 186 | 199 | 214 | 238 | 221 | 126 | 44 | 39 | 58 | 97 | 192 | 240 | 196 | 175 | 203 | 216 |
| 218 | 219 | 193 | 188 | 207 | 190 | 193 | 248 | 56 | 31 | 96 | 192 | 217 | 215 | 214 | 195 |

— 3801

| | | | | | | | | | | | | | | | |
|---|---|---|---|---|---|---|---|---|---|---|---|---|---|---|---|
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |

— 3802

| | | | | | | | | | | | | | | | |
|---|---|---|---|---|---|---|---|---|---|---|---|---|---|---|---|
| 180 | * | 173 | * | 152 | * | 154 | * | 153 | * | 159 | * | 167 | * | 174 | * |
| 179 | * | 172 | * | 160 | * | 150 | * | 146 | * | 147 | * | 152 | * | 156 | * |
| 179 | * | 172 | * | 159 | * | 147 | * | 137 | * | 132 | * | 131 | * | 131 | * |
| 181 | * | 174 | * | 163 | * | 148 | * | 135 | * | 123 | * | 115 | * | 111 | * |
| 185 | * | 181 | * | 172 | * | 159 | * | 143 | * | 128 | * | 115 | * | 108 | * |
| 191 | * | 190 | * | 185 | * | 176 | * | 162 | * | 145 | * | 130 | * | 120 | * |
| 198 | * | 199 | * | 199 | * | 195 | * | 183 | * | 157 | * | 151 | * | 140 | * |
| 202 | * | 205 | * | 208 | * | 207 | * | 197 | * | 182 | * | 166 | * | 155 | * |
| 207 | * | 166 | * | 131 | * | 139 | * | 180 | * | 206 | * | 197 | * | 175 | * |
| 186 | * | 155 | * | 131 | * | 145 | * | 185 | * | 215 | * | 211 | * | 194 | * |
| 174 | * | 156 | * | 145 | * | 160 | * | 191 | * | 212 | * | 210 | * | 198 | * |
| 191 | * | 185 | * | 180 | * | 182 | * | 186 | * | 184 | * | 174 | * | 165 | * |
| 210 | * | 216 | * | 217 | * | 202 | * | 175 | * | 145 | * | 125 | * | 117 | * |
| 189 | * | 212 | * | 227 | * | 210 | * | 166 | * | 124 | * | 104 | * | 102 | * |
| 126 | * | 167 | * | 206 | * | 204 | * | 165 | * | 130 | * | 123 | * | 132 | * |
| 68 | * | 123 | * | 181 | * | 195 | * | 168 | * | 145 | * | 151 | * | 170 | * |

FIG.30A  X  AABBBBAAABBCCCCACACBBBDDDCCCCD 1301
1302  1303  1304

FIG.30B
C₁  WAABBBBAAABBCCCCACACBBBDDDCCCCD
C₂  KW→A————B  A→B  CACAC————B————D————C
C₃  RK→W————A————B————A————C————B

W : WHITE
K : BLACK
R : RED

768 BITS

FIG. 32

ENCODED DATA  1000A11000B1111111011111101111100011111100110110110111001

1111111000D1111111100111111111101 I

148 BITS

FIG. 34

| state (PRIORITY ORDER) ENCODE DATA | 0 (U1,U2,U3) | 1 (U1,U3,U2) | 2 (U2,U1,U3) | 3 (U3,U1,U2) | 4 (U2,U3,U1) | 5 (U3,U2,U1) | SHIFT COUNT |
|---|---|---|---|---|---|---|---|
| 1 * * | U1 | U1 | U2 | U3 | U2 | U3 | 1 |
|  | (H,H,H) | | | | | | |
| 0 1 * | U2 | U3 | U1 | U1 | U3 | U2 | 2 |
|  | (H,H,H) | | | | | | |
| 0 0 1 | U3 | U2 | U3 | U2 | U1 | U1 | 3 |
|  | 2 | 3 | 0 | 1 | 5 | 4 | |
|  | (H,H,H) | | | | | | |
| 0 0 0 | 3 | 2 | 5 | 4 | 0 | 1 | 27 |
|  | CONTINUOUS 24-BIT DATA AFTER '000' | | | | | | |
|  | (H,H,L) | (H,L,H) | (H,H,L) | (H,L,H) | (L,H,H) | (L,H,H) | |
|  | 3 | 2 | 5 | 4 | 0 | 1 | |

(L,H,H): FOURTH FF SECTION WRITE ENABLE
(H,L,H): FIFTH FF SECTION WRITE ENABLE
(H,H,L): SIXTH FF SECTION WRITE ENABLE

| OUTPUT DATA |
|---|
| WRITE ENABLE |
| NEXT STATE |

$U_1$: DATA HELD IN FOURTH FF SECTION
$U_2$: DATA HELD IN FIFTH FF SECTION
$U_3$: DATA HELD IN SIXTH FF SECTION

| 0 | 15 | 16 | 31 | 32 | 47 | 48 | 63 |
|---|---|---|---|---|---|---|---|
| 1 | 14 | 17 | 30 | 33 | 46 | 49 | 62 |
| 2 | 13 | 18 | 29 | 34 | 45 | 50 | 61 |
| 3 | 12 | 19 | 28 | 35 | 44 | 51 | 60 |
| 4 | 11 | 20 | 27 | 36 | 43 | 52 | 59 |
| 5 | 10 | 21 | 26 | 37 | 42 | 53 | 58 |
| 6 | 9 | 22 | 25 | 38 | 41 | 54 | 57 |
| 7 | 8 | 23 | 24 | 39 | 40 | 55 | 56 |

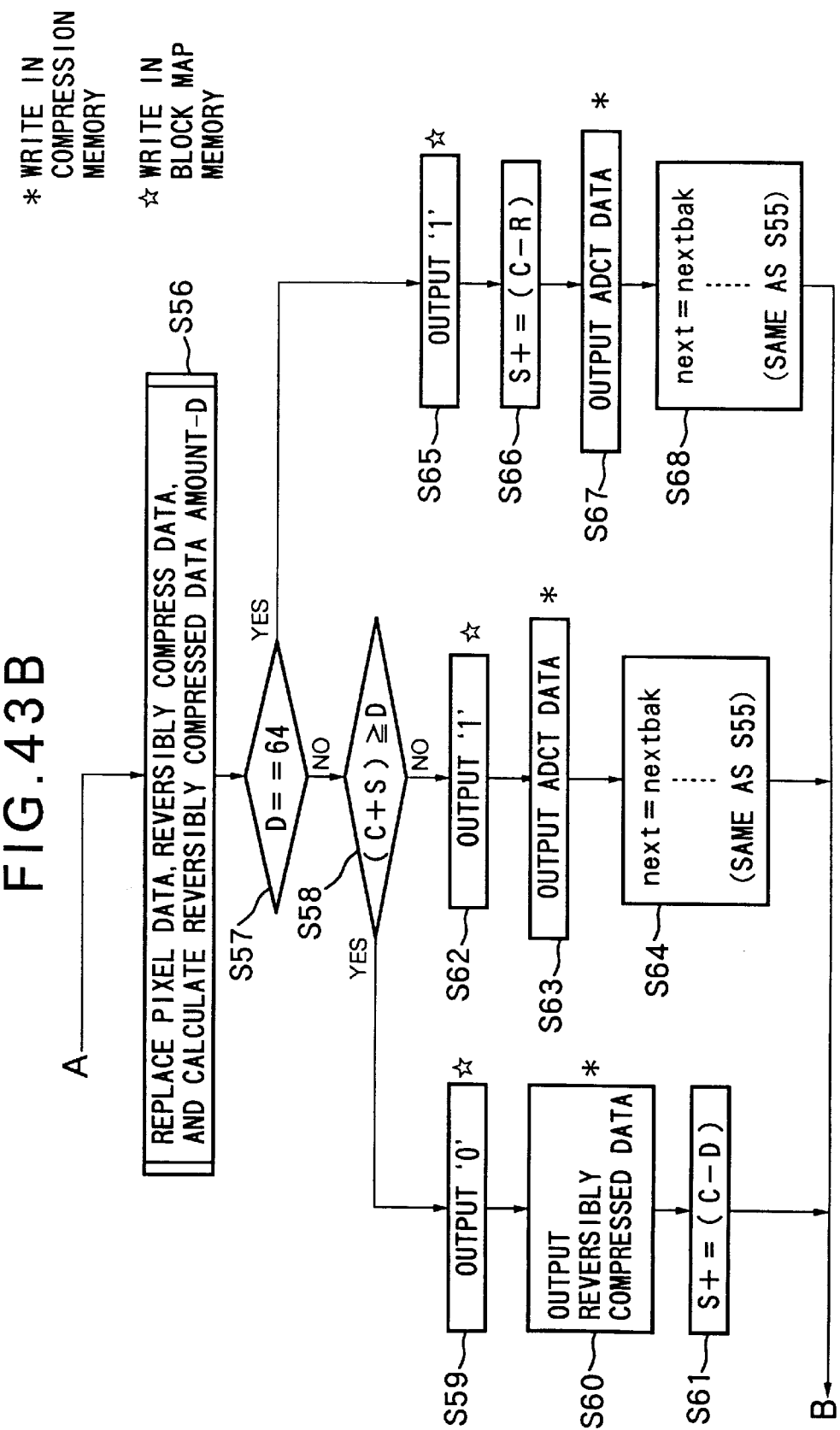

FIG.51

| | INDEX | ENCODED DATA | BIT SIZE | BIT SIZE SUM VALUE |
|---|---|---|---|---|
| DC COMPONENT → | 0 | 0x00001FF2 | 13 | — |
| | 1 | 0x0003FFA5 | 18 | 18 |
| | 2 | 0x0000007C | 7 | 25 |
| | 3 | 0x000035B3 | 14 | 39 |
| | 4 | 0x003FC59E | 22 | 22 |
| AC COMPONENT | 5 | 0x000001AC | 9 | 31 |
| | 6 | 0x000072EC | 15 | 46 |
| | • | • | • | • |
| | • | • | • | • |
| | • | • | • | • |
| | 18 | 0x0000001A | 5 | 95 |
| DC COMPONENT → | 0 | 0x000037E2 | 14 | — |
| AC COMPONENT | 1 | 0x003FA201 | 22 | 22 |
| | • | • | • | • |

DATA OF FIRST STAGE

RESET BIT SIZE SUM VALUE

FIG.52

| COLOR COMPONENT | NUMBER OF BITS |
|---|---|
| Y COMPONENT | 40 |
| u COMPONENT | 28 |
| v COMPONENT | 28 |

FIG.53

| |
|---|
| SEGMENT S−1 (100KB) |
| SEGMENT S−2 (100KB) |
| SEGMENT S−3 (100KB) |
| SEGMENT S−4 (100KB) |
| ⋮ |
| SEGMENT S−N (100KB) |

FIG.54

| No. | | 2 | 3 | 4 | 5 | 6 | 7 | 8 | 9 | 10 | 11 |
|---|---|---|---|---|---|---|---|---|---|---|---|
| STAGE 1 | 1 | S-1 | S-5 | S-8 | S-10 | S-14 | . | S-(N-1) | S-4 | S-15 | END |
| STAGE 2 | 1 | S-2 | S-6 | S-9 | S-13 | . | . | S-N | S-11 | END | END |
| STAGE 3 | 1 | S-3 | S-7 | S-12 | . | . | S-(N-2) | END | END | END | END |
| STAGE 4 | 0 | S-4 | S-11 | S-15 | . | . | | | | | |

(HEAD OF IMAGE) ← → (END OF IMAGE)

{ 1 : STAGE EFFECTIVE
  0 : STAGE INEFFECTIVE

FIG.56

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG.58

| | INDEX | ENCODED DATA | BIT SIZE |
|---|---|---|---|
| DC COMPONENT → | 0 | 0x00001FF2 | 13 |
| AC COMPONENT | 1 | 0x0003FFA5 | 18 |
| | 2 | 0x0000007C | 7 |
| | 3 | 0x000035B3 | 14 |
| | 4 | 0x003FC59E | 22 |
| | 5 | 0x000001AC | 9 |
| | 6 | 0x000072EC | 15 |
| | • | • | • |
| | • | • | • |
| | • | • | • |
| | 18 | 0x0000001A | 5 |
| DC COMPONENT → | 0 | 0x000037E2 | 14 |
| AC COMPONENT | 1 | 0x003FA201 | 22 |
| | • | • | • |

FIG.60

|  | FIRST STAGE | SECOND STAGE | THIRD STAGE |
|---|---|---|---|
| Y COMPONENT | 3 | 8 | 15 |
| u COMPONENT | 2 | 7 | 13 |
| v COMPONENT | 2 | 7 | 13 |

IMAGE PROCESSING METHOD AND APPARATUS

This application is a continuation of application Ser. No. 08/098,870 filed Jul. 29, 1993 now abandoned.

BACKGROUND OF THE INVENTION

1. Field of the Invention

The present invention relates to an image processing method and apparatus and, more particularly, to an image compression method and apparatus for compressing image data by switching a compression method between a reversible compression method and an irreversible compression method in accordance with the type of image, and a data expansion method and apparatus for expanding data including both reversibly compressed data and irreversibly compressed data.

2. Description of the Related Art

In recent years, with spread of, e.g., DTP, images to be created on computers are required to have high image quality, and tend to have a large number of colors and gradation levels.

The information amount of an image of this type is as large as about 46 Mbytes in the case of, e.g., an A4 size, 400 dpi, 256 gradation levels, and three primary colors. The information amount can be decreased if image data is processed as code information of, e.g., a page description language (to be abbreviated to as "PDL" hereinafter). In this case, however, development from code information to image data requires a long period of time, and original code data having a smaller information amount cannot be generated from developed image data. For this reason, the compression technique of image data is important.

As a general compression method of a color multi-value image, an ADCT (Adaptive Discrete Cosine Transform) method recommended by the JPEG (Joint Photographic Experts Group) is known. The ADCT image compression method will be described below.

FIG. 14 is a block diagram showing an arrangement of an ADCT image compression apparatus.

Referring to FIG. 14, reference numeral 3101 denotes a color conversion section for converting an RGB color space of the NTSC system into a YCrCb color space expressed by a luminance signal Y and two color difference signals Cr and Cb.

Reference numeral 3102 denotes a sub sampling section for decreasing color difference data by utilizing the characteristics that human eyes are sensitive to luminance but insensitive to color differences. More specifically, the section 3102 calculates an average value of two adjacent color difference data to decrease the color difference data amount to ½.

Reference numeral 3103 denotes a DCT section for dividing image data output from the sub sampling section 3102 into blocks each consisting of 8×8 pixels, which blocks form a matrix in the horizontal and vertical directions, and executing DCT (Discrete Cosine Transform) to convert the blocks into frequency space data.

Reference numeral 3104 denotes a quantization section for dividing 8×8=64 DCT coefficients respectively with quantization values having different step widths to convert them into quantization data.

Reference numeral 3105 denotes a Huffman encoding section for classifying 64 quantized DCT coefficients output from the quantization section 3104 into one DC coefficient and 64 AC coefficients, and encoding these coefficients in accordance with a Huffman table recommended by the JPEG. The encoded data are added with header information such as quantization table data, Huffman table data, and the like, and are then stored in a memory or transmitted to another apparatus.

FIG. 15 is a block diagram showing an arrangement of an ADCT data expansion apparatus.

Referring to FIG. 15, reference numeral 3205 denotes a Huffman decoding section for decoding input encoded data into quantized data.

Reference numeral 3204 denotes an inverse quantization section for converting quantized data output from the Huffman decoding section 3205 into DCT coefficient data. The inverse quantization is achieved by multiplying 64 coefficients with the corresponding quantization values using the quantization table used upon quantization in the quantization section 3104 in FIG. 14.

Reference numeral 3203 denotes an inverse DCT section for executing inverse DCT of DCT coefficient data output from the inverse quantization section 3204 to convert them into actual image data.

Reference numeral 3202 denotes an interpolation section for interpolating Cr and Cb data omitted from the image data output from the inverse DCT section 3203 by a simple repetition method. Note that omission of Cr and Cb data occurs when data is compressed by the sub sampling section 3102 in FIG. 14.

Reference numeral 3201 denotes a color conversion section for converting YCrCb color space data output from the interpolation section 3202 into NTSC-RGB color space data or color space data corresponding to the device.

The processing flow of the ADCT image compression apparatus will be described below by taking actual data as an example.

Figure 16:
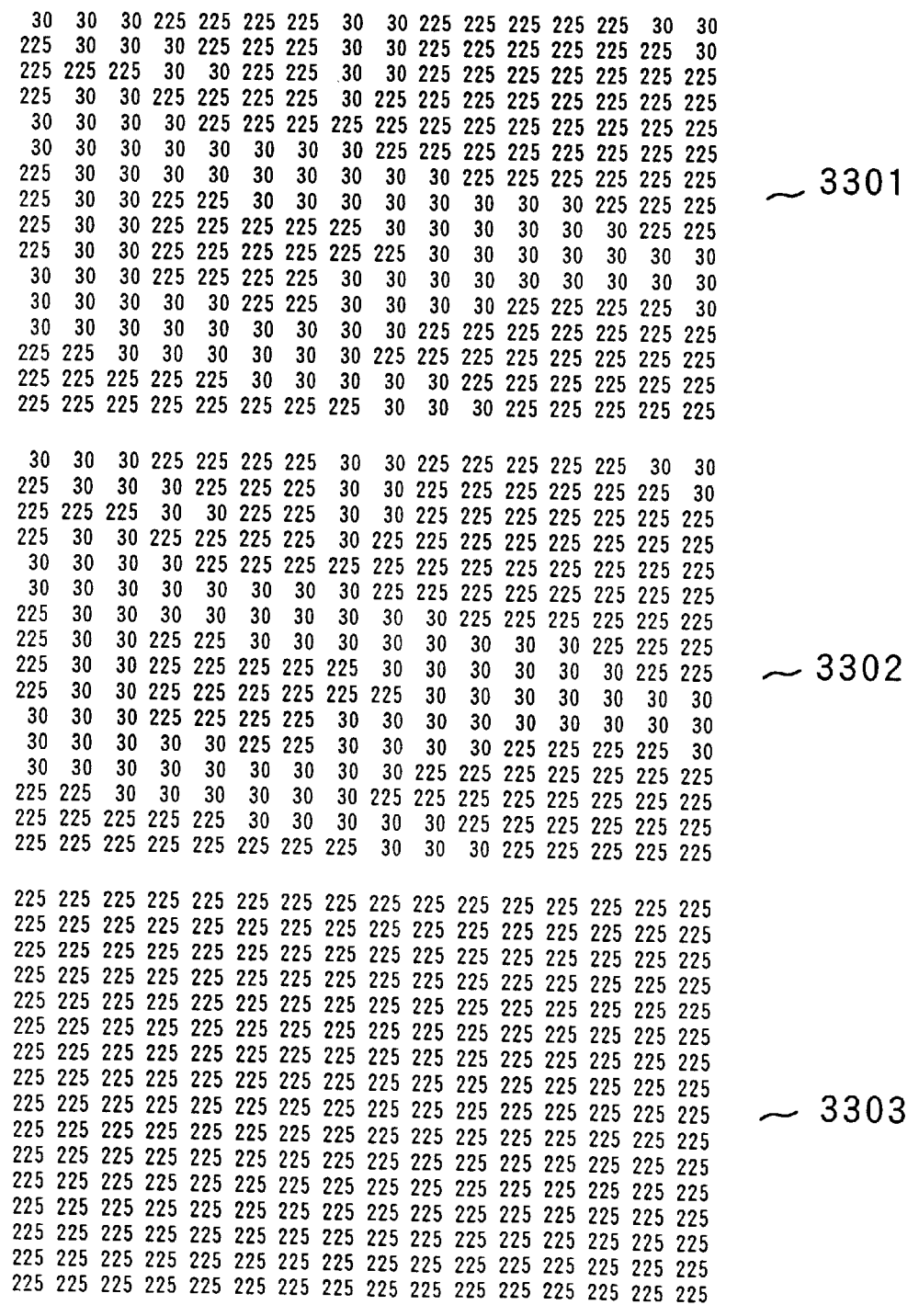

FIG. 16 shows NTSC-RGB color space data as a portion of color multi-value image data created by a computer, i.e., a portion (16×16 pixels) of image data in which a character portion of a color multi-value image is developed.

Referring to FIG. 16, reference numeral 3301 denotes R data; 3302, G data; and 3303, B data. Note that each pixel has a data range of 8 bits (0 to 255), and in FIG. 16, a portion of a character in blue expressed by (R, G, B)=(30, 30, 225) is drawn on a relatively dark white background expressed by (R, G, B)=(225, 225, 225).

The color conversion section 3101 executes conversion from an NTSC-RGB color space into a YCrCb color space using the following equations:

$Y = 0.299 \times R + 0.587 \times G + 0.114 \times B$ $Cr = 0.713(R-Y)$ $Cb = 0.564(B-Y)$ Furthermore, in order to allow overshoot and undershoot in calculations in the YCrCb color space according to the CCIR recommendation, the section 3101 rounds the data using the following equations:

$Y = 219.0 \times Y + 16.5$ $Cr = 224.0 \times Cr + 128.5$ $Cb = 224.0 \times Cb + 128.5$ The sub sampling section 3102 performs sub sampling of Cr and Cb data obtained by the above-mentioned equations.

As a sub sampling method, a simple thinning method, a MAX data selection method, a MIN data selection method, and the like are known. In this case, an average value method is used. More specifically, with the average value method, an average value of two adjacent pixel data is used as one data.

FIG. 17 shows the processing results of the image data shown in FIG. 16 by the color conversion section 3101 and the sub sampling section 3102. Referring to FIG. 17, reference numeral 3401 denotes Y data; 3402, Cr data; and 3403, Cb data. The data amounts of the Cr and Cb data are reduced to ½ by the sub sampling processing.

The Y, Cr, and Cb data shown in FIG. 17 are input to the DCT section 3103. The DCT section 3103 divides the input data into 8×8 data blocks forming a matrix in the horizontal and vertical directions. As a result of block division, the Y data 3401 is divided into four blocks 3401a to 3401d, as shown in FIG. 17. Similarly, the Cr data 3402 is divided into two blocks 3402a and 3402b, and the Cb data 3403 is divided into two blocks 3403a and 3403b. Subsequently, the DCT section 3103 executes DCT for these eight blocks.

FIG. 18 shows the DCT result of the eight blocks shown in FIG. 17.

Referring to FIG. 18, reference numeral 3501 denotes DCT coefficients of the Y data. Blocks 3501a to 3501d respectively correspond to blocks 3401a to 3401d shown in FIG. 17. Similarly, reference numeral 3502 denotes DCT coefficients of the Cr data; and 3503, DCT coefficients of the Cb data. Note that each block after DCT consists of one DC component at the upper left corner, and remaining 63 AC components.

The DCT coefficient data 3501 to 3503 shown in FIG. 18 are quantized by the quantization section 3104. In this case, quantization is performed based on quantization tables recommended by the JPEG.

FIG. 19 shows quantization tables used in quantization. Referring to FIG. 19, reference numeral 4001 denotes a quantization table for Y components; and 4002, a quantization table for Cr and Cb components.

FIG. 20 shows the quantization result of DCT coefficient data shown in FIG. 18 using the quantization tables shown in FIG. 19. Referring to FIG. 20, reference numeral 3601 denotes quantized data of the Y components; 3602, quantized data of the Cr components; and 3603, quantized data of the Cb components.

The encoding section 3105 classifies the quantized data 3601 to 3603 shown in FIG. 20 into DC and AC components. As for the DC components, the section 3105 forms an optimal Huffman encoding table on the basis of a histogram of a difference from a DC component of the previous block, and performs encoding according to the table. As for the AC components, the section 3105 sorts the AC components in a zigzag order shown in FIG. 21, forms an optimal Huffman encoding table on the basis of a histogram of a combination of a run length of coefficients 0 (the number of coefficients 0 until a coefficient x other than 0 appears), and the value x, and performs encoding according to the table.

Since each pixel has a range of 8 bits, original 16×16 pixel data in the NTSC-RGB color space, which has a data amount of 6,144 bits (=16×16×three colors×8 bits), is compressed to 795 bits when the data is output from the encoding section 3105. Therefore, image data is compressed to about 1/7.7 (6,144/795≈7.7). However, in practice, since image size data, quantization table data, encoding table data, and the like are added to the data encoded by the encoding section 3105, the compression ratio is slightly lowered.

The processing flow of the ADCT data expansion apparatus will be described below.

The Huffman decoding section 3205 decodes input encoded data.

The inverse quantization section 3204 multiplies quantized data output from the Huffman decoding section 3205 with the coefficients of the quantization tables shown in FIG. 19, thereby executing inverse quantization.

With the above-mentioned processing, data shown in FIG. 22 are obtained. FIG. 22 shows the result of Huffman decoding and inverse quantization of the ADCT-compressed image data. Reference numeral 3701 denotes Y components; 3702, Cr components; and 3703, Cb components.

As can be seen from a comparison between the inverse-quantized data (DCT coefficient data) shown in FIG. 22 and the DCT coefficient data before quantization shown in FIG. 18, these two data are apparently different from each other.

Subsequently, the inverse DCT section 3203 executes inverse DCT of the DCT coefficient data output from the inverse quantization section 3204 to reconvert them into Y, Cr, and Cb data. FIG. 23 shows the inverse DCT result of the DCT coefficient data shown in FIG. 22 by the inverse DCT section 3203. Reference numeral 3801 denotes Y data; 3802, Cr data; and 3803, Cb data.

The interpolation section 3202 interpolates data omitted from the image data output from the inverse DCT section 3203, and the color conversion section 3201 converts the YCrCb color space data output from the interpolation section 3202 into NTSC-RGB color space data.

Figure 24:
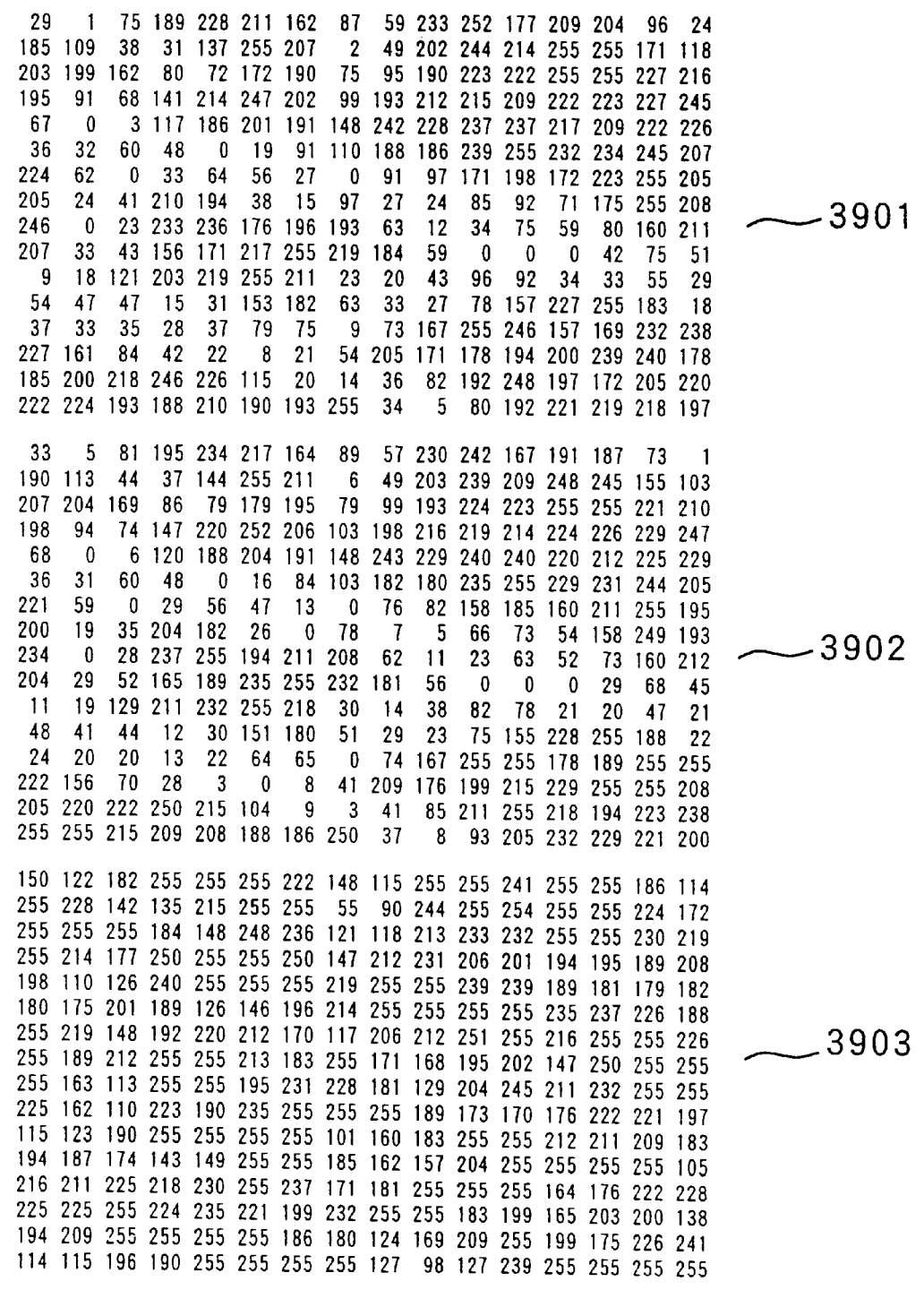

FIG. 24 shows data finally obtained by the ADCT data expansion apparatus. Reference numeral 3901 denotes R data; 3902, G data; and 3903, B data.

However, the above-mentioned tech nique suffers from the following problems.

More specifically, the ADCT image compression method is an irreversible compression method which loses data upon sub sampling and quantization. Therefore, as can be apparent from a comparison between NTSC-RGB color space data (FIG. 16) before compression, and NTSC-RGB space data (FIG. 24) as a result of compression and expansion of the data of FIG. 16, data expanded by the ADCT image compression method becomes different from data before compression. In other words, image quality deteriorates.

The merits of an image created on a computer (computer-created image) are a smooth outline, noise-free color painting based on a single color per figure (or character), and the like. However, when image data is compressed and expanded by the ADCT image compression method, a non-smooth outline of a figure, pseudo edge called mosquito noise, coloring due to quantization, and the like occur, and the merits of the computer-created image cannot be fully exhibited. Especially, since the above-mentioned compression method performs 8×8 block processing, a considerable change in color occurs at the boundary areas of the blocks.

When the compression ratio is to be increased in the ADCT image compression method, the AC components of the DCT coefficients are finally lost, and a block distortion is generated. In the extreme case, the resolution may deteriorate to, e.g., ⅛.

For this reason, compression may be performed while suppressing quantization so as not to cause conspicuous deterioration of image quality. However, such a technique is not practical in terms of the compression ratio since a computer-created image is originally characterized by many high-frequency data. Therefore, a computer-created image such as an image created by DTP need be compressed by a reversible method capable of obtaining a high compression ratio.

As a compression method for a color multi-value image created by a computer, methods shown in FIGS. 25 and 26 are known.

In the compression method shown in FIG. 25, a run length identification circuit 4012 identifies the run length of pixel data having the same color, and an encoding section 4013 encodes and transmits the run length of the color and pixel data at that time. That is, the concept of a so-called MH encoding method is extended to color image encoding.

In the compression method shown in FIG. 26, a line memory 4102 for storing previous line data is arranged, a run length identification circuit 4103 identifies the run length of pixel data having the same color, and an encoding section 4104 encodes and transmits the run length of the color and pixel data at that time with reference to previous line information. That is, the concept of a so-called MR encoding method is extended to color image encoding.

Each of the above-mentioned methods can obtain a very high compression ratio when pixel data having the same value continuously appear for a long period of time. However, these methods are not suitable for an image including fine patterns such as a DTP image. Also, since the encoding section often uses Huffman encoding, and the like, the circuit is complicated. In addition, since the run length identification circuit is required, encoding cannot be started until the run length ends, thus disturbing real-time processing.

Furthermore, the compression method shown in FIG. 26 aims at a higher compression ratio than the compression ratio shown in FIG. 25 by utilizing two-dimensional correlation of an image. However, the method shown in FIG. 26 must have a pixel data memory for at least one line.

In a method of compressing image data by a reversible compression method such as Huffman encoding, the data amount changes after compression. In particular, when a gradation image or a natural image read by an image scanner is reversibly compressed, the compressed data may often have an extremely large data amount. For this reason, a large-capacity image memory for the worst case must be prepared.

SUMMARY OF THE INVENTION

The present invention has been made to solve the problems of the above-mentioned techniques, and has as its object to provide an image processing method and apparatus, which can compress multi-value image data at a high compression ratio, and an image processing method and apparatus for expanding compressed data to reproduce the multi-value image data.

In order to achieve the above object, the present invention comprises the following arrangement.

That is, there is provided an image processing apparatus for processing image data in units of blocks each consisting of a plurality of pixels, comprising: reversible compression means for reversibly compressing a block which satisfies $D \leq L$ (D is the compressed data amount obtained when the block is reversibly compressed, and L is a predetermined value); and irreversible compression means for irreversibly compressing a block which satisfies $D > L$.

Preferably, the reversible compression means comprises: sorting means for one-dimensionally sorting pixel data of the block; latch means for latching the pixel data output from the sorting means; first comparison means for comparing first pixel data latched by the latch means with second pixel data output from the sorting means after the first pixel data, and outputting a first comparison result; second comparison means for comparing pixel data held in advance in at least one holding means with the second pixel data, and outputting at least one second comparison result; updating means for, when the first comparison result indicates a non-coincidence, and the second comparison result indicates a coincidence, updating pixel data in the holding means which holds the pixel data coinciding with the second pixel data to the pixel data latched by the latch means, and for, when both the first and second comparison results indicate a non-coincidence, updating pixel data in the holding means which holds the oldest pixel data to the pixel data latched by the latch means; and output means for, when the first comparison result indicates a coincidence, outputting the first comparison result, for, when the first comparison result indicates a non-coincidence, and the second comparison result indicates a coincidence, outputting the first comparison result, and the second comparison result in an order named, and for, when both the first and second comparison results indicate a non-coincidence, outputting the first comparison result, the second comparison result, and the second pixel data in an order named.

More preferably, the reversible compression means further comprises: calculation means for calculating the compressed data amount D on the basis of the first and second comparison results; discrimination means for discriminating a relationship between the compressed data amount D obtained by the calculation means and the limit value L; and recovery means for, when a discrimination result of the discrimination means indicates $D > L$, restoring the pixel data latched by the latch means and pixel data held in the holding means to values before the beginning of processing of a present block.

There is also provided an image processing method for expanding compressed data obtained by compressing image data in units of blocks each consisting of a plurality of pixels, comprising the steps of: expanding the compressed data by selecting one of reversible expansion processing and irreversible expansion processing on the basis of information indicating a compression method of the compressed data; and reproducing original image data by synthesizing image data expanded by the reversible expansion processing and image data expanded by the irreversible expansion processing.

Preferably, the reversible expansion processing includes: the first input step of inputting a first bit corresponding to a pixel of the compressed data; the second input step of inputting compression information consisting of at least 1 bit of a second bit and the following bits corresponding to the pixel when the first bit is '1'; the exchange step of exchanging pixel data latched by latch means with pixel data held in at least one holding means corresponding to a predetermined value when the compression information has the predetermined value; the updating step of updating the pixel data held by the holding means to the pixel data latched by the latch means, and thereafter, updating pixel data to be latched by the latch means to pixel data following the compression information when the compression information is different from the predetermined value; and the output step of outputting pixel data latched by the latch means.

There is also provided an image processing method for reversibly compressing image data, comprising: the latch step of latching input pixel data; the first comparison step of comparing first pixel data latched in the latch step with second pixel data input after the first pixel data, and outputting a first comparison result; the second comparison step of comparing at least two different first and second holding data, which are held in advance, with the second pixel data, and outputting a second comparison result; the updating step of updating the first holding data to the first pixel data when the second comparison result indicates a coincidence between the first holding data and the second pixel data, and of updating the second holding data to the first holding data, and thereafter, updating the first holding data to the first pixel data when the second comparison result indicates a coincidence between the second holding data and the second pixel data or when both the first and second comparison results indicate a non-coincidence; and the output step of outputting a first code when the first comparison result indicates a coincidence, of outputting a second code when the second comparison result indicates a coincidence between the first holding data and the second pixel data, of outputting a third code when the second comparison result indicates a coincidence between the second holding data and the second pixel data, and of outputting a fourth code and the second pixel data in an order named when both the comparison results indicate a non-coincidence.

There is also provided an image processing apparatus for reproducing image data by expanding reversibly compressed data, comprising: holding means for holding in advance at least three different pixel data; storage means for storing a priority order of the pixel data held by the holding means; outputting means for outputting one of the pixel data stored in the holding means or pixel data included in the reversibly compressed data in accordance with the priority order and 3-bit data of first to third bits of the input reversibly compressed data; and updating means for updating the pixel data held by the holding means and the priority order in accordance with the priority order and the 3-bit data.

There is also provided an image processing apparatus for processing image data including pixel type information in units of blocks each consisting of m×n pixels, comprising: analysis means for outputting first block information according to first pixel type information and second block information according to second pixel type information in units of blocks; replacing means for replacing a pixel having the first pixel type information with first pixel data, and replacing a pixel having the second pixel type information and the same value as the first pixel data with second pixel data; reversible compression means for reversibly compressing the pixel data replaced by the replacing means in accordance with the first block information and the second block information, and outputting reversibly compressed data and an area discrimination result; interpolation means for interpolating pixels according to the pixel type information and the area discrimination result to pixel data according to other pixels in a block; irreversible compression means for irreversibly compressing the block interpolated by the interpolation means in accordance with the first block information and the area discrimination result; block information output means for outputting third block information in accordance with the second block information and the area discrimination result; and holding means for holding the reversibly compressed data output from the reversible compression means, and outputting the reversibly compressed data in accordance with the third block information.

Preferably, the first pixel type information indicates a natural image pixel, and the second pixel type information indicates a pixel other than a natural image.

More preferably, when the first block information and the second block information indicate a block consisting of only pixels other than a natural image, the reversible compression means calculates a compressed data amount D to be obtained upon reversible compression of the block, and outputs an area discrimination result indicating a first area and reversibly compressed data if $D \leq L$ (limit value), or outputs only an area discrimination result indicating a second area if $D = m \times n$ or $D > L$; when the first block information and the second block information indicate a block including both natural image pixels and pixels other than the natural image, the reversible compression means calculates the compressed data amount D to be obtained upon reversible compression of the block, and outputs an area discrimination result indicating the first area and reversibly compressed data if $D \leq L$, or outputs only an area discrimination result indicating the second area if $D > L$; and when the first block information and the second block information indicate a block consisting of only natural image pixels, the reversible compression means outputs only an area discrimination result indicating the second area.

There is also provided an image processing apparatus for expanding compressed data obtained by compressing image data in units of blocks each consisting of m×n pixels, comprising: irreversible expansion means for irreversibly expanding the compressed data; reversible expansion means for reversibly expanding the compressed data, and outputting pixel data and pixel type information; and selection means for selecting one of the output from the reversible expansion means and the output from the irreversible expansion means in accordance with method information indicating a compression method in units of blocks, and the pixel type information, wherein original image data is reproduced by synthesizing the pixel data expanded by the reversible expansion means and image data expanded by the irreversible expansion means.

Preferably, the reversible expansion means comprises: a latch unit for latching predetermined pixel data; a holding unit for holding in advance at least three different holding data; a storage unit for storing updating information of the holding data held by the holding unit; an updating unit for, when 1-bit data of a first bit of the compressed data is '1', and 2-bit data of second and third bits is other than '11', exchanging the pixel data latched by the latch unit with holding data corresponding to the 2-bit data, and for, when the 1-bit data is '1', and the 2-bit data is '11', updating holding data indicated by the updating information to the pixel data latched by the latch unit, and thereafter updating the pixel data latched by the latch unit to pixel data of a fourth bit and the following bits of the compressed data; and an output unit for outputting area information accordance with 3-bit data of the first to third bits of the compressed data, and outputting the pixel data latched by the latch unit.

With the above arrangement, there can be provided an image processing method and apparatus, wherein when the compressed data amount D obtained when a block is reversibly compressed and the limit value L satisfy $D \leq L$, the block is reversibly compressed; when they satisfy $D > L$, the block is irreversibly compressed, and original image data is reproduced by selecting one of a result obtained by expanding compressed data as reversibly compressed data and a result obtained by expanding the compressed data as irreversibly compressed data. For example, computer-created image data is reversibly compressed as much as possible to prevent deterioration of image quality. On the other hand, image data such as a gradation image, a natural image, and the like, for which a sufficient compression ratio cannot be expected by reversible compression, is efficiently compressed by irreversible compression, thus preventing shortage of a memory.

More specifically, most of natural images including various image data are image data for which a high compression ratio cannot be expected by the reversible compression method, and hence, area separation between a computer-created image and a natural image can be achieved with a very high possibility by discriminating the relationship between the compressed data amount D and the limit value L. Even when data of a natural image are varied by ADCT compression, human eyes cannot often perceive deterioration of image quality of such natural image. Thus, the present invention can realize compression with high image quality and a constant compression ratio.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a view showing a processing order of pixels of the second embodiment;

FIG. 16 is a view showing a portion of image data of a color multi-value image created by a computer;

FIG. 17 is a view showing a processing result of the image data shown in FIG. 16 by the apparatus shown in FIG. 14;

FIG. 18 is a view showing a DCT-transformed result of eight blocks shown in FIG. 17;

FIG. 19 shows quantization tables;

FIG. 20 is a view showing a quantized result of DCT coefficient data shown in FIG. 18 using the quantization tables shown in FIG. 19;

FIG. 22 is a view showing a result of Huffman decoding and inverse quantization of ADCT-compressed image data;

FIG. 23 is a view showing an inverse DCT result of DCT coefficient data shown in FIG. 22;

FIG. 24 is a view showing data finally obtained by the apparatus shown in FIG. 15;

FIG. 30A is a view showing an example of pixel data generated by a pixel data generation section shown in FIG. 28;

FIG. 30B is a view showing changes of data to be held in each FF section shown in FIG. 28;

FIG. 32 is a view for explaining a compressed result according to the fourth embodiment;

FIG. 34 is a table showing the processing content of a PLD shown in FIG. 33;

FIGS. 38A, 38B, and 38C are views showing the relationship among signals $1b'$, $1e$, and $1f$ shown in FIG. 37;

FIG. 41 is a view showing a sorting order of an image data sorting unit shown in FIG. 40;

FIGS. 43A and 43B are flow charts showing a compression processing sequence of the data compression apparatus shown in FIG. 37;

FIG. 51 is a view showing a state of data to be stored in a buffer memory shown in FIG. 50;

FIG. 52 shows the content of a threshold value table shown in FIG. 50;

FIG. 53 is a view showing a segment format of a compression memory shown in FIG. 49;

FIG. 54 is a view showing a format of a segment information table shown in FIG. 49;

FIG. 56 is a view showing a sorting order of pixel data different from that shown in FIG. 41 in the reversible compression section shown in FIG. 37;

FIG. 58 is a view showing a state of data to be stored in a buffer memory shown in FIG. 57;

FIG. 60 shows the content of an index table shown in FIG. 59.

DESCRIPTION OF THE PREFERRED EMBODIMENTS

An image processing method and apparatus according to an embodiment of the present invention will be described in detail hereinafter with reference to the accompanying drawings.

In the following description, an irreversible compression section adopts an ADCT, a block size of 8×8 pixels is used, and pixel data is defined by 24 bits. However, the present invention is not limited to these. In the following description, NTSC-RGB 24-bit data is used as original image data. However, the present invention is not limited to this. For example, original image data may be CMYK data, XYZ data, CIE-Lab data, CIE-Luv data, or YCrCb data, and data may be defined by either 16 bits or 36 bits. Furthermore, in the following description, "area 1" indicates an area for reversibly compressing blocks, and "area 2" indicates an area for irreversibly compressing blocks.

First Embodiment

Figure 1:
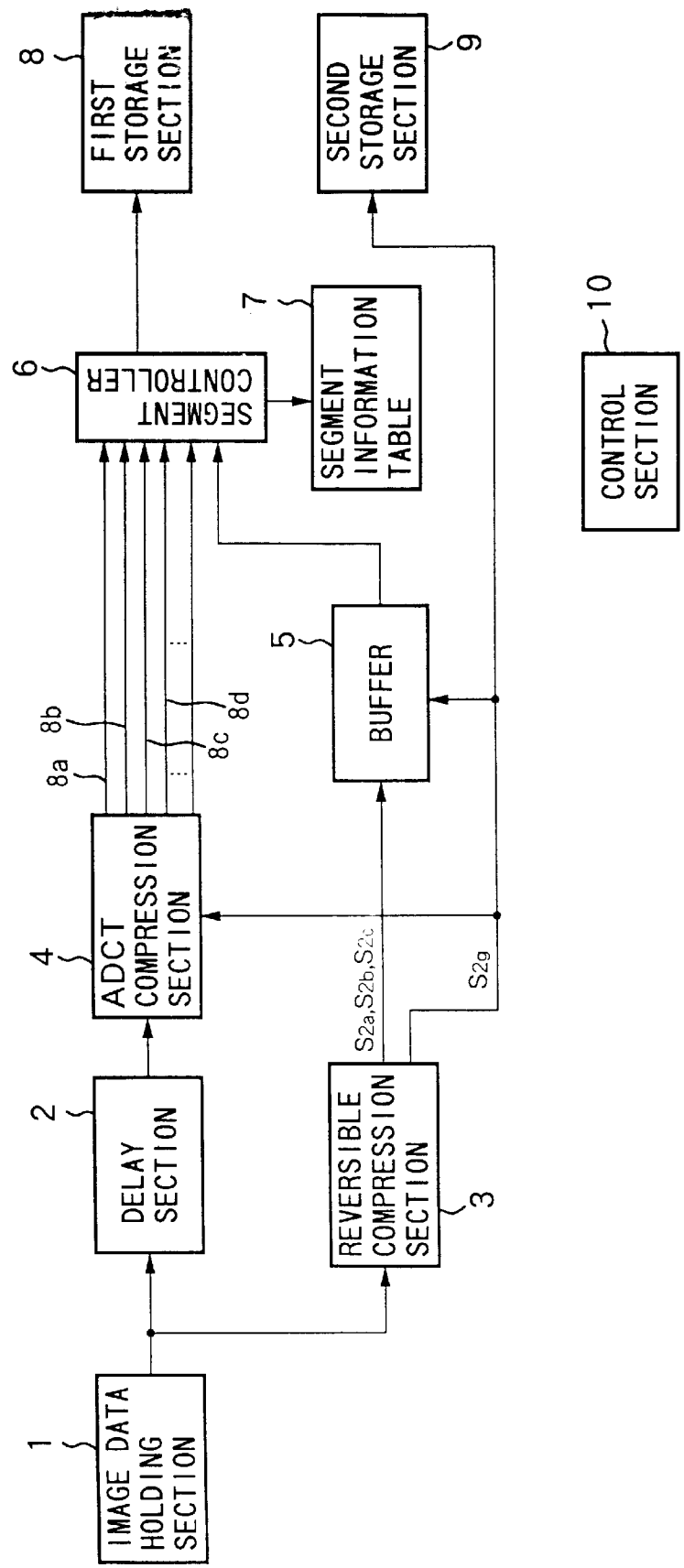
FIG. 1 is a block diagram showing an arrangement of an image compression apparatus according to the first embodiment of the present invention.

FIG. 1 is a block diagram showing an arrangement of an image compression apparatus according to the first embodiment.

Referring to FIG. 1, reference numeral 1 denotes an image data holding section for outputting data having an NTSC-RGB format and defined by 24 bits/pixel in units of blocks.

Reference numeral 2 denotes a delay section for holding a block output from the image data holding section 1 to delay the block by a time corresponding to one block so as to determine execution/non-execution of ADCT compression depending on a reversible compression result.

Reference numeral 3 denotes a reversible compression section for performing reversible compression of a block output from the image data holding section 1, and area discrimination of the block, and outputting compressed data, and a signal S2g indicating an area discrimination result. Further details of the section 3 will be described later.

Reference numeral 4 denotes an ADCT compression section for, when the area discrimination result from the reversible compression section 3 indicates "area 2", ADCT-compressing data input from the delay section 2, and outputting compressed data while dividing them into DC components, low-frequency components, relatively high-frequency components, high-frequency components, and the like. Further details of the section 4 will be described later.

Reference numeral 5 denotes a buffer for storing compressed data output from the reversible compression section 3. When the area discrimination result from the reversible compression section 3 indicates "area 1", the buffer 5 outputs the stored compressed data.

Reference numeral 6 denotes a segment controller for storing compressed data from the buffer 5 and compressed data from the ADCT compression section 4 in a first storage section 8. If the first storage section 8 becomes full of data during compression processing, the segment controller 6 overwrites new compressed data at addresses where ADCT-compressed data having a lower importance and corresponding to higher frequency components are stored with reference to a segment information table 7, thereby preventing overflow of compressed data. Note that the segment information table 7 stores the storage addresses of data stored in the first storage section 8 by the segment controller 6.

Reference numeral 9 denotes a second storage section for storing the signal S2g indicating the area discrimination result output from the reversible compression section 3.

Reference numeral 10 denotes a control section for controlling, e.g., the operation timings of the above-mentioned arrangement of this embodiment.

With the above-mentioned arrangement, the first storage section 8 shown in FIG. 1 stores the divided ADCT-compressed data or reversibly compressed data in accordance with the signal S2g indicating the area discrimination result output from the reversible compression section 3.

Figure 2:
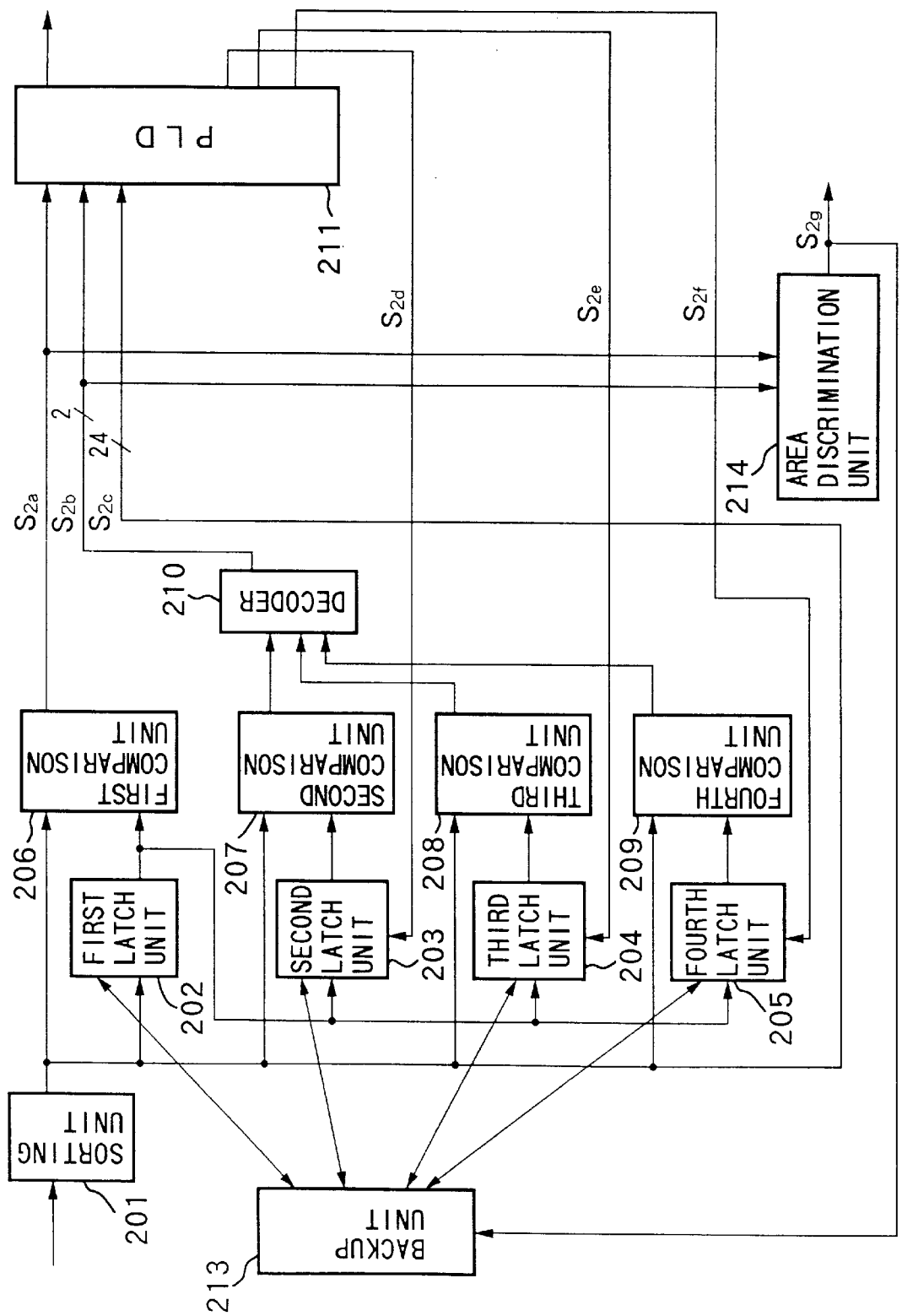
FIG. 2 is a block diagram showing an arrangement of a reversible compression section shown in FIG. 1.

FIG. 2 is a block diagram showing the detailed arrangement of the reversible compression section 3.

Referring to FIG. 2, reference numeral 201 denotes a sorting unit for serially sorting pixel data of an input block.

Reference numeral 202 denotes a first latch unit for latching pixel data (24 bits) from the sorting unit 201. Reference numerals 203 to 205 denote second to fourth latch units for respectively latching pixel data output from the first latch unit 202.

Reference numeral 206 denotes a first comparison unit for comparing pixel data output from the sorting unit 201 and pixel data latched in the first latch unit 202, and outputting a 1-bit signal S2a which is '0' when the two pixel data are equal to each other, or is '1' when the two pixel data are different from each other. More specifically, the signal S2a indicates whether or not a color represented by pixel data serially output from the sorting unit 201 changes, and is '1' when the color is changed.

Similarly, reference numerals 207 to 209 denote second to fourth comparison units for comparing pixel data output from the sorting unit 201 and pixel data latched by the corresponding latch units 203 to 205, and supplying comparison results to a decoder 210.

The decoder 210 receives the comparison results from the second to fourth comparison units 207 to 209, and outputs a 2-bit signal S2b. Note that the signal S2b is '00' when the second comparison unit 207 detects a coincidence; is '01' when the third comparison unit 208 detects a coincidence; is '10' when the fourth comparison unit 209 detects a coincidence; and is '11' when all the comparison results indicate a non-coincidence. More specifically, the signal S2b indicates which one of the latch units 203 to 205 latches data having the same value (same color) as that of pixel data output from the sorting unit 201, and if none of the latch units 203 to 205 latch pixel data having the same value, the signal S2b is '11'.

Reference numeral 211 denotes a PLD (Programmable Logic Device) for receiving the signal S2a output from the first comparison unit 206, the signal S2b output from the decoder 210, and a pixel data signal S2c output from the sorting unit 201, and outputting compressed data of the reversible compression section 3, and latch signals S2d to S2f to the second to fourth latch units 203 to 205. Note that the PLD is an IC programmable by a designer himself or herself.

Note that compressed data output from the PLD 211 has the relationship shown in Table 1 below.

TABLE 1

| S2a | S2b | PLD Output |
|---|---|---|
| 0 | ** | Signal S2a = '0' |
| 1 | 00 | Signal S2b after signal S2a = '100' |
| 1 | 01 | Signal S2b after signal S2a = '101' |
| 1 | 10 | Signal S2b after signal S2a = '110' |
| 1 | 11 | Signal S2c after signal S2b after signal S2a = '111' + S2c (*1) |

*1: 24-bit color data

Table 2 shows the relationship between the inputs to the PLD 211 and the latch signals S2d to S2f, and when the latch signal is '1', the corresponding latch unit latches input data.

TABLE 2

| Input | | Latch Signal | | |
|---|---|---|---|---|
| S2a | S2b | S2d | S2e | S2f |
| 0 | ** | 0 | 0 | 0 |
| 1 | 00 | 1 | 0 | 0 |
| 1 | 01 | 0 | 1 | 0 |
| 1 | 10 | 0 | 0 | 1 |
| 1 | 11 | * | * | * |

As shown in Table 2, when the signal S2a is '0' (color is left unchanged), all the latch signals are '0' regardless of the state of the signal S2b; when the signal S2a is '1' (color is changed), and the signal S2b is '11' (pixel data having the same color is not latched), the content of the latch unit which latches the oldest pixel data is rewritten.

Reference numeral 214 denotes an area discrimination unit for outputting a 1-bit signal S2g indicating a discrimination result, in accordance with the input signals S2a and S2b. Details of this area discrimination unit 214 will be described later. Note that the states '0' and '1' of the signal S2g respectively indicate the discrimination results of "area 1" and "area 2".

Reference numeral 213 denotes a backup unit for storing pixel data latched in the latch units before block processing is started for the discrimination processing of the area discrimination unit 214. When the signal S2g is '1' after discrimination, the backup unit 213 returns pixel data before area discrimination to the latch units.

Figure 3:
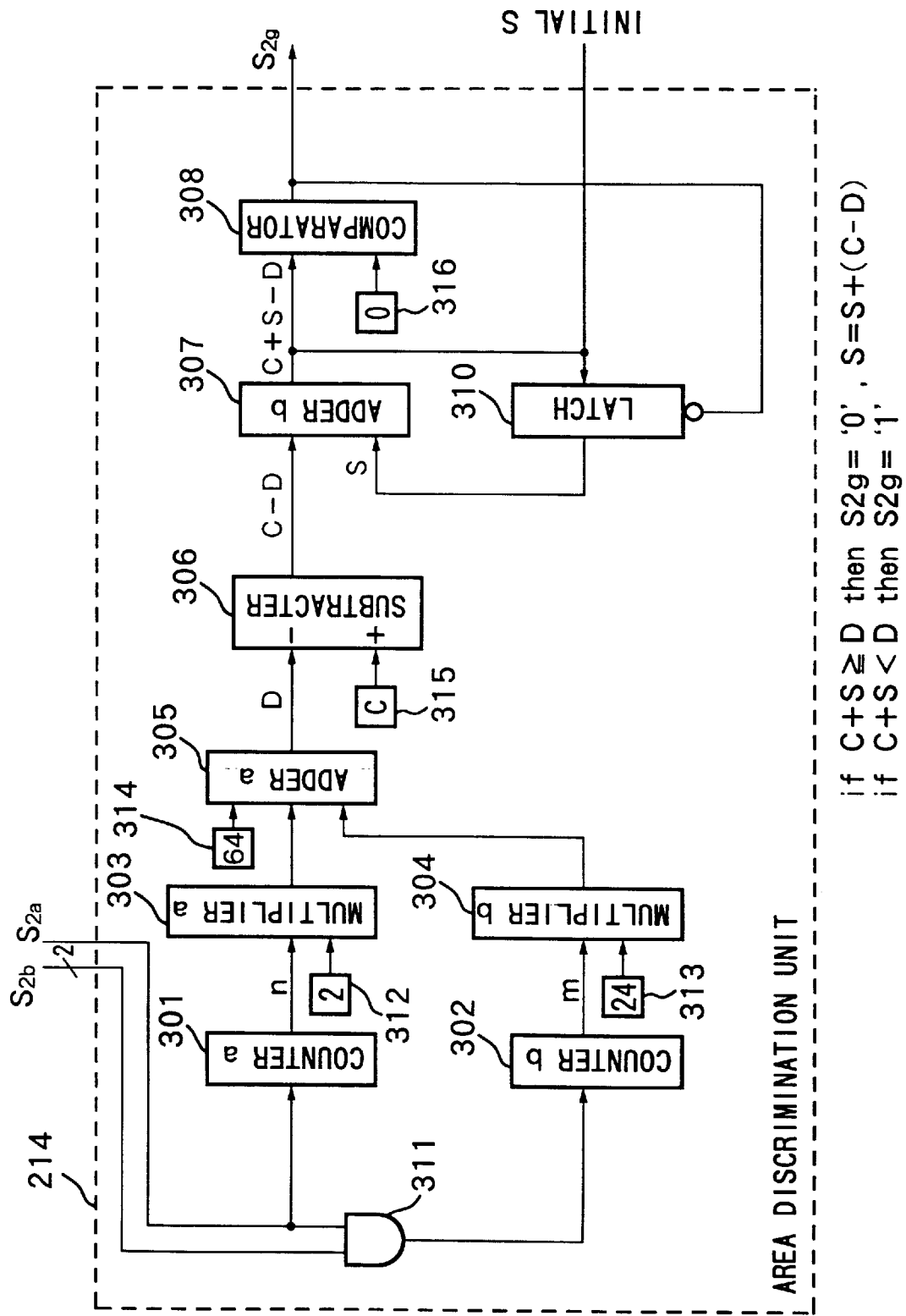
FIG. 3 is a block diagram showing an arrangement of an area discrimination unit shown in FIG. 2.

FIG. 3 is a block diagram showing the detailed arrangement of the area discrimination unit 214.

Referring to FIG. 3, reference numerals 312 to 316 denote registers.

Reference numeral 311 denotes an AND gate for outputting a total of 3-bit logical product of the signals S2a and S2b.

Reference numeral 301 denotes a counter a for counting the number of times of the signal S2a=1, i.e., the number of times of appearance of color change points. Reference numeral 302 denotes a counter b for counting the number of times of the output ='1' from the AND gate 311. More specifically, the counter b 302 counts the number of times of the signal S2a='1' and the signal S2b='11', i.e., the number of times of appearance of non-latched colors.

Reference numerals 303 and 304 denote multipliers. The multiplier a 303 multiplies the output from the counter a 301 with 2 (the number of bits of the signal S2b) stored in the register 312, and the multiplier b 304 multiplies the output from the counter b 302 with 24 (the number of bits of pixel data) stored in the register 313.

Reference numeral 305 denotes an adder a for adding the output from the multiplier a 303, the output from the multiplier b 304, and 64 (the change point information number of colors) stored in the register 314, and outputting the number of bits (compressed data amount) D finally required for the corresponding block. Note that the change point information number of colors is a value determined by a preset block size, and is not limited to 64.

Reference numeral 306 denotes a subtracter for outputting a result C−D obtained by subtracting the output D from the adder a 305 from a value C stored in the register 315. Note that the value C represents a target data size per block after compression. For example, if the target compression ratio of this embodiment is set to be 1/12, the value C is determined as follows using the block size and pixel data size:

C=8×8×24/12=128 [bytes]

Reference numeral 307 denotes an adder b for outputting a result C+S−D obtained by adding the subtraction result C−D from the subtracter 306 and an output S from a latch 310 (to be described later).

Reference numeral 308 denotes a comparator for comparing the addition result C+S−D from the adder b 307 with a value 0 stored in the register 316, and outputting the signal S2g representing the area discrimination result. Note that the signal S2g is '0' if C+S−D≧0; it is '1' if C+S−D<0. As described above, the states '0' and '1' of the signal S2g respectively indicate the discrimination results of "area 1" and "area 2".

More specifically, when the target compression ratio can be achieved by adding a stock S (to be described later) after block compression (C+S−D≧0), the area discrimination unit 214 determines "area 1" for reversibly compressing the block; when the target compression ratio cannot be achieved even if the stock S is added, it determines "area 2" for irreversibly compressing the block.

Reference numeral 310 denotes a latch which is initialized to a predetermined value by the control section 10 at the beginning of compression processing. Thereafter, when each block is determined as "area 1", i.e., when the signal S2g is '0', the latch 310 latches the output C+S−D from the adder b 307. More specifically, the latch 310 latches a stock C+S−D (>0) with respect to the target compression ratio at that time after compression of one block, and outputs the latched data as a stock S.

In this embodiment, a value "128", for example, is set as an initial value of the stock S. The stock S is not set to be 0 to cope with a case wherein a large number of different colors appear in the first block. More specifically, the compression method of the reversible compression section 3 requires 64 bits per block for information representing a color change point, and also requires 2 bits as latch information at a color change point. Furthermore, when a non-latched new color appears, the compression method requires 24 bits for directly outputting data of the color. If the number of color change points (the count value of the counter a 301)

is represented by n, and the number of times of appearance of non-latched new colors (the count value of the counter b 302) is represented by m, the following relationship is established:

$D = 64 + 2n + 24m$ $\therefore C + S - (64 + 2n + 24m) \geq 0$ for $0 \leq n \leq 64$, $0 \leq m \leq n$ Therefore, with the compression method of the reversible compression section 3, if C=128, S=0, and m=n in the first block, we have:

$n < (128-64)/26 \approx 2.4$

That is, since the upper limit of the number of colors is 2 in this case, a certain stock S must be initially prepared. For example, if C=S=128, n<7.3, and compression can be performed even when a maximum of seven colors appear when m=n.

Figure 4:
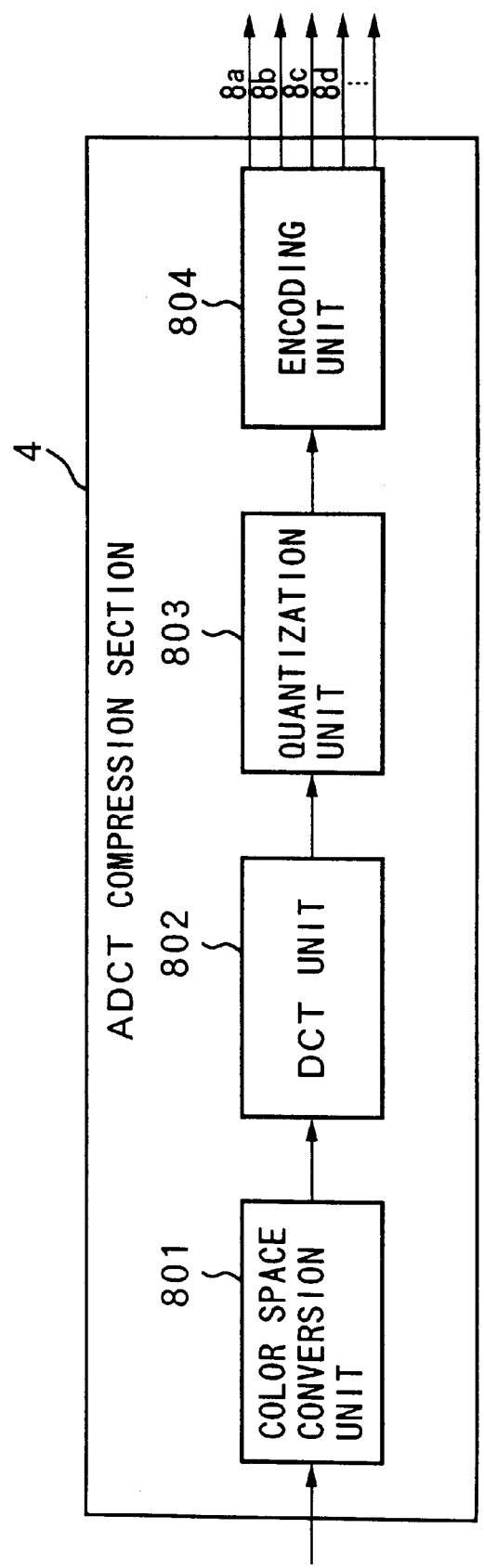
FIG. 4 is a block diagram showing an ADCT compression section shown in FIG. 1.

FIG. 4 is a block diagram showing the detailed arrangement of the ADCT compression section 4.

Referring to FIG. 4, reference numeral 801 denotes a color space conversion unit for converting RGB color space data into YCrCb color space data.

Reference numeral 802 denotes a DCT unit for performing DCT of YCrCb data output from the color space conversion unit 801 to convert it into frequency space data.

Reference numeral 803 denotes a quantization unit for quantizing DCT coefficients output from the DCT unit 802 using different step widths, respectively.

Reference numeral 804 denotes an encoding unit for classifying quantized data output from the quantization unit 803 into DC coefficients and AC coefficients, and encoding these coefficients. More specifically, as for DC coefficients, the encoding unit 804 forms an optimal Huffman encoding table on the basis of a histogram of differences from DC coefficients in the previous block, and encodes the DC coefficients in accordance with this table. Also, as for AC coefficients, the encoding unit 804 sorts the coefficients in a zigzag order, forms an optimal Huffman encoding table on the basis of combinations of a run length of coefficients 0 (the number of coefficients 0 until a coefficient x other than 0 appears) and the value x, and encodes the AC coefficients in accordance with this table. The encoding unit 804 outputs encoded data of the DC coefficients onto a line 8a, and distributes and outputs encoded data of the AC coefficients onto respective lines. That is, the unit 804 outputs, from the lower frequency side, p encoded data onto a line 8b, q encoded data onto a line 8c, r encoded data onto a line 8d, and so on.

Although not described, the signals S2a, S2b, and S2c can be stored at different addresses on the first storage section 8 by the segment controller 6.

Also, the latch units (the second to fourth latch units 203 to 205) for latching previous pixel data may be combined, and two latch units, i.e., the first and second latch units may be arranged.

Figure 5:
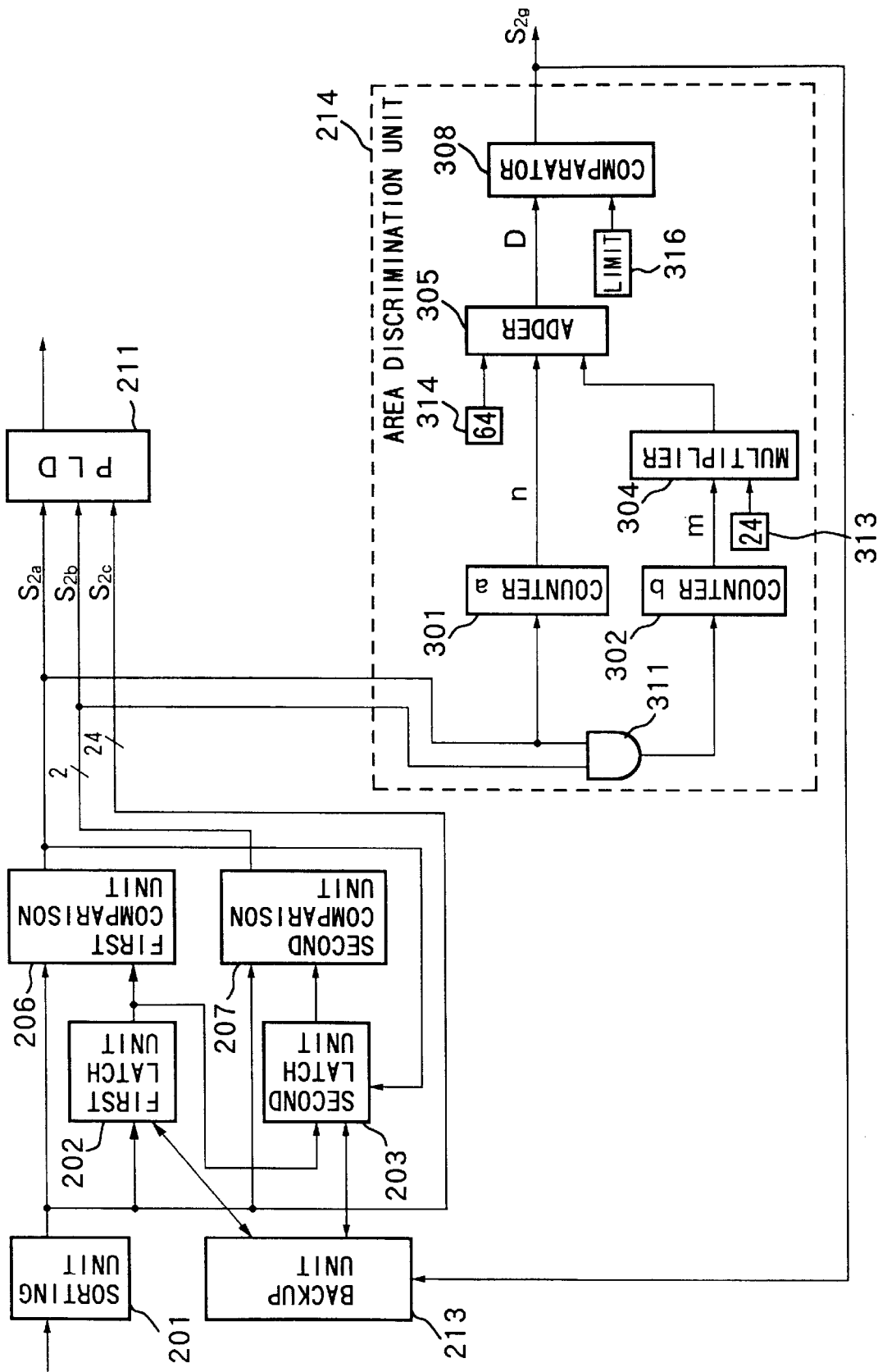
FIG. 5 is a block diagram showing another arrangement of the reversible compression section shown in FIG. 1.

FIG. 5 is a block diagram showing another arrangement of the reversible compression section 3. In this arrangement, only one latch unit for storing previous pixel data is arranged, and no stock S is set. In this case, the number of comparison units is decreased to two, the signal S2b is defined by 1 bit, and a formula for calculating the compressed data amount is modified as follows:

$D = 64 + n + 24 \times m$ where n: the number of color change points (the count value of the counter a 301)

m: the number of times of appearance of non-latched new colors (the count value of the counter b 302).

In the reversible compression section 3, a latch unit to be updated when pixel data having the same value is not present in any latch units may be permanently assigned. For example, when the signal S2a is '1' and the signal S2b is '11', the second latch unit 203 is updated. In this case, although compression efficiency is slightly impaired, the hardware arrangement can be simplified.

In the above description, the segment controller 6 is used for memory control to perform data compression in a real-time manner. Alternatively, pre-scan (pre-development) may be performed to determine a δ-factor of ADCT compression in advance, and then, compression may be performed. In this case, memory control can be facilitated.

In this manner, since a block, which can achieve a target compression ratio, is compressed by the reversible compression section 3, and a block, which cannot achieve the target compression ratio, is compressed by the ADCT compression section 4, a computer-created image, for example, is reversibly compressed as much as possible to prevent deterioration of image quality, and image data such as a gradation image, a natural image, and the like, which cannot expect a sufficient compression ratio by reversible compression, is efficiently compressed by ADCT compression, thus preventing shortage of the memory. Note that a gradation image, a natural image, and the like have a feature that deterioration of image quality is not conspicuous even when these images are irreversibly compressed and expanded.

Furthermore, since reversible compression and irreversible compression can be switched in units of blocks, this embodiment is effective for both a natural image synthesized in a computer-created image and a computer-created image synthesized in a natural image.

When the memory capacity for storing compressed data runs short even though compression is performed in the above-mentioned sequence, new compressed data are overwritten at addresses where ADCT-compressed data at the higher frequency side are stored, thereby preventing shortage of the memory.

Second Embodiment

An image compression apparatus according to the second embodiment of the present invention will be described below.

In the second embodiment, the reversible compression section 3 of the first embodiment is realized in a software manner. Therefore, the reversible compression section alone will be described hereinafter, and a detailed description of the same arrangement as that in the first embodiment will be omitted.

Note that the contents of data names in the following description are as follows, and components in the parentheses correspond to those in the first embodiment.

next: first latch data (first latch unit 202) former[0]: second latch data (second latch unit 203) former[1]: third latch data (third latch unit 204) former[2]: fourth latch data (fourth latch unit 205) present: pixel data output in zigzag order (output from sorting unit 201)

turn: latch updating information

Note that "next", "former[ ]", and "present" are pixel data in the RGB format, and have R, G, and B data, respectively.

Figure 6:
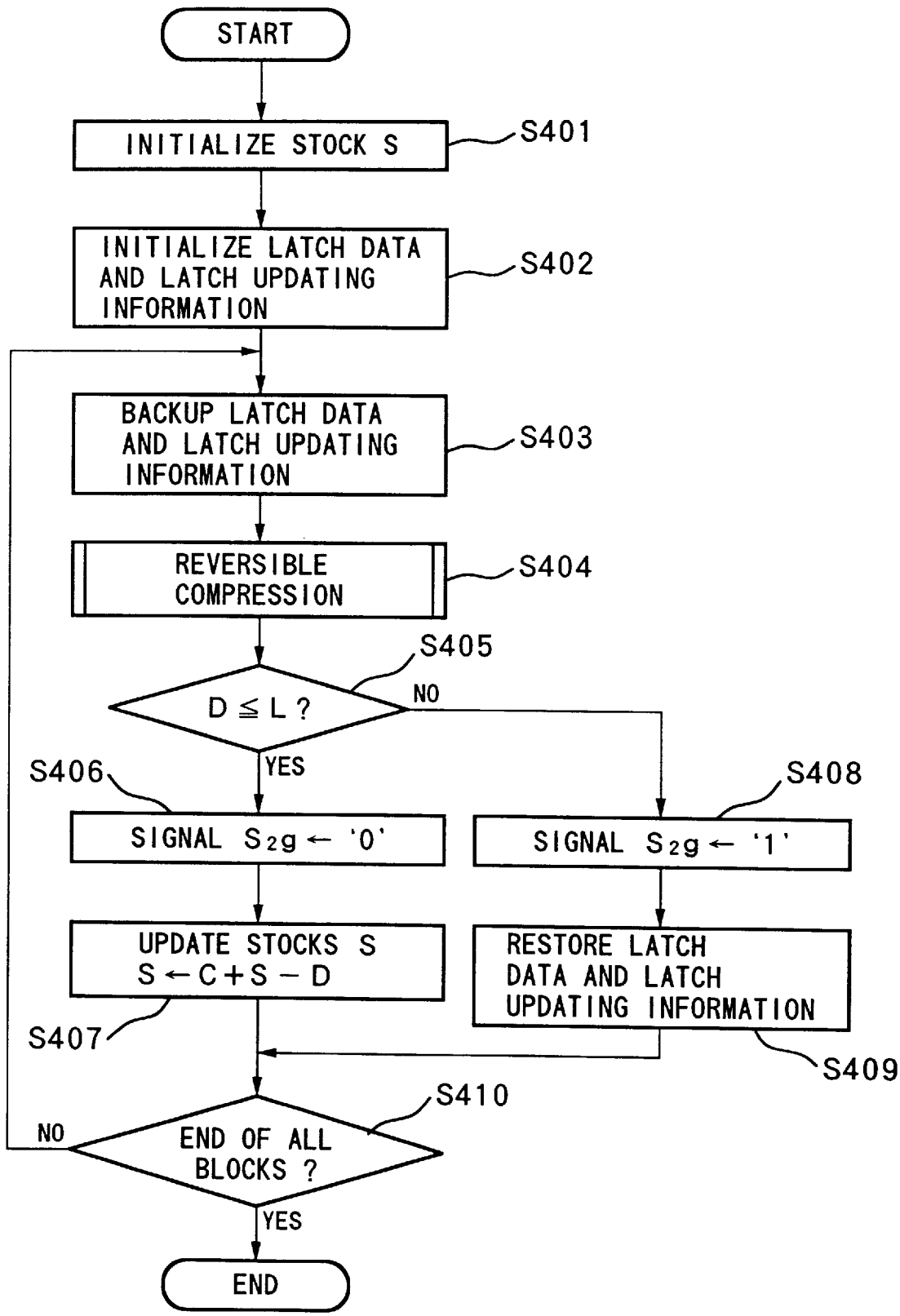
FIG. 6 is a flow chart showing a reversible compression sequence according to the second embodiment of the present invention.

FIG. 6 is a flow chart showing a reversible compression sequence of this embodiment.

Referring to FIG. 6, in this embodiment, a stock S is initialized to, e.g., 128 in step S401, and four latch data "next" and "former[ ]" are initialized in step S402. In this embodiment, assuming that a black image, a red image, and a blue image on a white background have high appearance frequencies in this order, white data is set in "next", black data is set in "former[0]", red data is set in "former[1]", and blue data is set in "former[2]" as follows:

next=(255, 255, 255)
former[0]=(0, 0, 0)
former[1]=(255, 0, 0)
former[2]=(0, 0, 255)

In step S402, if "present" does not coincide with any "former[ ]", "turn" for rewriting the oldest "former[ ]" is set as follows:

turn=0
turn_p=1
turn_pp=2

In step S403, pixel data "next", "former[ ]", and "turn" are backed up.

Bnext←next
Bformer[ ]←former[ ]
Bturn←turn
Bturn_p←turn_p
Bturn_pp←turn_pp

In step S404, one block is reversibly compressed to obtain a compressed data amount D, as will be described in detail later.

In step S405, the compressed data amount D obtained in step S404 is compared with a limit value L obtained by adding the stock S to a preset value C. If D≦L, "area 1" is determined, and the flow advances to step S406; if D>L, "area 2" is determined, and the flow advances to step S408.

If the discrimination result indicates "area 1", a signal S2*g* of state "0" is output in step S406, and the stock S is updated using the following formula in step S407. Thereafter, the flow advances to step S410.

S←C+S−D

If the discrimination result indicates "area 2", the signal S2*g* of state "1" is output in step S408, and the backed-up pixel data are restored to "next", "former[ ]", and "turn" in step S409. Thereafter, the flow advances to step S410. More specifically, in step S409, latch data rewritten in the processing in step S404 are restored to pixel data before the processing.

next←Bnext
former[ ]←Bformer[ ]
turn←Bturn
turn_p←Bturn_p
turn_pp←Bturn_pp

In step S410, it is checked if all blocks are processed. If NO in step S410, the flow returns to step S403 to process the remaining blocks; otherwise, the processing is ended.

Figure 7:
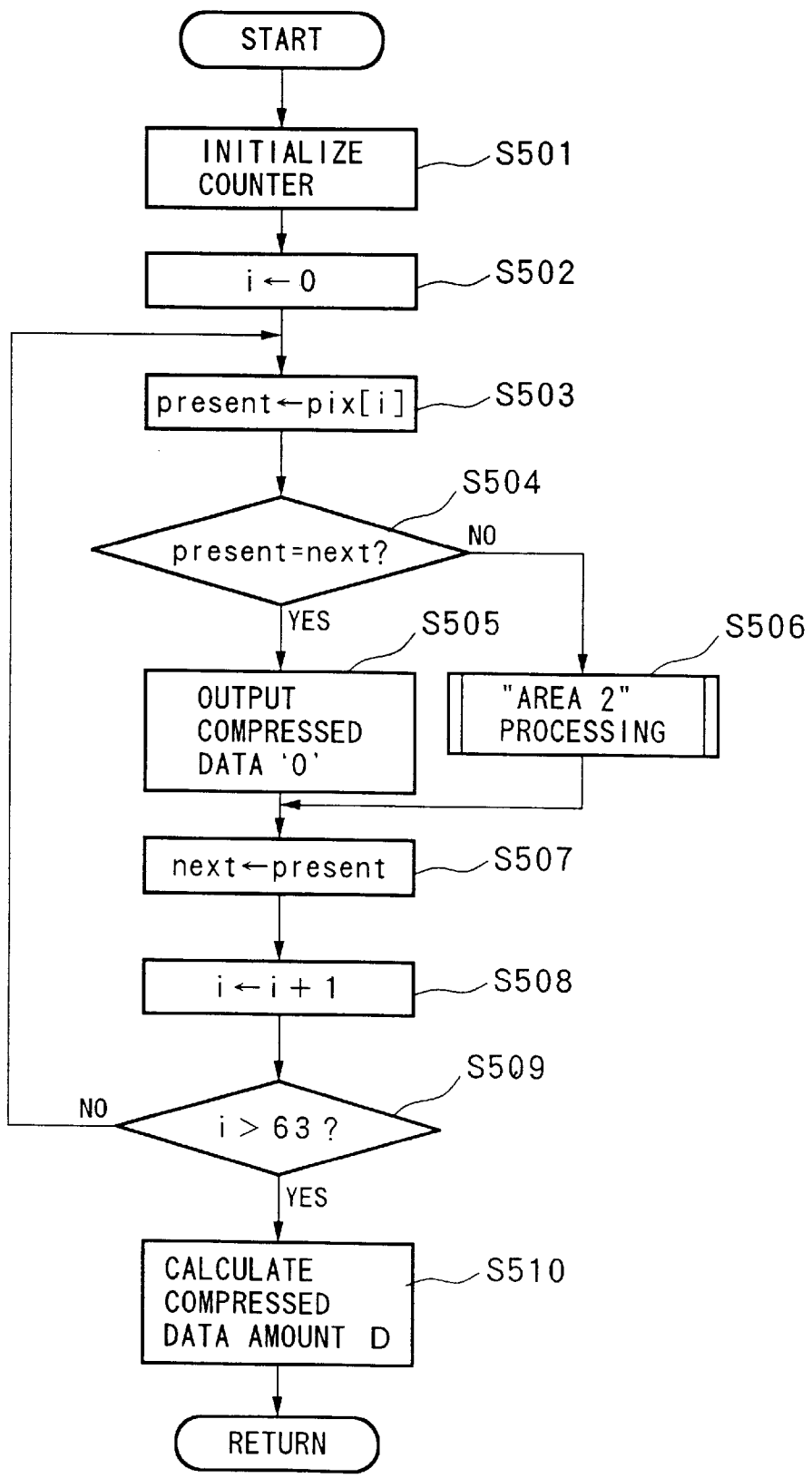
FIG. 7 is a flow chart showing a sequence of reversible compression processing shown in FIG. 6.
Figure 8:
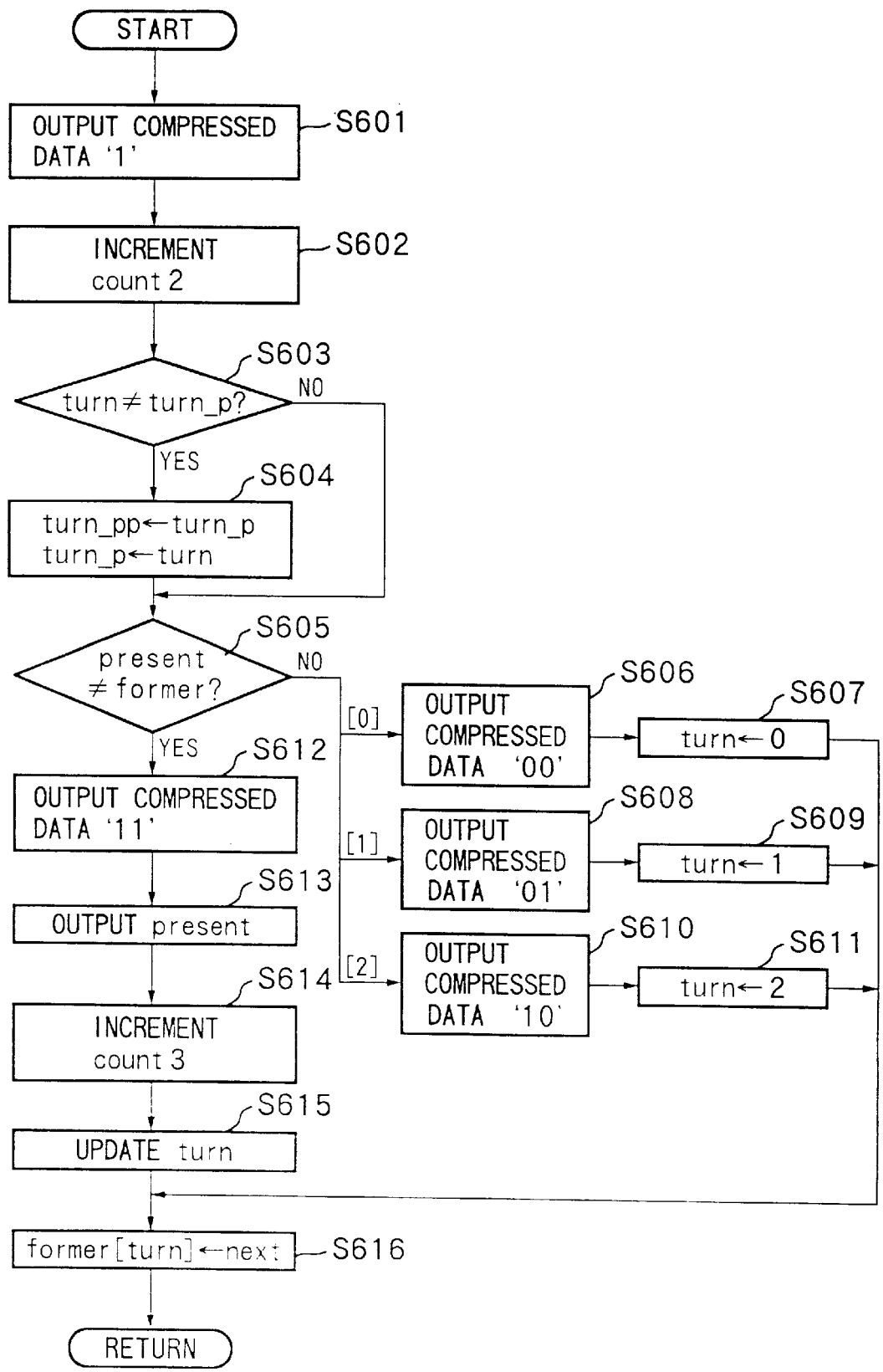
FIG. 8 is a flow chart showing a sequence of area 2 processing shown in FIG. 7.

The processing sequence of reversible compression (step S404) will be described below. Note that data names in the following description, and components in the parentheses correspond to those in the first embodiment.

count2: the number of times of appearance of color change points (counter a 301)
count3: the number of times of non-coincidence with any of latch data (counter b 302)
pix[i]: i-th pixel data FIGS. 7 and 8 are flow charts showing the sequence of the reversible compression processing (step S404).

Referring to FIG. 7, in this embodiment, "count2" and "count3" are initialized to 0 in step S501, and 0 is set in a counter i in step S502. Note that the counter i counts the number of processed pixels, and in this embodiment, pixels are processed in the order shown in FIG. 9.

In step S503, "pix[i]" is substituted in "present", and in step S504, "present" is compared with "next". If the two data coincide with each other, compressed data '0' is output in step S505; otherwise, "area 2" processing in step S506 is executed, as will be described in detail later. More specifically, since the present pixel data (present) and immediately preceding pixel data (next) are compared with each other in step S504, a coincidence between the two data indicates that the color is left unchanged, and a non-coincidence between the two data indicates that the color is changed.

In step S507, pixel data latched in "present" is substituted in "next", and in step S508, the counter i is incremented. In step S509, the value of the counter i is checked. If i≦63, the flow returns to step S503 to process the remaining pixels; if i>63, the flow advances to step S510.

If processing of all pixels is completed (i>63), the compressed data amount D of the corresponding block is calculated using the following equation in step S510, and the flow then returns to the processing sequence shown in FIG. 6.

$$D=64+2\times count2+24\times count3$$

On the other hand, if it is determined in step S504 that present≠next, a processing sequence shown in FIG. 8 is executed.

Referring to FIG. 8, in this embodiment, compressed data '1' is output in step S601, "count2" is incremented in step S602, and "turn" and "turn_p" are compared with each other in step S603. If the two data coincide with each other, the flow jumps to step S605; otherwise, the flow advances to step S604. In step S604, the latch number of "turn_p" is substituted in "turn_pp", and thereafter, the latch number of "turn" is substituted in "turn_p". Note that this processing is to inhibit giving of the same value to "turn" and "turn_p".

In step S605, "present" and "former[ ]" are compared with each other. If present=former[0], the flow advances to step S606; if present=former[1], the flow advances to step S608; if present=former[2], the flow advances to step S610; if present≠former[ ], the flow advances to step S612.

If present=former[0], compressed data '00' is output in step S606, and a value '0' is set in "turn" in step S607, thereby indicating the latch number to be updated. If present=former[1], compressed data '01' is output in step S608, and a value '1' is set in "turn" in step S609. If present=former[2], compressed data '10' is output in step S610, and a value '2' is set in "turn" in step S611.

If present≠former[ ], compressed data '11' is output in step S612, and pixel data latched in "present" is output in step S613. In step S614, "count3" is incremented, and in step S615, a latch number different from those in "turn_p" and "turn_pp" is set in "turn". Since the same value is inhibited from being set in "turn_p" and "turn_pp" in steps S603 and S604, "turn" assumes one of values '0', '1', and '2'.

In step S616, pixel data latched in "next" is substituted in "former[turn]", and thereafter, the flow returns to the processing sequence shown in FIG. 7.

Since a computer-created image created by, e.g., DTP uses a relatively small number of colors, and can be sufficiently expressed by 256 colors, a look-up table can be used for the present value "present" output in step S613 in the above description. For example, an 8-bit (256 colors) memory is prepared, and data of 8 bits/pixel is output until the 256th color appears. When the 256th color appears, data of 24 bits/pixel is directly output, thus providing an arrangement, which has no limitation on the number of colors.

The present value "present" to be output in step S613 may be, e.g., 18-bit data in place of 24-bit data. In this case, although reversible compression is disabled, since gradation characteristics for human eyes are not important in a high-frequency image such as a computer-created image, a compressed data amount in this case is given by:

D=64+2×count2+18×count3

The number of "former"s for latching previous data may be reduced to 1. In this case, a 1-bit signal is output in step S606, S608, S610, or S612, and since the number of latches to be substituted with pixel data latched in "next" is one, "turn" indicating the updating order can be omitted. In this case, an equation for calculating the compressed data amount is rewritten as follows:

D=64+count2+24×count3

In this manner, in addition to the same effect as in the first embodiment, since the reversible compression section is realized by a software program to reversibly compress data and to calculate the compressed data amount D, the hardware arrangement can be simplified.

Third Embodiment

A data expansion apparatus according to the third embodiment of the present invention will be described below.

In the third embodiment, compressed data stored in the first and second storage sections 8 and 9 shown in FIG. 1 are expanded to reproduce image data.

Figure 10:
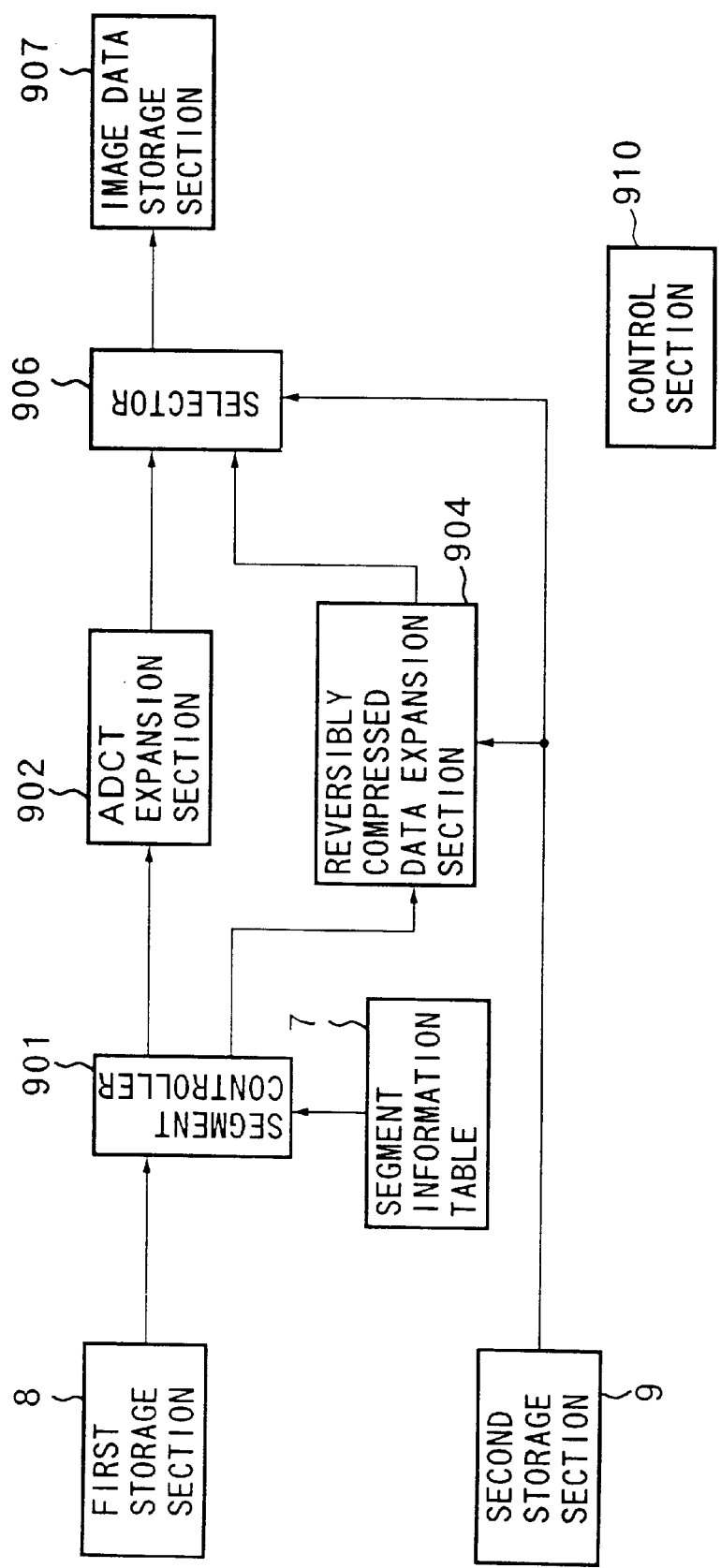
FIG. 10 is a block diagram showing an arrangement of a data expansion apparatus according to the third embodiment of the present invention.

FIG. 10 is a block diagram showing an arrangement of a data expansion apparatus according to this embodiment.

Referring to FIG. 10, reference numeral 901 denotes a segment controller for distributing compressed data stored in the first storage section 8 to an ADCT expansion section 902 or a reversibly compressed data expansion section 904 with reference to the segment information table 7 shown in FIG. 1. The ADCT expansion section 902 expands irreversibly compressed data to reproduce an 8×8 pixel block. The reversibly compressed data expansion section (to be simply referred to as "expansion section" hereinafter) 904 expands reversibly compressed data on the basis of area information stored in the second storage section 9, thus reproducing an 8×8 pixel block.

Reference numeral 906 denotes a selector for selecting and outputting one of the block input from the ADCT expansion section 902 and the block input from the expansion section 904 on the basis of area information stored in the second storage section 9.

Reference numeral 907 denotes an image data storage section for sequentially storing blocks output from the selector 906 to reproduce image data in the NTSC-RGB format defined by 24 bits/pixel.

Reference numeral 910 denotes a control section for controlling, e.g., the operation timings of the arrangement of this embodiment.

Figure 11:
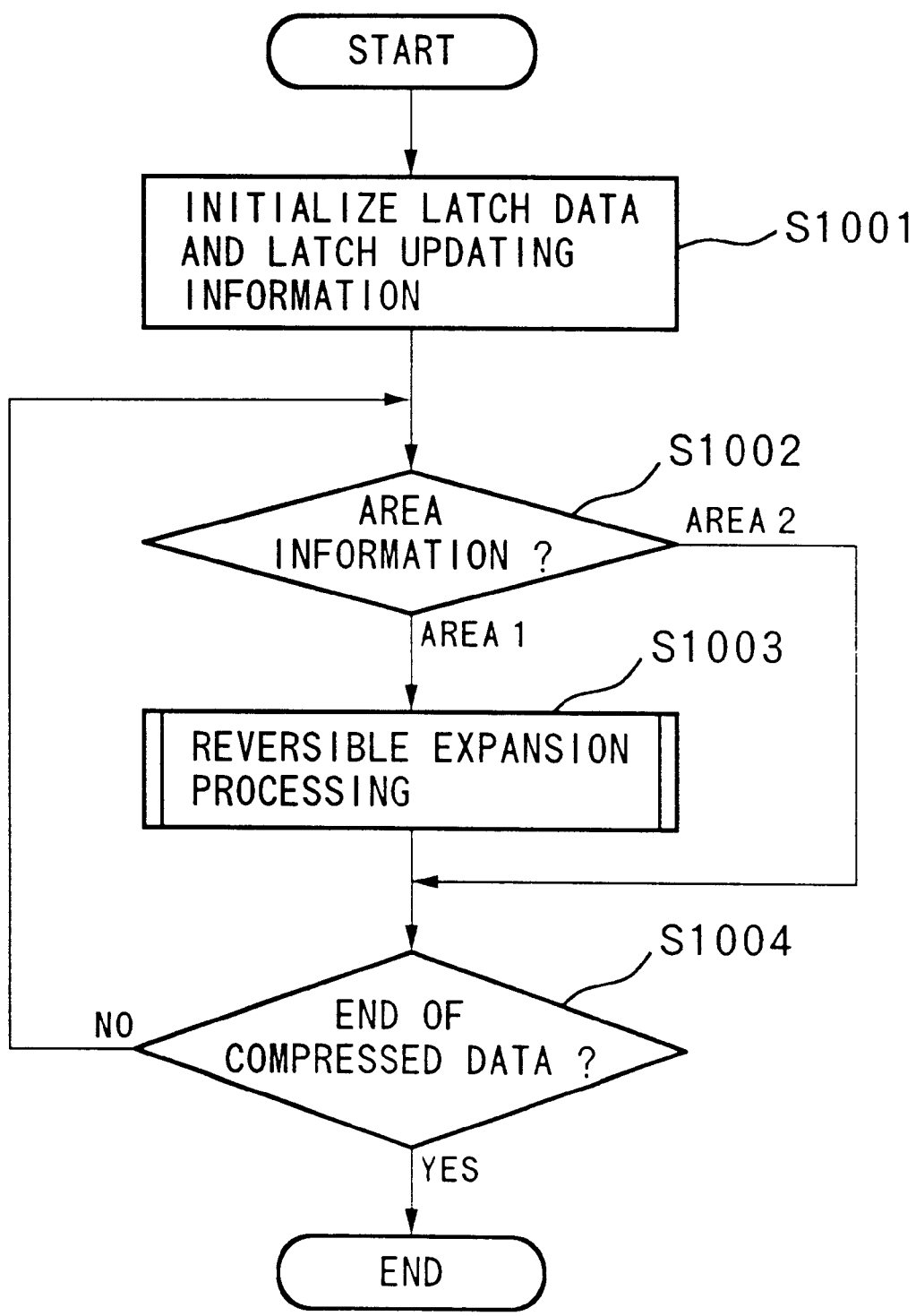
FIG. 11 is a flow chart showing a processing sequence for realizing a reversibly compressed data expansion section shown in FIG. 10 in a software manner.

FIG. 11 is a flow chart showing a processing sequence for realizing the reversibly compressed data expansion section 904 in a software manner. Note that data names are the same as those in the second embodiment.

Referring to FIG. 11, in this embodiment, in step S1001, "next", "former[ ]", and "turn" are initialized as in step S402 in the second embodiment. If it is determined in step S1002 that area information of a processing block read out from the second storage section 9 indicates "area 1", expansion processing is executed in step S1003, as will be described in detail later, and the flow then advances to step S1004; if the area information indicates "area 2", the flow jumps to step S1004.

In step S1004, it is checked if expansion of all compressed data is completed. If NO In step S1004, the flow returns to step S1002; otherwise, the processing is ended.

Figure 12:
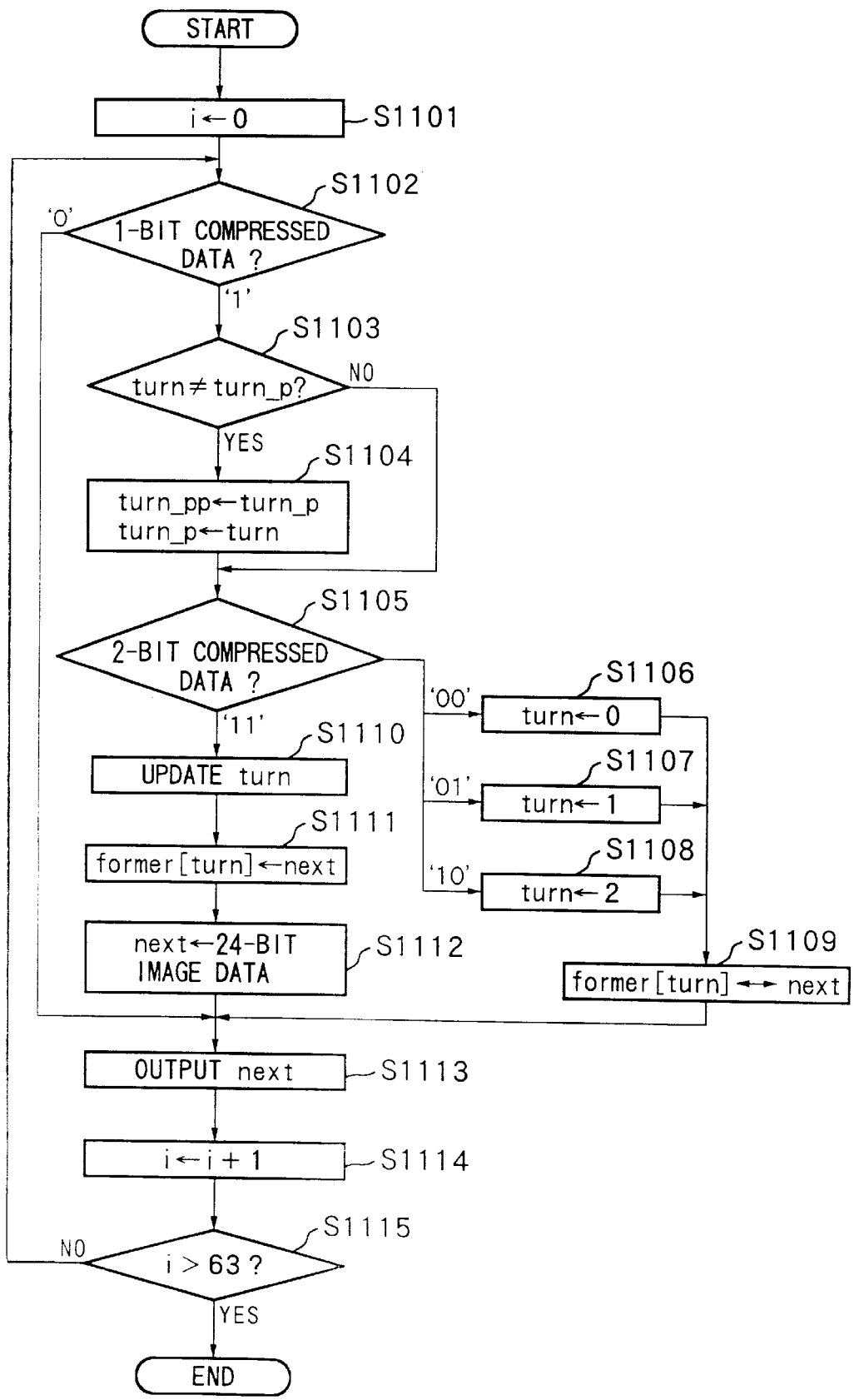
FIG. 12 is a flow chart showing a sequence of reversible expansion processing shown in FIG. 11.

FIG. 12 is a flow chart showing a sequence of reversible expansion processing (step S1003).

Referring to FIG. 12, in this embodiment, a value '0' is set in a counter i in step S1101. Note that the counter i counts the number of processed pixels, and in this embodiment, pixels are processed in the order shown in FIG. 9 as in the second embodiment.

In step S1102, 1-bit data received from the first storage section 8 is checked. If the received data is '1', the flow advances to step S1103; if the received data is '0', the flow jumps to step S1113.

If the 1-bit data received from the first storage section 8 is '1', "turn" and "turn_p" are compared with each other in step S1103. If the two data coincide with each other, the flow advances to step S1105; otherwise, the flow advances to step S1104. In step S1104, a latch number of "turn_p" is substituted in "turn_pp", and thereafter, a latch number of "turn" is substituted in "turn_p". Note that this processing is to inhibit giving of the same value to "turn" and "turn_p".

If it is determined in step S1105 that 2-bit data received from the first storage section 8 is '00', the flow advances to step S1106; if the data is '01', the flow advances to step S1107; if the data is '10', the flow advances to step S1108; or if the data is '11', the flow advances to step S1110.

If the 2-bit data is '00', a value '0' is substituted in "turn" in step S1106, and the flow then advances to step S1109. If the 2-bit data is '01', a value '1' is substituted in "turn" in step S1107, and the flow then advances to step S1109. If the 2-bit data is '10', a value '2' is substituted in "turn" in step S1108, and the flow then advances to step S1109. More specifically, when the 2-bit data received from the first storage section 8 is '00', '01', or '10', pixel data to be output is one latched in "former[0]", "former[1]", or "former[2]".

In step S1109, pixel data latched in "next" is replaced with pixel data latched in "former[turn]", and thereafter, the flow advances to step S1113.

On the other hand, if the 2-bit data received from the first storage section 8 is '11', a latch number different from those of "turn_p" and "turn_pp" is set in "turn" in step S1110, pixel data latched in "next" is substituted in "former[turn]" in step S1111, and 24-bit pixel data received from the first storage section 8 is substituted in "next" in step S1112. Thereafter, the flow advances to step S1113. Since the same value is inhibited from being set in "turn_p" and "turn_pp" in steps S1103 and S1104, "turn" assumes one of values '0', '1', and '2' in step S1110.

In step S1113, pixel data latched in "next" is output as an expansion result, and in step S1114, the counter i is incremented. In step S1115, the value of the counter i is checked. If i≦63, the flow returns to step S1102 to process the remaining pixels; if i>63, the flow returns to the processing sequence shown in FIG. 11.

In this manner, in order to prevent deterioration of image quality, and to achieve a target compression ratio, compressed data obtained by reversibly compressing some image data, and irreversibly compressing some other image data can be properly expanded according to the compression methods.

Since reversibly compressed data and irreversibly compressed data can be expanded in units of blocks, this embodiment is effective for both a natural image synthesized in a computer-created image and a computer-created image synthesized in a natural image.

Modification of First to Third Embodiments

In each of the above-mentioned embodiments, the memory is divided into segments using the segment controller, and new compressed data are overwritten in an order from segments storing ADCT-compressed data at the higher frequency side, thereby achieving a target compression ratio. Alternatively, area information may be formed in the second storage section in the first compression processing to calculate an ADCT δ-factor for achieving a target compression ratio, and the target compression ratio may be achieved in the second compression processing. In this case, complicated memory control processing can be omitted.

In the first and second embodiments described above, reversibly compressed data output from the reversible compression section, i.e., the signals S2$a$ and S2$b$ are constituted by a flag system indicating ON/OFF ('0'/'1'), but may be constituted by a trigger system.

Figure 13:
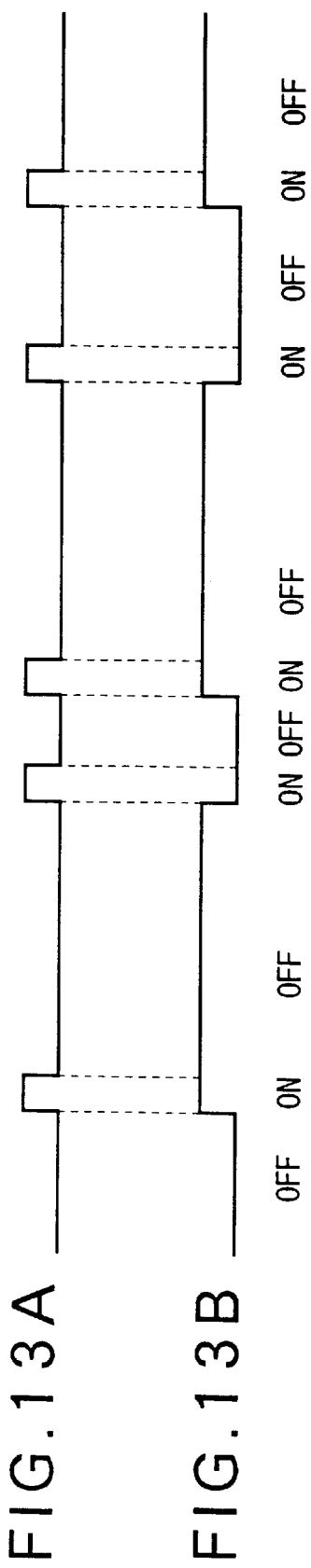
FIGS. 13A and 13B are charts for explaining a difference between a flag system and a trigger system.
Figure 14:
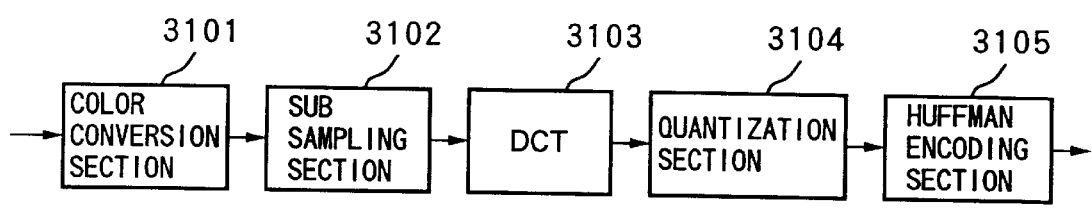
FIG. 14 is a block diagram showing an arrangement of an ADCT image compression apparatus.
Figure 15:
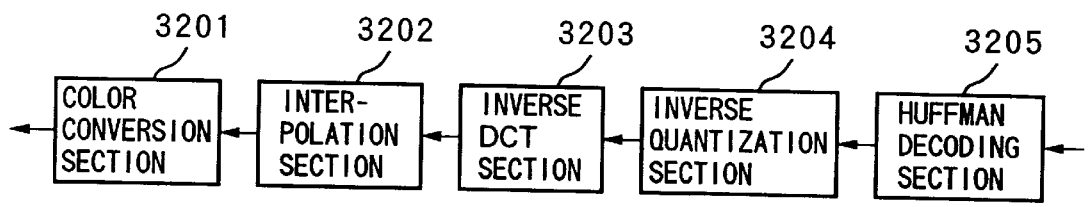
FIG. 15 is a block diagram showing an arrangement of an ADCT data expansion apparatus.

FIGS. 13A and 13B are charts for explaining a difference between the flag system and the trigger system. FIG. 13A shows the flag system, and FIG. 13B shows the trigger system.

As can be seen from FIGS. 13A and 13B, identical data tend to continue for a longer period in the trigger system than in the flag system. By utilizing this nature, the signals S2$a$ and S2$b$ may be subjected to another run length compression such as MH (Modified Huffman) to decrease the data amount.

The present invention is not limited to MH. For example, completed compressed data may be subjected to Huffman encoding or Lempel-Ziv encoding to be further compressed. Note that it is also effective to perform Huffman encoding or Lempel-Ziv encoding of the signal S2$c$.

Fourth Embodiment

Summary of Compression Method

A summary of a compression method according to the present invention to be used in the following embodiments will be described below.

Figure 27A:
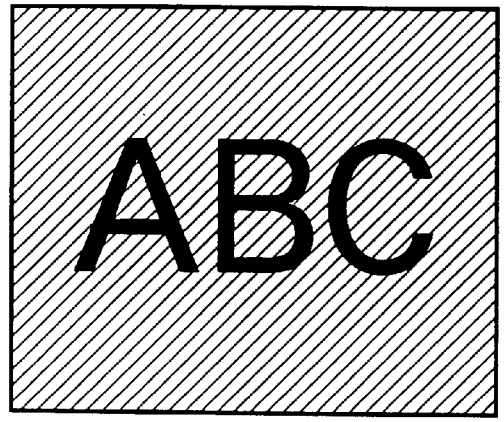
FIGS. 27A and 27B are views showing typical computer-created images.
Figure 27B:
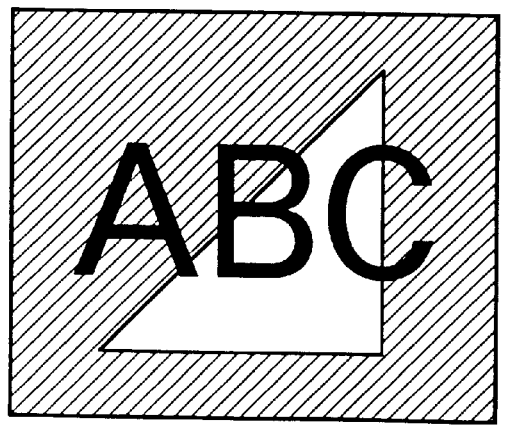

In a so-called CG image created on a computer, a single figure is normally expressed by a uniform color although the image is a "full-color image". As a typical computer-created image, an image in which characters are formed on a background color, as shown in FIG. 27A, or an image in which a figure is formed on a background color, and characters are formed thereon, as shown in FIG. 27B, is proposed. More specifically, such an image has the following tendencies:

(a) An identical color tends to continue.
(b) Even if a color is changed from A to B, it tends to be returned to A again.

A checkerboard pattern is a typical example of (b).

Therefore, according to the present invention, when a pixel to be processed (to be referred to as a "pixel of interest" hereinafter) has the same color data as color data ($C_1$) of the immediately preceding pixel, the shortest code (e.g., '1') is output; when a pixel of interest has the same value as color data ($C_2$) of a pixel, which has color data different from $C_1$, and appears latest, the next shortest code (e.g., '01') is output; when a pixel of interest has the same value as color data ($C_3$) of a pixel, which has color data different from $C_2$ and $C_1$, and appears latest, the next shortest code (e.g., '001') is output; when a pixel of interest has color data different from $C_1$, $C_2$, and $C_3$, an unused code (e.g., '000') is output, and color data at that time is output. Thus, a computer-created image can be compressed at a high compression ratio without deteriorating image quality.

An image processing method and apparatus according to an embodiment using this compression method will be described in detail hereinafter with reference to the accompanying drawings.

Data Compression Apparatus

Figure 28:
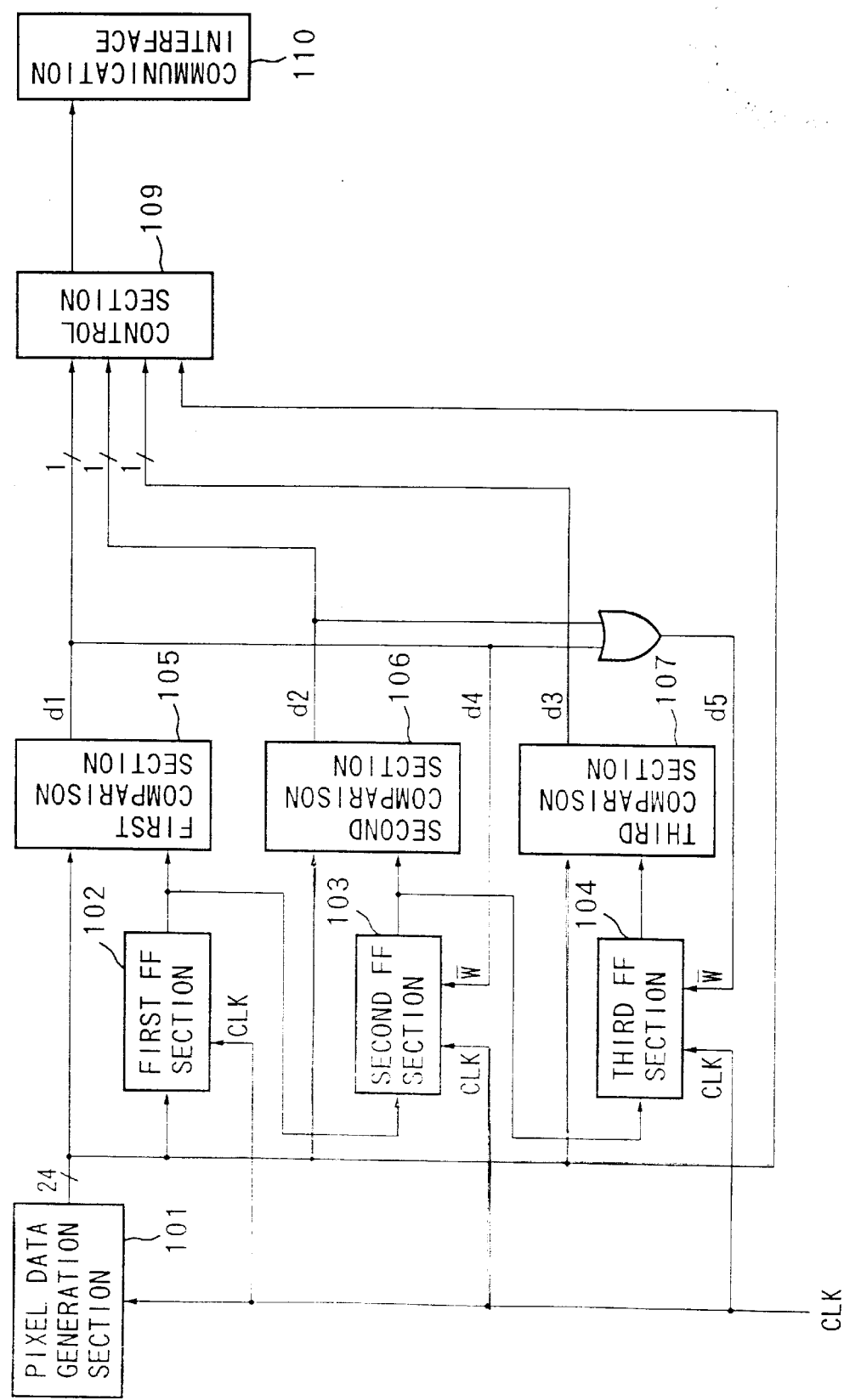
FIG. 28 is a block diagram showing an arrangement of a data compression apparatus according to the fourth embodiment of the present invention.

FIG. 28 is a block diagram showing an arrangement of a data compression apparatus which can realize the present invention.

Reference numeral 101 denotes a pixel data generation section for generating 24-bit (8 bits/color) pixel data per pixel in the NTSC-RGB format.

Reference numeral 102 denotes a first flip-flop (to be referred to as "FF" hereinafter) section for holding pixel data (24 bits) from the pixel data generation section 101 in synchronism with the trailing edge of a pixel generation clock (to be simply referred to as "clock" hereinafter) CLK. Reference numeral 103 denotes a second FF section for receiving an output dl from a first comparison section 105 as a write enable signal, and holding pixel data output from the first FF section 102 in synchronism with the clock CLK. Reference numeral 104 denotes a third FF section for receiving an OR of the output d1 from the first comparison section 105 and an output d2 from a second comparison section 106 as a write enable signal, and holding pixel data output from the second FF section 103 in synchronism with the clock CLK.

Reference numeral 105 denotes a first comparison section for comparing pixel data from the pixel data generation section 101 and pixel data held in the first FF section 102, and for, when the two data are equal to each other, outputting '1'; otherwise, outputting '0'. Reference numeral 106 denotes a second comparison section for comparing pixel data from the pixel data generation section 101 and pixel data held in the second FF section 103, and for, when the two data are equal to each other, outputting '1'; otherwise, outputting '0'. Reference numeral 107 denotes a third comparison section for comparing pixel data from the pixel data generation section 101 and pixel data held in the third FF section 104, and for, when the two data are equal to each other, outputting '1'; otherwise, outputting '0'.

Reference numeral 109 denotes a control section for receiving the comparison results from the three comparison sections, and pixel data from the pixel data generation section 101, and outputting encoded data. More specifically, the control section 109 can be realized by, e.g., a PLD.

Reference numeral 110 denotes a communication interface for adding a communication header to encoded data input from the control section 109, and transmitting the data.

As described above, the write enable signal of the second FF section 103 can be controlled by the comparison result from the first comparison section 105, and the write enable signal of the third FF section 104 can be controlled by the comparison results from the first and second comparison sections 105 and 106. Alternatively, the control section 109 may output write enable signals for the second and third FF sections 103 and 104. Furthermore, a memory may be arranged in place of the communication interface 110.

Figure 29:
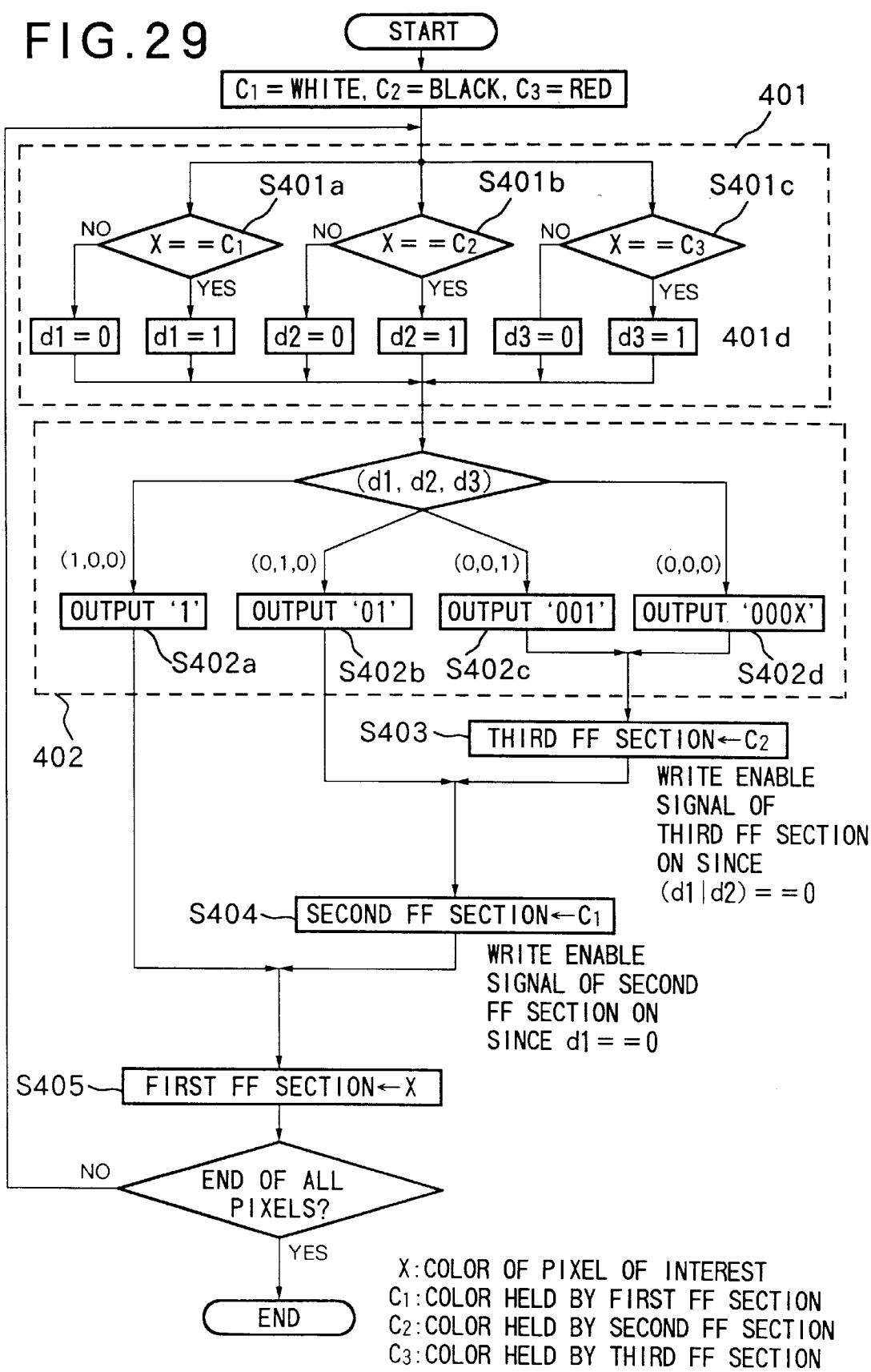
FIG. 29 is a flow chart showing an encoding processing sequence of a control section shown in FIG. 28.

FIG. 29 is a flow chart showing an encoding processing sequence of the control section 109.

Referring to FIG. 29, a block 401 corresponds to the comparison sections 105, 106, and 107 shown in FIG. 28. In the block 401, reference symbol X denotes pixel data of interest; $C_1$, data held by the first FF section 102; $C_2$, data held by the second FF section 103; and $C_3$, data held by the third FF section 104. A comparison result group 401d in the block 104 is supplied to the control section 109.

Also, a block 402 corresponds to the control section 109. The block 402 outputs '1' when (d1, d2, d3)=(1, 0, 0); '01' when (d1, d2, d3)=(0, 1, 0); '001' when (d1, d2, d3)=(0, 0, 1); and '000X' (all 27 bits) when (d1, d2, d3)=(0, 0, 0). In this case, data such as (1, 1, 0) is not considered since the first, second, and third FF sections 102, 103, and 104 always have different values, and two signals never become '1' at the same time.

In step S403, when (d1, d2, d3)=(0, 0, 1) or (0, 0, 0), since the write enable signal (d1|d2) to the third FF section 104 is '0', data held by the third FF section 104 is rewritten with data $C_2$ as an output from the second FF section in synchronism with the trailing edge of the clock CLK corresponding to the beginning of the next pixel.

In step S404, when (d1, d2, d3)=(0, 1, 0), (0, 0, 1) or (0, 0, 0), since the write enable signal (d1) to the second FF section 103 is '0', data held by the second FF section 103 is rewritten with data $C_1$ as an output from the first FF section in synchronism with the trailing edge of the clock CLK corresponding to the beginning of the next pixel.

In step S405, the value X of the pixel of interest is written in the first FF section 102.

The above-mentioned processing is executed every time pixel data is generated by the pixel data generation section 101. The above-mentioned encoding processing state will be described below with reference to an actual data example.

FIG. 30A shows an example of pixel data generated by the pixel data generation section 101. Time lapses from the left to the right in FIG. 30A, and data are output from the pixel data generation section 101 like A, A, B, B, B, . . . in synchronism with the clocks CLK. A, B, C, and D represent different 24-bit pixel data, and for example, data A has a value '110100001011011100001111'.

FIG. 30B shows changes of data held in the first, second, and third FF sections 102, 103, and 104. Note that white, black, and red at the left ends of the charts represent reset values of the FF sections. In this embodiment, the first FF section 102 is reset to white '111111111111111111111111', the second FF section 103 is reset to black '000000000000000000000000', and the third FF section 104 is set to red '111111110000000000000000'.

Figure 31:
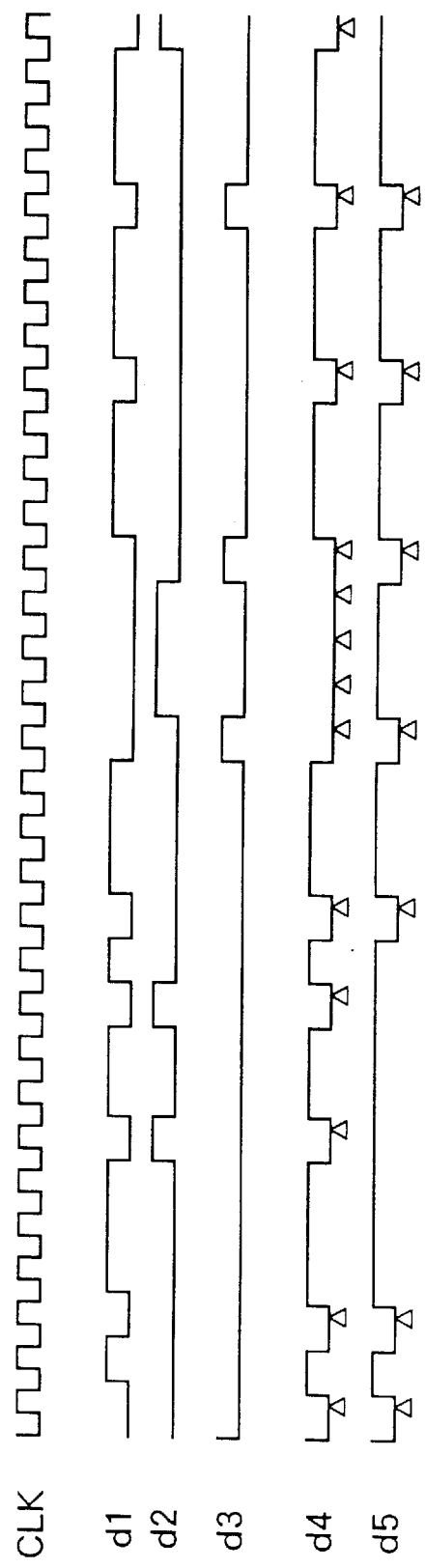
FIG. 31 is a timing chart of the signals shown in FIG. 28.

FIG. 31 shows changes of the data shown in FIGS. 30A and 30B.

Referring to FIG. 31, reference symbol CLK denotes a clock indicating one pixel; d1, an output from the first comparison section 105; d2, an output from the second comparison section 106; and d3, an output from the third comparison section 107. Reference numeral d4 denotes a write enable signal for the second FF section 103, which signal coincides with the output from the first comparison section 105. Reference numeral d5 denotes a write enable signal for the third FF section 104, which signal corresponds to an OR of the outputs from the first and second comparison sections 105 and 106. Note that the signals d1 to d5 change to be slightly delayed from the waveform of the clock CLK.

Encoding processing of the data shown in FIG. 30A will be described below with reference to the flow chart shown in FIG. 29.

The first data A (1301) is different from any of $C_1$="white", $C_2$="black", or $C_3$="red". Therefore, as shown in FIG. 31, all the signals d1, d2, and d3 are '0' (401). According to the block 402 in FIG. 29, when (d1, d2, d3)=(0, 0, 0), the flow branches to step S402d to output '000X'. Therefore, in this case, '000A' is output. More specifically, 27-bit data '000110100001011011100001111' is output. In this case, the write enable signal d5 goes LOW since (d1|d2)='0', and data output from the first FF section 102 is input to the third FF section 104 in synchronism with the trailing edge of the next clock CLK. The content of the first FF section 102 is rewritten with data from the pixel data generation section 101 in accordance with the clocks CLK. Therefore, in the state of $C_1$=A, $C_2$="white", and $C_3$="black", processing of data A (1302) as the next pixel is started.

Note that a mark Δ in FIG. 31 indicates a point where the write enable signal is at LOW level, and the clock CLK goes LOW.

When the data A (1302) is processed, since (d1, d2, and d3)=(1, 0, 0) is obtained, the flow branches to step S402a to output '1'. In this case, since the signals d4 and d5 are at HIGH level, the contents of the second and third FF sections 103 and 104 are not rewritten.

In FIG. 30B, in this embodiment, the content of the first FF section 102 is rewritten in synchronism with the clock CLK. However, the first FF section 102 may be write-enabled by a signal from the first comparison section 105. Also, arrows in the outputs $C_2$ and $C_3$ represent that data are left unchanged.

Processing of pixel data 1303 in FIG. 30A will be described below. At this time, $C_1$=B, $C_2$=A, and $C_3$="white", and X=A, (d1, d2, d3)=(0, 1, 0). Therefore, the flow branches to step S402b to output '01'. In this case, since (d1|d2)='1', the content of the third FF section 104 is not rewritten, and since d1='1', data in the second FF section 103 is rewritten.

Processing of pixel data 1304 in FIG. 30A will be described below. At this time, $C_1$=C, $C_2$=B, and $C_3$=A, and X=A, (d1, d2, d3)=(0, 0, 1). Therefore, the flow branches to step S402c to output '001'. In this case, since (d1|d2)='1' and d1='1', both the signals d4 and d5 go HIGH, and the contents of the second the third FF sections 103 and 104 are rewritten.

Thus, all the cases of code patterns '1', '01', '001', and '000X' have been described.

As can be seen from FIG. 30B, the first, second, and third FF sections 102 ($C_1$), 103 ($C_2$), and 104 ($C_3$) always hold different values. With this processing, data shown in FIG. 30A, i.e., 32×24=768 bits, are compressed to data shown in FIG. 32, i.e., 148 bits, and a compression ratio of about 1/5 is achieved.

In the data example shown in FIG. 30A, a continuous string of single data is shortened for the purpose of descriptive convenience. However, since actual data includes a longer string of single data, the compression ratio can be further increased, and a compression ratio as high as about 1/20 can be achieved even for a considerably fine image.

Figure 33:
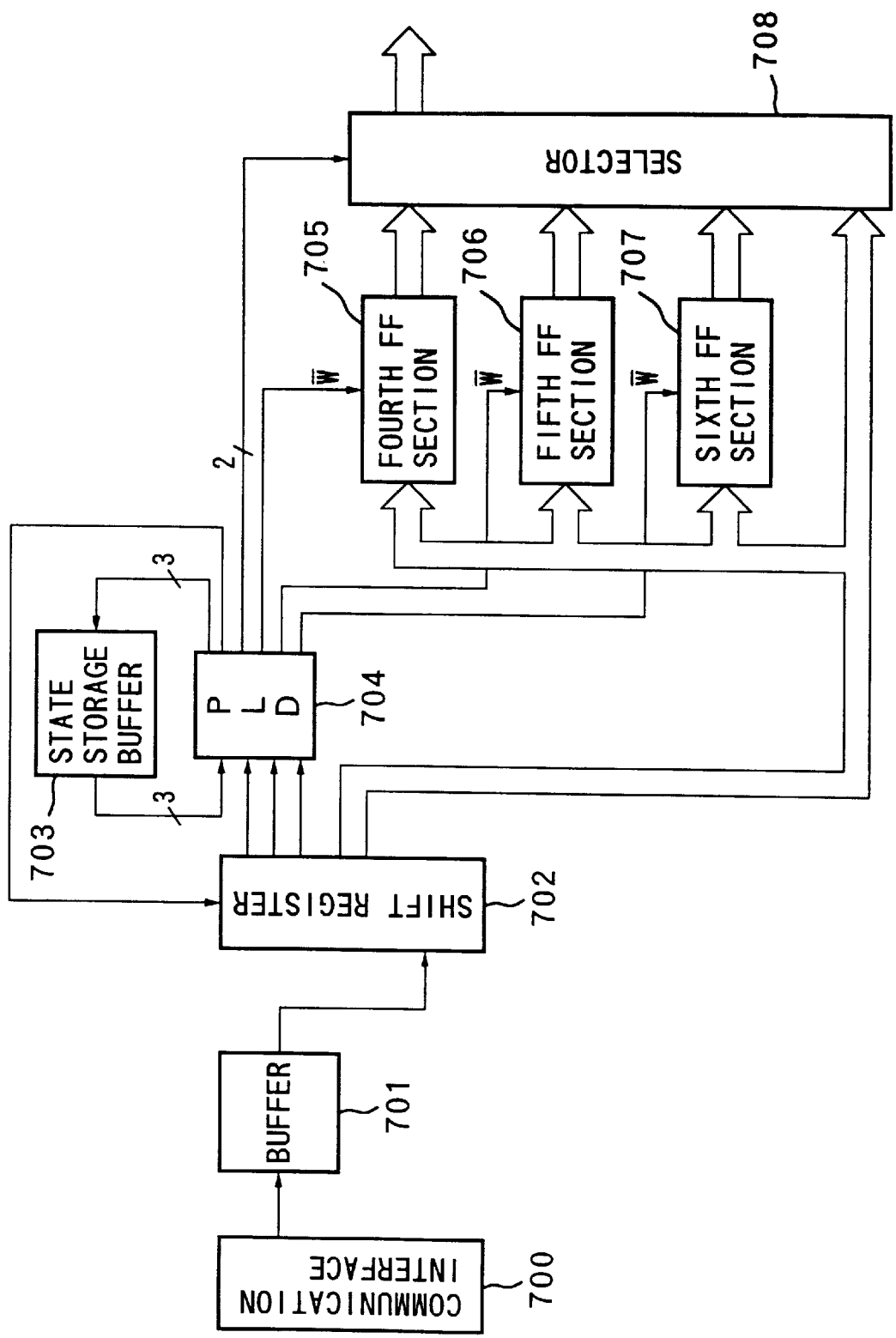
FIG. 33 is a block diagram showing an arrangement of a data expansion apparatus for decoding encoded data output from the data compression apparatus shown in FIG. 28.

FIG. 33 is a block diagram showing an arrangement of a data expansion apparatus for decoding encoded data output from the data compression apparatus shown in FIG. 28. Referring to FIG. 33, no data exchange processing among FF sections is performed unlike in an encoding mode. In the data expansion apparatus, a parameter representing the priority order of each FF section, called "state", is provided, and decoding processing is performed by utilizing this parameter.

Reference numeral 700 denotes a communication interface for analyzing a communication header of received encoded data. Reference numeral 701 denotes a buffer for buffering data from the communication interface 700. Reference numeral 702 denotes a shift register for converting serial data input from the buffer 701 into parallel data.

Reference numeral 703 denotes a state storage buffer for storing the present state of six different states representing the priority order of three FF sections. Reference numeral 704 denotes a PLD for receiving 3-bit data from the state storage buffer 703, and upper 3 bits of encoded data in the shift register 702, and outputting 3-bit data representing the next state, a 2-bit select signal for selecting color data, write enable signals for three FF sections, and a shift count or a shift clock signal for the shift register 702.

Reference numerals 705 to 707 denote fourth to sixth FF sections for, when corresponding write enable signals from the PLD 704 are at LOW level, holding data in synchronism with the trailing edge of a clock, respectively.

Reference numeral 708 denotes a selector for selecting and outputting one of four color signals (24-bit parallel data from the fourth to sixth FF sections 705 to 707, and the shift register 702) in accordance with the select signal from the PLD 704.

FIG. 34 shows the processing content of the PLD 704. Referring to FIG. 34, if encoded data '01*' is input when the state (priority order) is '0', the PLD outputs a select signal for selecting color data $C_5$ of the fifth FF section 706, sets the write enable signals to be (H, H, H) so as not to rewrite the contents of any latches, changes the state to be '2', and outputs a shift count '2' of the shift register 702.

As another example, if encoded data '000' is input when the state is '4', the PLD outputs a select signal for selecting 24-bit parallel data from the shift register 702. In this case, since the priority order is ($U_2$, $U_3$, $U_1$), the PLD sets the write enable signals to be (L, H, H) to rewrite the content of the fourth FF section 705 so as to rewrite the oldest data $U_1$, and changes the state to be '0' so as to set the priority order ($U_1$, $U_2$, $U_3$). Then, the PLD outputs a shift count '72' of the shift register 702.

Figure 35:
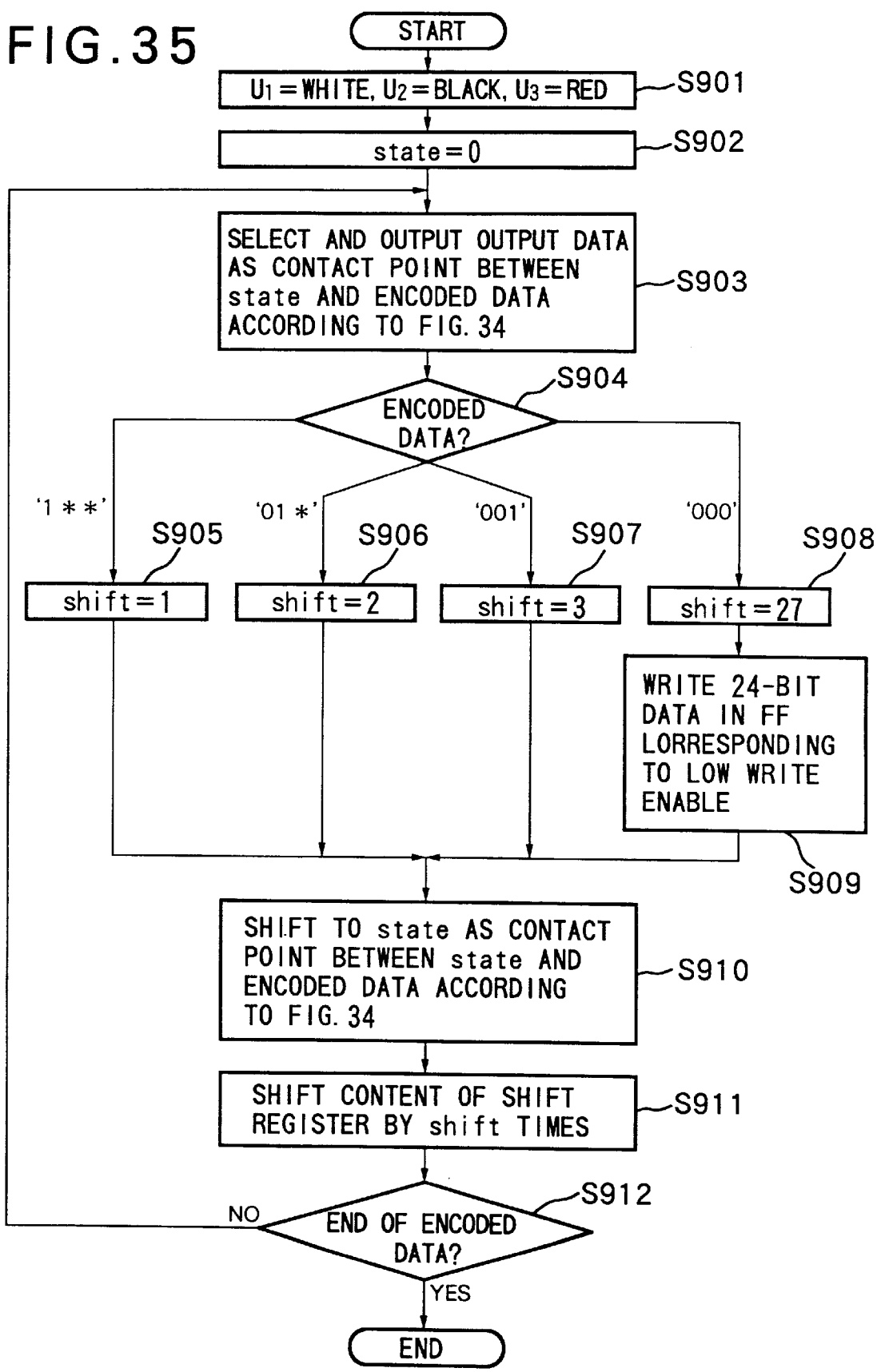
FIG. 35 is a flow chart showing decoding processing of the PLD shown in FIG. 33.

FIG. 35 is a flow chart showing decoding processing. Decoding processing of encoded data shown in FIG. 32 will be exemplified below with reference to FIG. 35.

The same reset values (white, black, red) as in the encoding mode are held in the fourth, fifth, and sixth FF sections 705, 706, and 707 (step S901). Therefore, $U_1$="white", $U_2$="black", and $U_3$="red".

The state is reset to '0' (step S902). If encoded data shown in FIG. 32 is input to the shift register 702, upper 3-bit data to be processed first is '000'. According to FIG. 34, color data A parallelly output to the 4th to 47th pins of the shift register 702 is selected in accordance with an instruction from the PLD 704 (step S903).

Since the write enable signals are (H, H, L) via steps S904 and S908, the color data A is written in the sixth FF section 707 (step S909), '3' is substituted in the state (step S910), and the shift register 702 is shifted 27 times (step S911).

The next data is '100', and coincides with '1'. According to FIG. 34, if '1' is input when the state=3, data $U_3$, i.e., the sixth FF section 707 is selected to output the data A, none of the FF sections are rewritten, and the state is left unchanged. Since the shift count is '1', the shift register is shifted once, and the next data is '000'.

When the state=3, and the next data is '000', 24-bit data B in the shift register 702 is selected, color data B is substituted in the fifth FF section 706, the state is changed to be '4', and the shift register is shifted by 27 bits.

The next data is '111'. Since this data coincides with '1**', data $U_2$ is selected, the state is left unchanged, and the shift register is shifted by 1 bit.

Since the following data are '110' and '101', the same processing is repeated twice. Thereafter, the next data is '011', and coincides with '01*'. If the data '01*' is input when the state=4, data $U_3$ is selected, none of the FF sections are rewritten, the state is changed to be '5', and the shift register is shifted twice.

Figure 36:
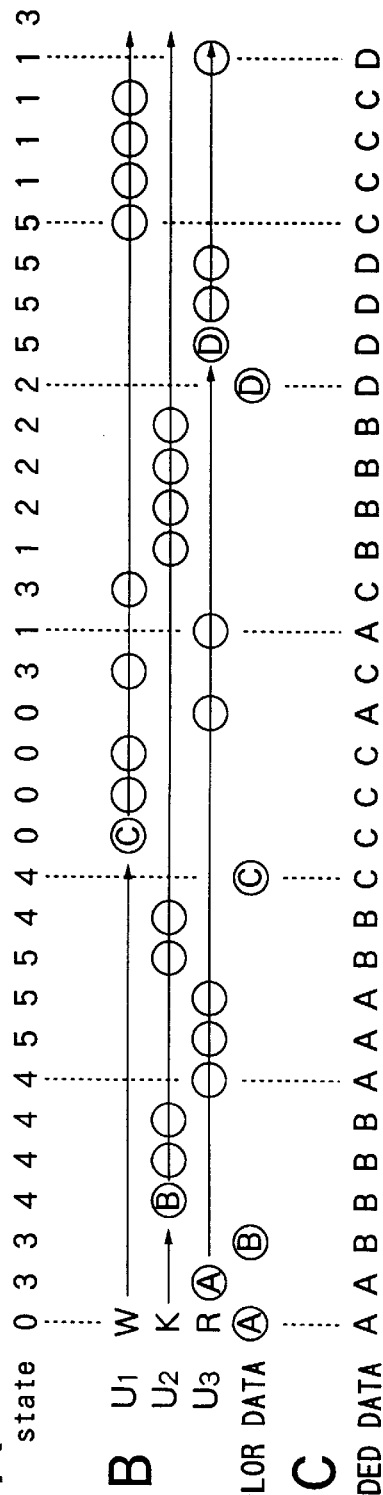
FIGS. 36A, 36B, and 36C are views showing a decoding state according to the fourth embodiment.

With the above-mentioned processing, decoded data (FIG. 36C) which is the same as that before encoding can be obtained via processes shown in FIGS. 36A to 36C. FIG. 36A shows the change of the state, and FIG. 36B shows the changes of the FF sections. In FIG. 36B, a symbol with a mark ○ represents color data selected at that time. Arrows indicate that data are left unchanged. As can be apparent from the above description, the number of times of rewriting of the FF sections can be greatly decreased by utilizing the "state" parameter.

Fifth Embodiment

An application of multi-value image compression using the above-mentioned reversible compression (which will sometimes be referred to as "CG compression" hereinafter) will be described below.

Compression Processing

A raster-block conversion section for holding pixel data groups each including m (horizontal)×n (vertical) input pixel data (to be referred to as a "block" hereinafter), and one pixel type information group per pixel (a natural image pixel will be defined as "pixel type A", and another image will be defined as "pixel type B") is arranged, and when all pieces of pixel type information in a block are "pixel type A", ADCT-compressed data is output.

On the other hand, when all pieces of pixel type information in a block are "pixel type B", a CG-compressed data amount D is compared with a given limit value L, and when D≦L, CG-compressed data is output; when D>L, ADCT-compressed data is output.

When a single block includes pixel data of both pixel types A and B, pixel data of the pixel type A is replaced with predetermined pixel data a, and pixel data of the pixel type B, which data has the same value as the pixel data a is replaced with predetermined pixel data β. The CG-compressed data amount D at that time is compared with the given limit value L. When D≦L, CG-compressed data of the substituted pixel data group are output, and ADCT-compressed data of a pixel data group, which is interpolated excluding pixel data of the pixel type B, are output. When D>L, ADCT-compressed data is output.

Also, a compression memory for storing the output ADCT-compressed data and CG-compressed data is arranged. Furthermore, a block map memory which stores 1-bit data per block, i.e., a signal '0' for a block for which CG-compressed data is output, and a signal '1' for another block, is arranged.

ADCT-compressed data are divided into p Huffman codes, q Huffman codes, r Huffman codes, . . . , and are stored in the compression memory together with the CG-compressed data. The compression memory is controlled by a segment controller, and the write addresses of compressed data are stored in a segment information table.

When the memory capacity runs short during the above-mentioned compression processing, new compressed data are overwritten on least important divided ADCT-compressed data in turn with reference to the segment information table, thereby achieving a constant memory amount.

Expansion Processing

One-bit data "blockmap" is read out from the block map memory. When the data "blockmap" is '1', ADCT-compressed data read out from the compression memory are expanded, and the expanded data are written in a block-raster conversion section. When the data "blockmap" is '1', CG-compressed data read out from the compression memory are expanded, and pixel type information is analyzed to form a pixel type information bit map.

If the formed bit map indicates at least one pixel of the pixel type A, ADCT-compressed data read out from the compression memory are expanded. As for a pixel corresponding to the pixel type A indicated by the bit map, ADCT expanded data are written in the block-raster conversion section, and as for a pixel corresponding to the pixel type B, CG expanded data are written.

When all pixels of the formed bit map indicate the pixel type B, CG expanded data are written in the block-raster conversion section.

In the above-mentioned compression/expansion processing, a problem associated with image quality or a compressed data amount, which is posed by a block including both the pixel types A and B, is solved by replacing and CG-compressing pixel data, and interpolating and ADCT-compressing pixel data. Since pixel type data per pixel, which is required since the two different kinds of compressed data are used, can be inserted in CG-compressed data, no extra bit map memory is required. Furthermore, when the CG-compressed data amount D exceeds the limit value L, the compression method is switched to the ADCT compression method, thereby achieving a constant memory amount.

Note that the raster-block conversion section, and the block-raster conversion section are buffers, and a single buffer may be used.

Image Data Compression Apparatus

An example of an apparatus for realizing the above-mentioned processing will be described below with reference to the drawings. In this embodiment, m=8 and n=8 are used. However, the present invention is not limited to this. (For example, when color different components are sampled by the ADCT method, m=16 and n=8 are selected.) The limit value L is assumed to be a sum of a constant value C indicating an allowable memory amount of a block to be processed, and a stock S as accumulated unused allowable memory amounts of blocks processed so far.

Figure 37:
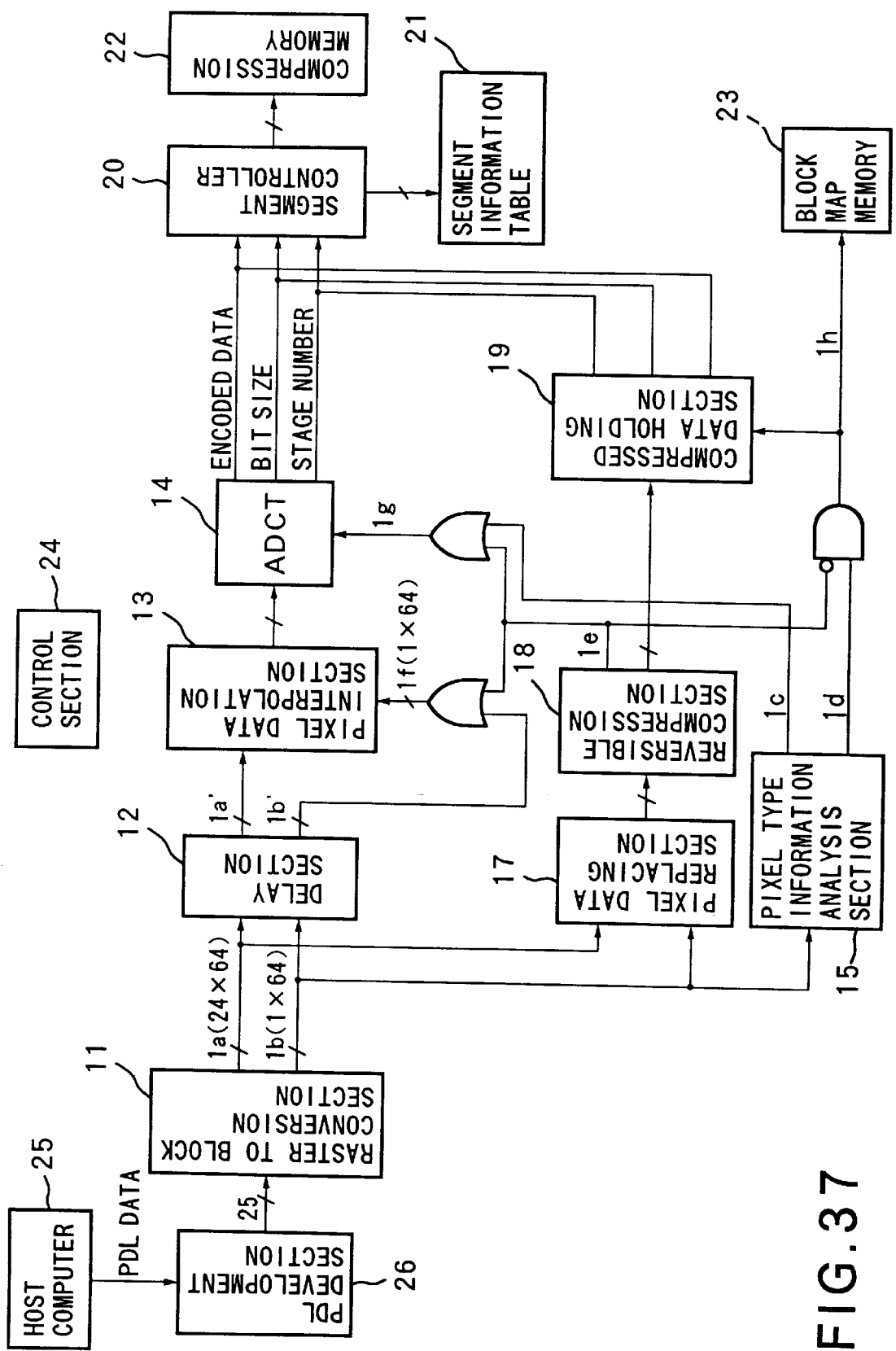
FIG. 37 is a block diagram showing an image data compression apparatus according to the fifth embodiment of the present invention.

FIG. 37 is a block diagram showing a functional arrangement of an image data compression apparatus according to this embodiment.

Reference numeral 11 denotes a raster-block conversion section for holding pixel data (24 bits per pixel) in the NTSC-RGB format, and pixel type information (1 bit per pixel; '1' as a pixel type A for a natural image pixel; '0' as a pixel type B for another image pixel) for eight lines, and parallelly generating pixel data 1a and pixel type information 1b for one block. In this embodiment, the pixel type information is generated by a page description language (PDL) development section 26 upon development of PDL data from a host computer 25.

Reference numeral 12 denotes a delay section for delaying and holding data (1a and 1b) for one block output from the raster-block conversion unit 11 since the necessity of ADCT compression processing (to be described later) is determined depending on the above-mentioned CG compression processing result.

Reference numeral 13 denotes a pixel data interpolation section for interpolating data 1a' read out from the delay section 12 under the control of a signal 1f. The signal 1f is 1-bit data per pixel generated by logically ORing signals 1b' and 1e. For example, when the signal 1b' shown in FIG. 38A is output, if the signal 1e is '0', the signal 1f shown in FIG. 38B is output; if the signal 1e is '1', the signal 1f shown in FIG. 38C is output. Data corresponding to a position where the signal 1f='0' is extracted and interpolated to eliminate a steep edge in a block. For example, in a certain method, an average value of pixel data corresponding to the signal 1f='1' may be calculated, and the calculated average value may be used as the value of pixel data corresponding to the signal 1f='0'.

Reference numeral 14 denotes an ADCT section for, when the signal 1g='1', receiving data from the pixel data interpolation section 13, executing ADCT compression processing (to be described later), dividing compressed data into many stages, and outputting divided compressed data. The signal 1g is 1-bit data per block, which is '1' when the signal 1e is '1' (i.e., the CG-compressed data amount D>L or D=64) or when a signal 1c is '1' (i.e., at least one pixel type signal 1b indicates the pixel type A).

Reference numeral 15 denotes a pixel type information analysis section for generating a 1-bit signal 1c per block which is '1' when at least one pixel type information 1b in a block to be processed indicates the pixel type A, or which is '0' for other cases, and a 1-bit signal 1d per block, which is '1' if at least one pixel type information 1b indicates the pixel type B, or which is '0' for other cases.

Reference numeral 17 denotes a pixel data replacing section for receiving pixel data 1a and pixel type information 1b from the raster-block conversion section 11, replacing pixel data having pixel type information 1b indicating the pixel type A with predetermined pixel data a, and replacing pixel data having the pixel type B and having the same value as that of the pixel data a with pixel data β.

Reference numeral 18 denotes a reversible compression section (the above-mentioned CG compression section) for receiving replaced data from the pixel data replacing section 17 (corresponding to the pixel data generation section 101 in FIG. 28), executing CG compression processing with reference to the signals 1c and 1d, and outputting compressed data (corresponding to the output from the control section 109 in FIG. 28) and an area discrimination result 1e. The discrimination result 1e is a 1-bit signal per block, which is '1' when D>L or D=64, or which is '0' in other cases.

Reference numeral 19 denotes a compressed data holding section for temporarily holding CG-compressed data for the purpose of synchronization, and for, when a signal 1h is '1', outputting compressed data. The signal 1h is a 1-bit signal per block, which is '1' when the signal 1e is '0' and the signal 1d is '1', or which is '0' in other cases.

Reference numeral 20 denotes a segment controller for receiving CG-compressed data from the compressed data holding section 19, and compressed data divided into many stages from the ADCT section 14, and controlling memory addresses for storing these data in a compression memory 22. Reference numeral 21 denotes a segment information table for storing segment information indicating divided areas of the compression memory 22, i.e., storing the write addresses of compressed data.

Reference numeral 22 denotes a compression memory, consisting of a plurality of small segments, for storing compressed data output from the segment controller 20 at designated addresses.

Reference numeral 23 denotes a block map memory for storing the signals $1h$ (1 bit per block) indicating pixel types in a block.

Reference numeral 24 denotes a control section for controlling the operation timings of the above-mentioned respective sections (e.g., synchronous control of block signals).

With the above arrangement, the divided ADCT-compressed data and CG-compressed data are stored in the compression memory 22, and when the memory capacity runs short during compression processing, new compressed data are overwritten on data in the least important stage of ADCT-compressed data in turn with reference to the segment information table, thereby achieving a constant memory amount.

Figure 39:
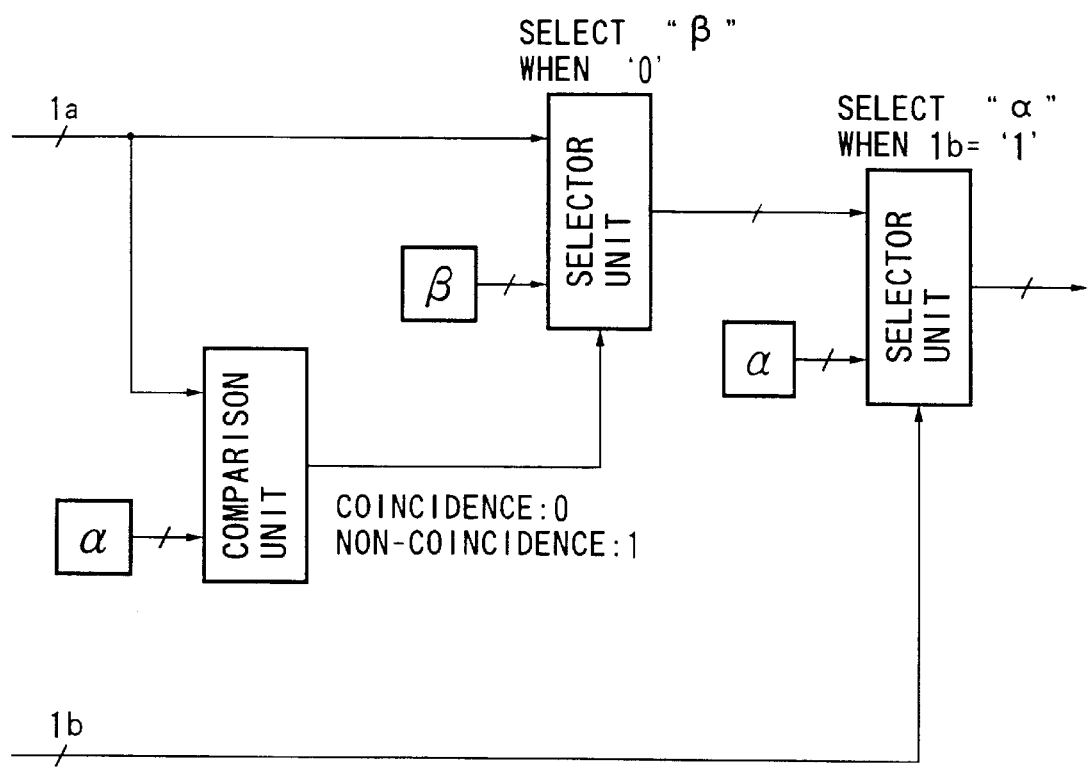
FIG. 39 is a detailed block diagram of a pixel data replacing section shown in FIG. 37.

FIG. 39 is a detailed block diagram of the pixel data replacing section 17.

The pixel data replacing section 17 compares each pixel in the input pixel data group $1a$ from the raster-block conversion section 11 with predetermined pixel data a. When the two data coincide with each other, the section 17 replaces the corresponding pixel data with predetermined pixel data β. When the pixel type signal $1b$ is '1', the section 17 replaces the pixel with the pixel data a.

With processing for replacing all pixels corresponding to the pixel type information='1' (i.e., natural image pixels) with pixel data a, the CG-compressed data amount D of an image including both the pixel types A and B can be prevented from being increased, and at the same time, the pixel type information can be inserted in compressed data. For this reason, although a slight error occurs, i.e., data of the pixel type B having the value of the pixel data a has the value of the pixel data β, such an error does not influence image quality. In this embodiment, a={127, 127, 127} and B={128, 128, 128} are set. However, the present invention is not limited to these.

Figure 40:
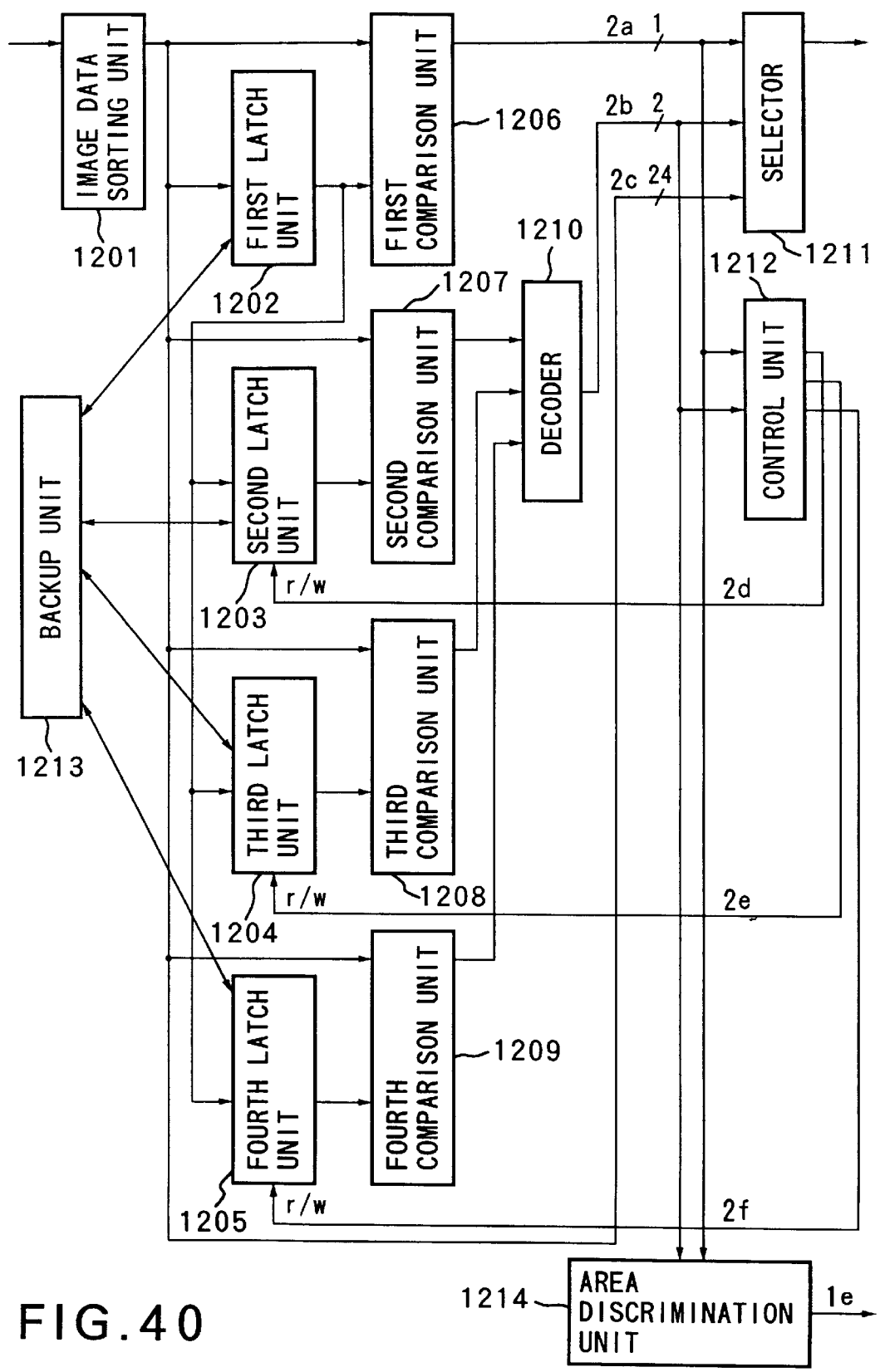
FIG. 40 is a detailed block diagram of a reversible compression section shown in FIG. 37.

FIG. 40 is a detailed block diagram of the reversible compression section 18. The basic arrangement in FIG. 40 is substantially the same as that in FIG. 28, except that four latches for storing color data and an area discrimination unit 1214 are arranged in FIG. 40.

Reference numeral 1201 denotes an image data sorting unit for sorting pixel data from the pixel data replacing section 17 in an order shown in, e.g., FIG. 41.

Reference numeral 1202 denotes a first latch unit for holding pixel data (24 bits) from the image data sorting unit 1201. Reference numerals 1203 to 1205 denote second to fourth latch units for holding pixel data (24 bits) output from the first latch unit 1202.

Reference numeral 1206 denotes a first comparison unit for comparing pixel data $2c$ from the image data sorting unit 1201 with pixel data held in the latch unit 1202, and outputting a signal $2a$, which is '0' when the two data are equal to each other; which is '1' when the two data are different from each other.

Reference numeral 1207 to 1209 denote second to fourth comparison units for respectively comparing pixel data from the image data sorting unit 1201 with pixel data held in the second to fourth latch units 1203 to 1205, and outputting '0' when the two data are equal to each other; '1' when the two data are different from each other.

Reference numeral 1210 denotes a decoder for receiving the comparison results from the second, third, and fourth comparison units 1207, 1208, and 1209, and outputting a 2-bit signal $2b$. Note that the signal $2b$ is '00' when the second comparison unit 1207 detects a coincidence; it is '01' when the third comparison unit 1208 detects a coincidence; it is '10' when the fourth comparison unit 1209 detects a coincidence; and it is '11' when none of comparison units detect a coincidence.

Reference numeral 1211 denotes a selector for selecting and outputting one of the comparison result $2a$ from the first comparison unit 1206, the signal $2b$ from the decoder 1210, and pixel data $2c$ output from the image data sorting unit 1201.

Reference numeral 1212 denotes a control unit for receiving the signals $2a$ and $2b$, outputting write signals for the second, third, and fourth latch units 1203, 1204, and 1205, and controlling the selector 1211. If the relationship between the inputs $2a$ and $2b$, and the write signals $2d$, $2e$, and $2f$ is expressed by "$2a$, $2b$: $2d$, $2e$, $2f$", when "0, : 0, 0, 0", i.e., the signal $2a$ is '0', none of the latch units are rewritten. When "1, 00: 1, 0, 0", i.e., $2a$='1' and $2b$='00', the write signal $2d$ for the second latch unit 1203 is set to be '1'; when "1, 01: 0, 1, 0", i.e., $2a$='1' and $2b$='01', the write signal $2e$ for the third latch unit 1204 is set to be '1'; when "1, 10: 0, 0, 1", i.e., $2a$='1' and $2b$='10', the write signal $2f$ for the fourth latch unit 1205** is set to be '1'; and when $2a$='1' and $2b$='11', the write signal $2f$ for the latch unit which holds the oldest color data is set to be '1'.

Reference numeral 1213 denotes a backup unit for backing up the contents of the first to fourth latch units 1202 to 1205 before processing, and for, when the discrimination result indicates "area 2" after processing, restoring data before processing to the first to fourth latch units 1202 to 1205.

Reference numeral 1214 denotes an area discrimination unit for receiving the signals $2a$ and $2b$, and outputting an area discrimination signal $1e$ (0: area 1, 1: area 2).

When output pixel data are compressed by the reversible compression section 18 with the above-mentioned arrangement, the compressed data can be expanded without changing any bits.

Figure 42:
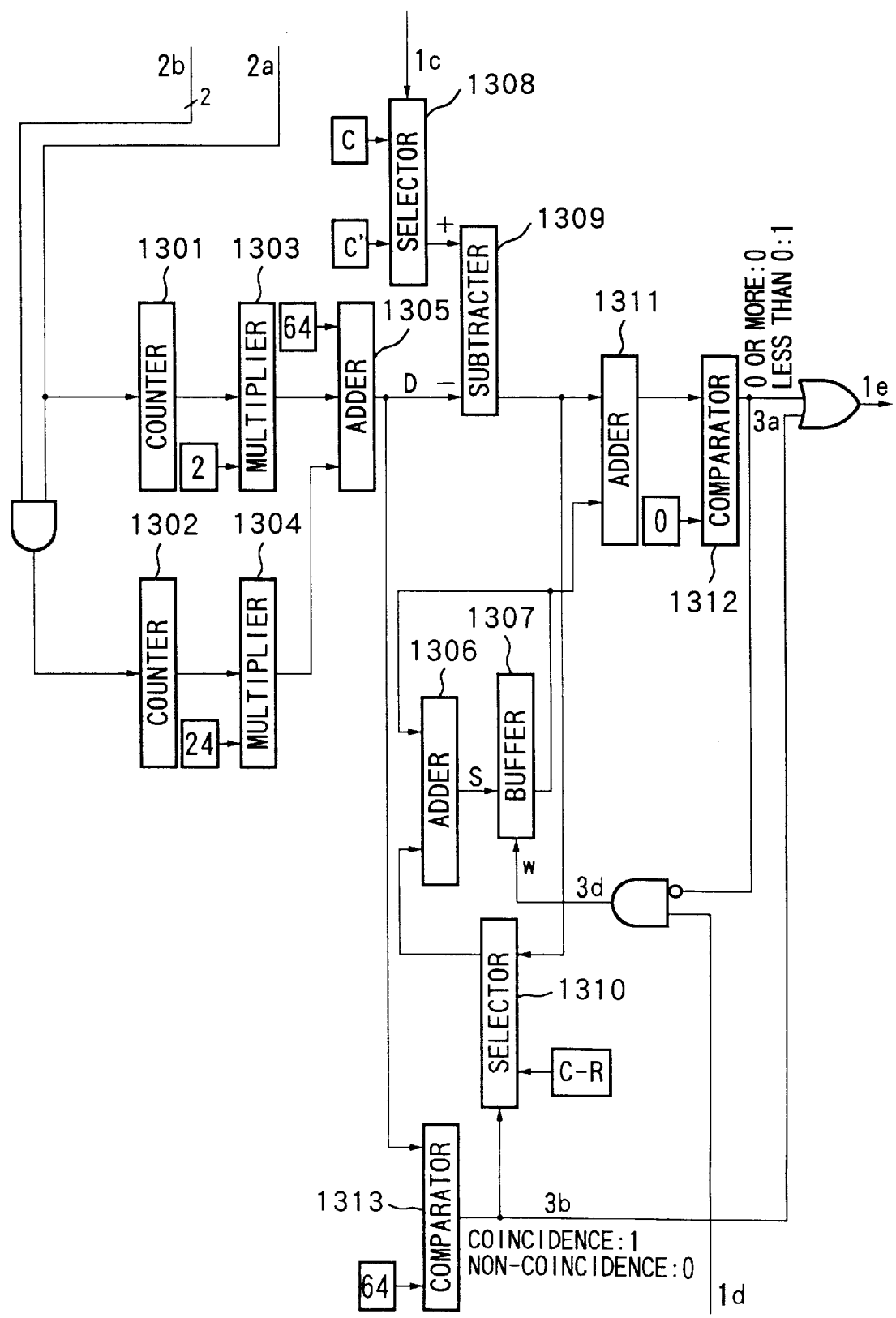
FIG. 42 is a detailed block diagram of an area discrimination unit shown in FIG. 40.

FIG. 42 is a detailed block diagram of the area discrimination unit 1214 shown in FIG. 40.

Reference numeral 1301 denotes a counter for counting the number of times of the signal $2a$='1' (i.e., the number of color change points). Reference numeral 1302 denotes a counter for counting the number of times of the signal $2a$='1' and the signal $2b$='11' (i.e., the number of times of appearance of colors which are not held in any latch units).

Reference numeral 1303 denotes a multiplier for multiplying the output from the counter 1301 with the number of bits (2) of the signal $2b$. Reference numeral 1304 denotes a multiplier for multiplying the output from the counter 1302 with the number of bits (24) of the signal $2c$.

Reference numeral 1305 denotes an adder for adding color change point information (64 bits) and the outputs from the multipliers 1303 and 1304, and outputting the number of bits (compressed data amount) D finally required for the corresponding block. Reference numeral 1306 denotes an adder for adding the output from a buffer 1307 and a remaining memory amount of the block (i.e., calculating a stock S as a total remaining memory amount of processed blocks). Reference numeral 1307 denotes a buffer for updating the output from the adder 1306 when a signal 3d is '1'. The signal 3d is '1' when a signal 3a is '0' (i.e., D≦L) and the signal 1d is '1' (i.e., a block includes at least one pixel having the pixel type B).

Reference numeral 1308 denotes a selector for selecting and outputting a constant value C when the signal 1c from the pixel type information analysis section 15 is '0' or a constant value C' when the signal 1c is '1'.

Reference numeral 1309 denotes a subtracter for subtracting the compressed data amount D as the output from the adder 1305 from the output from the selector 1308.

Reference numeral 1310 denotes a selector for selecting the output from the subtracter 1309 when the signal 3b='0' or a constant (C−R) when 3b='1'.

Reference numeral 1311 denotes an adder for adding the output from the subtracter 1309 and the stock S as the output from the buffer 1307.

Reference numeral 1312 denotes a comparator for comparing the output from the adder 1311 with 0, and outputting a signal 3a='0' representing "area 1" when the output from the adder 1311 is 0 or more, or a signal 3a='1' representing "area 2" when the output from the adder 1311 is less than 0.

Reference numeral 1313 denotes a comparator for comparing the compressed data amount D from the adder 1305 with 64, and outputting a signal 3b='1' when a coincidence is found between the two data or a signal 3b='0' when a non-coincidence is found between the two data.

The area discrimination signal 1e is formed by logically ORing the signal 3a from the comparator 1312 and the signal 3b from the comparator 1313.

The limit value L (stock S+critical value C or C' of the block) given to the block is compared with the compressed data amount D, and when D>L, the signal 1e='1' is set to select ADCT compression so as to finally avoid overflow of a memory amount. When D=64 (i.e., a flat image whose 64 pixel data have the same value), the signal 1e='1' is set. Even when a flat image is ADCT-compressed, deterioration is not conspicuous, and a high compression ratio can be obtained although color data slightly changes. In this case, when a flat image is formed for a reason other than that all pixels have the pixel type A, the stock S is added with a value C−R obtained by subtracting an experimentally determined compressed data amount upon ADCT compression of flat image from the constant value C.

In other cases, the signal 1e='0' is set, and the stock S is added with a value obtained by subtracting the compressed data amount D from the constant C or C'. When all pixels in a block have the pixel type B, the constant C is selected; otherwise, the constant C' is selected.

Compression Processing Sequence

Data compression processing will be described below with reference to the flow charts shown in FIGS. 43 to 45.

In the following description, assume that color data which is held in the first latch unit 1202 after the latest updating operation (to be referred to as "latest updating" hereinafter) is represented by "next", and color data which have been held in the second to fourth latch units 1203 to 1205 before latest updating are respectively represented by "former[0]", "former[1]", and "former[2]". Also, assume that pixel data output from the image data sorting unit 1201 are represented by "present". These "next", "former[0–2]", and "present" are data in the NTSC-RGB format, and have R, G, and B data, respectively.

In this embodiment, a compression ratio of 1/10 is set as a target compression ratio, and a fixed value C given to one block is assumed to be (64×24)/10≈153 bits. When a block includes pixels of both the pixel types A and B, the block must be subjected to ADCT compression processing simultaneously with CG compression processing. For this reason, the memory area for ADCT-compressed data amount must be taken into consideration. In addition, a compressed data amount experimentally set upon ADCT processing of a block whose 64 pixels have the same data (flat block) is represented by R.

Figure 43A:
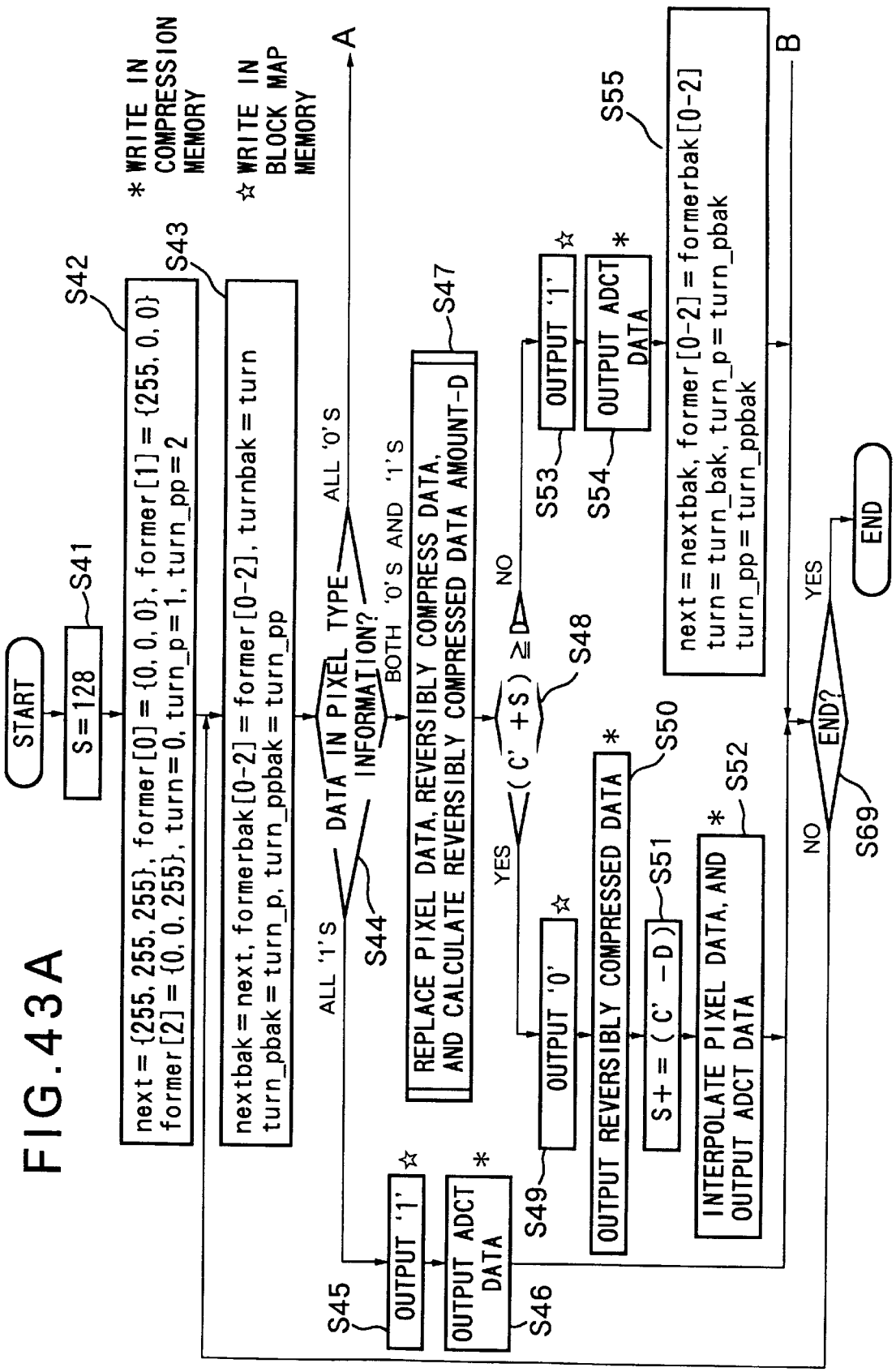
Figure 44:
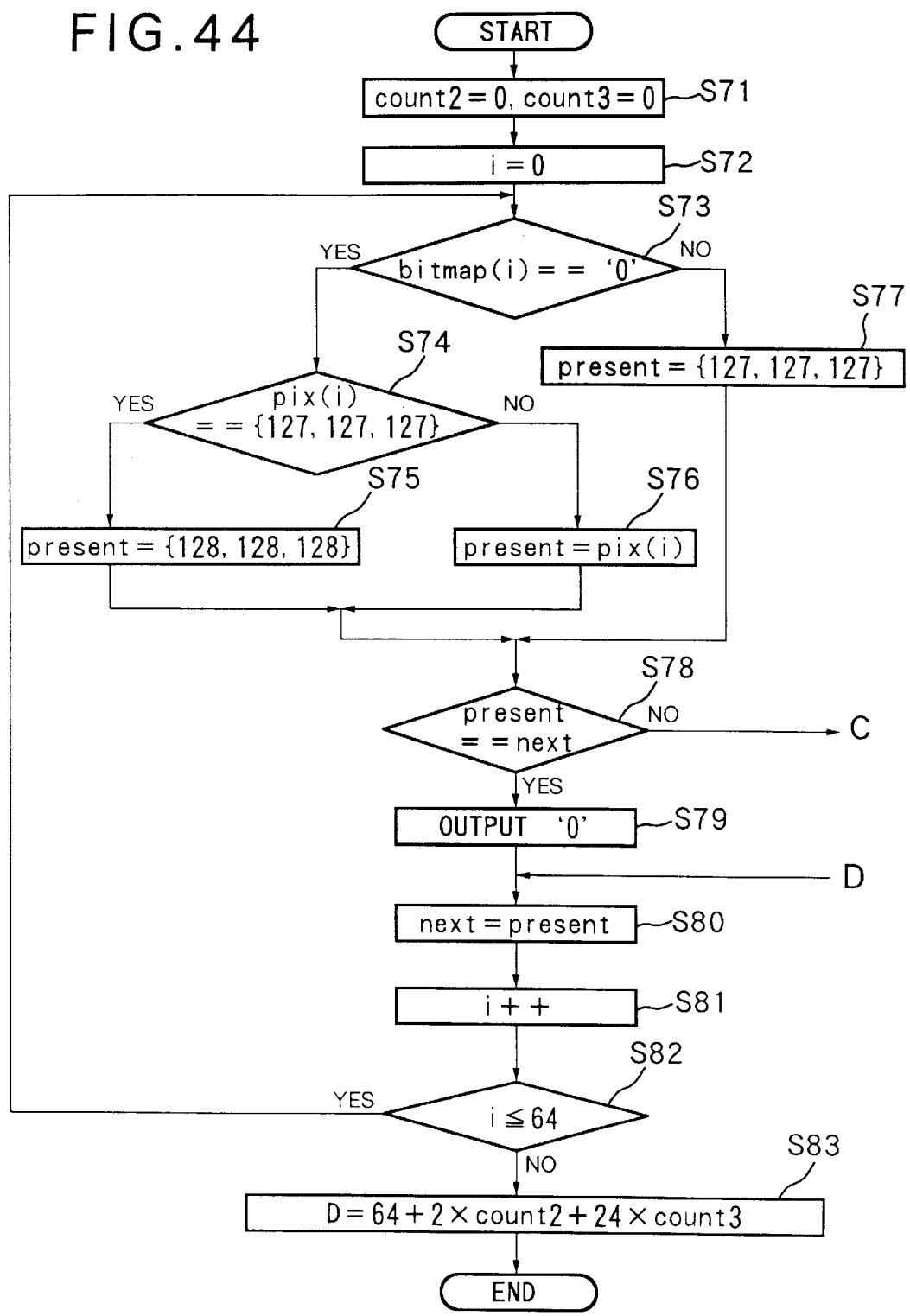
FIGS. 44 and 45 are flow charts showing details of steps S47 and S56 in FIG. 43.

FIG. 43 is a flow chart showing a compression processing sequence of the data compression apparatus shown in FIG. 37.

In step S41, the stock S is reset to 128. The stock S is not reset to 0 so as to cope with a case wherein a plurality of new colors appear in the first block. That is, in the CG compression method of this embodiment, information representing color change points (steps S76 and S91) requires 64 bits per block, latch information (steps S96, S98, S100, and S102) at a color change point requires 2 bits, and when a new color, which is not held in any latch units, appears, 24 bits are required to directly output the color data (step S103). For this reason, appearance of a new color in a block requires (C−64)/24, and when C=153, (153−64)/24≈3.7, and the number of new colors is limited to 3. Therefore, a certain stock S is initially required.

In step S42, the four latch units of the reversible compression section 18 are reset. In this embodiment, assume that a normal image is a black image on a white background, and reset data for the latch units are set as follows:

next={255, 255, 255}, former[1]={255, 0, 0}, former[2]={0, 0, 255}

When the color of "present" does not coincide with color data in any latch units, "turn", "turn_p", and "turn_pp" as latch color data rewrite information are respectively reset to 0, 1, and 2 so as to rewrite the content of the latch unit, which holds the oldest color data.

In step S43, the contents of the four latch units (next, former[0–2]) of the reversible compression section 18 and the color data rewrite information (turn, turn_p, turn_pp) are saved as backup data.

In step S44, 64-bit information in the bit map memory is referred to, and if 64 bits are all '1's (i.e., all natural image pixels), the flow advances to step S45; if 64 bits are all '0's (i.e., all pixels other than natural image pixels), the flow advances to step S56; if 64 bits includes both '0's and '1's, the flow advances to step S47.

In step S45, it is determined that the block is a natural image area, and a signal '1' representing "area 2" is output to the block map memory.

In step S46, data for one block held by the delay section 12 are interpolated by the pixel data interpolation section 13, and the interpolated data are subjected to ADCT compression processing, thus outputting compressed data.

On the other hand, in step S47, data obtained by replacing data 1a for one block held by the raster-block conversion section 11 with reference to pixel type signals 1b are subjected to CG compression processing, compressed data are stored in the compressed data holding section 19, and the compressed data amount D at that time is calculated.

In step S48, it is checked if the compressed data amount D is equal to or smaller than the limit value L (=stock S+fixed value C' for a block including both the pixel types A and B). If (C'+S)≦D, "area 1" is determined, and the flow advances to step S49; if (C'+S)<D, "area 2" is determined, and the flow advances to step S53.

In step S49, a signal '0' representing "area 1" is output to the block map memory. In step S50, compressed data are output from the compressed data holding section 19. In step S51, (C'−D) is added to the stock S. In step S52, the data for one block held by the delay section 12 are interpolated by the pixel data interpolation section 13, and the interpolated data are subjected to ADCT compression processing, thereby outputting compressed data.

On the other hand, in step S53, a signal '1' representing "area 2" is output to the block map memory. In step S54, the data for one block held by the delay section 12 are interpolated by the pixel data interpolation section 13, and the interpolated data are subjected to ADCT compression processing, thereby outputting compressed data. In step S55, the corresponding backup data are substituted in the four latch units (next, former[0–2]) of the reversible compression section 18 and the latch rewrite information (turn, turn_p, turn_pp). More specifically, information rewritten upon calculation of the CG-compressed data amount D of the block is restored to a state before processing of the block.

On the other hand, in step S56, data obtained by replacing data 1a for one block held by the raster-block conversion section 11 with reference to pixel type signals 1b are subjected to CG compression processing, compressed data are stored in the compressed data holding section 19, and the compressed data amount D at that time is calculated. In step S57, the compressed data amount D is compared with 64. If a coincidence is found between the two values, the block is determined as a flat image and ADCT compression is efficient, and the flow advances to step S65; otherwise, the flow advances to step S58.

In step S58, it is checked if the compressed data amount D is equal to or smaller than the limit value L (=stock S+fixed value C). If (C+S)≧D, "area 1" is determined, and the flow advances to step S59; if (C+S)<D, "area 2" is determined, and the flow advances to step S62.

In step S59, a signal '0' representing "area 1" is output to the block map memory. In step S60, compressed data are output from the compressed data holding section 19. In step S61, (C−D) is added to the stock S.

On the other hand, in step S62, a signal '1' representing "area 2" is output to the block map memory. In step S63, the data for one block held by the delay section 12 are interpolated by the pixel data interpolation section 13, and the interpolated data are subjected to ADCT compression processing, thereby outputting compressed data. In step S64, the corresponding backup data are substituted in the four latch units (next, former[0–2]) of the reversible compression section 18 and the latch rewrite information (turn, turn_p, turn_pp). More specifically, information rewritten upon calculation of the CG-compressed data amount D of the block is restored to a state before processing of the block.

On the other hand, in step S65, a signal '0' representing "area 1" is output to the block map memory. In step S66, (C−R) is added to the stock S. In step S67, the data for one block held by the delay section 12 are interpolated by the pixel data interpolation section 13, and the interpolated data are subjected to ADCT compression processing, thereby outputting compressed data. In step S68, the corresponding backup data are substituted in the four latch units (next, former[0–2]) of the reversible compression section 18 and the latch rewrite information (turn, turn_p, turn_pp). More specifically, information rewritten upon calculation of the CG-compressed data amount D of the block is restored to a state before processing of the block.

Subsequently, it is checked in step S69 if all blocks are completed. If NO in step S69, the flow returns to step S43 to repeat the above-mentioned processing; otherwise, the processing is ended.

The reversible compression section 18 (steps S47 and S56) will be described below with reference to the flow charts of FIGS. 44 and 45.

In step S71, "count2" for counting color change points, and "count3" for counting the number of times of a case wherein data "present" is not held in any of the four latch units are reset to 0. In step S72, a counter i for counting 64 pixels in a block is reset to 0. In step S73, it is checked if a pixel type "bitmap(i)" at the i-th position of pixel type information 1b is '0' (i.e., a computer-created pixel). If bitmap(i)='0', the flow advances to step S74; if bitmap(i)= '1' (natural image pixel), the flow advances to step S77.

If it is determined in step S74 that a pixel corresponding to the i-th position from the raster-block conversion section 11 coincides with color data a representing a natural image pixel (pix(i)=a{127, 127, 127}), the flow advances to step S75, and color data β={128, 128, 128} is substituted in "present" representing the present color data. If a non-coincidence is found between the two data, the flow advances to step S76, and a pixel value pix(i) at the i-th position from the raster-block conversion section 11 is substituted.

On the other hand, in step S77, it is determined that the pixel is a natural image pixel, and a={127, 127, 127} is substituted in "present".

Subsequently, in step S78, it is checked if the present color data "present" coincides with the immediately preceding color data "next". If YES in step S78, the flow advances to step S79; otherwise, the flow advances to step S91 shown in FIG. 45.

In step S79, it is determined that the color is left unchanged, and '0' is output to the control unit 1212. In step S80, "present" is substituted in "next". In step S81, the counter i is incremented. In step S82, it is checked if i≦64, i.e., non-processed pixels remain. If such pixels remain, the flow returns to step S73; if i>64, it is determined that all pixels are completed, and the flow advances to step S83.

In step S83, the compressed data amount D of the block is calculated, and the processing is ended. Note that the compressed data amount D can be calculated by:

$$D=64+2\times count2+24\times count3$$

Figure 45:
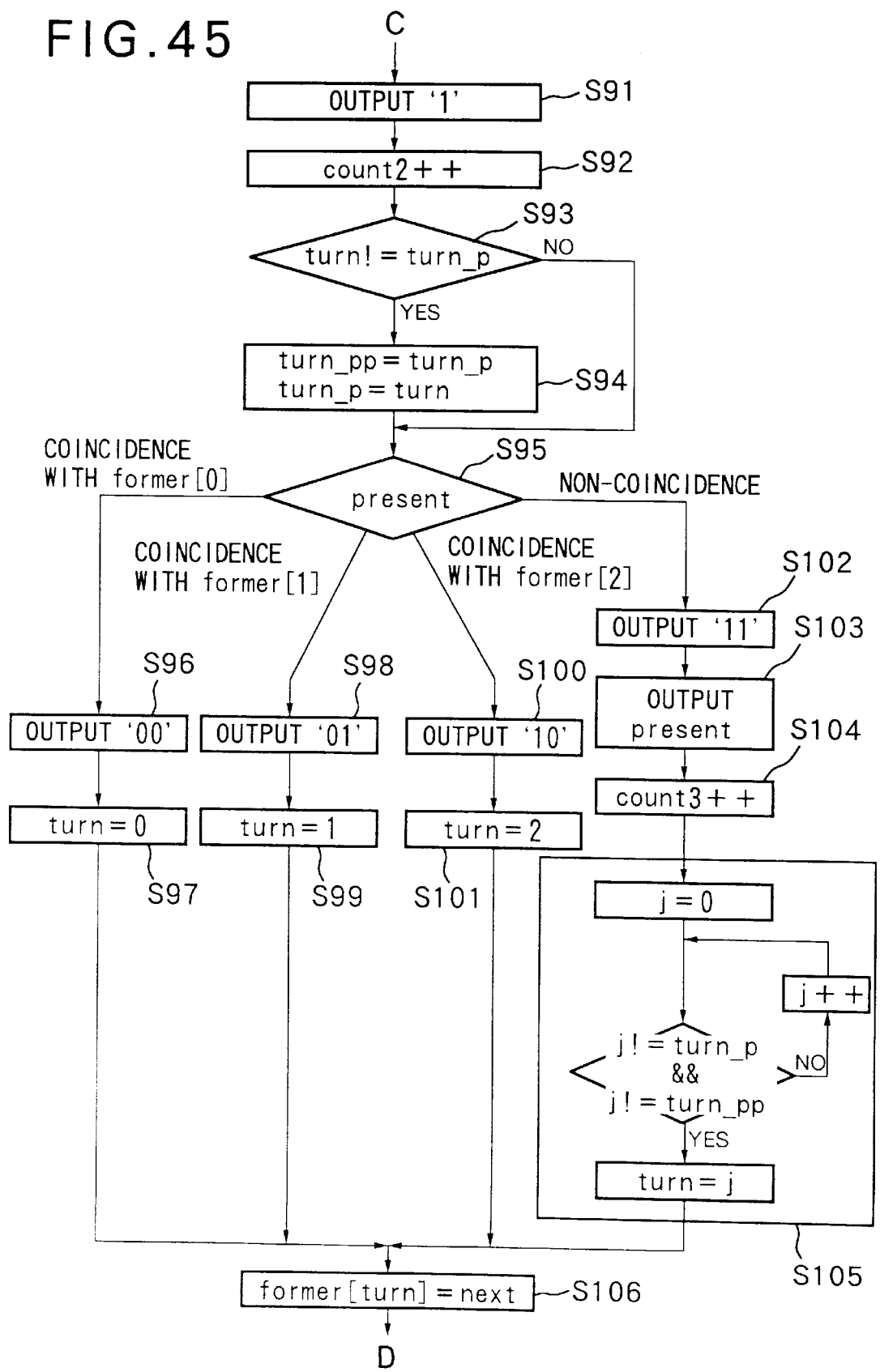

FIG. 45 shows processing executed when it is determined in step S78 that "present" does not coincide with "next", i.e., the color is changed.

In step S91, it is determined that the color is changed, and '1' is output to the control unit 1212. In step S92, "count2" is incremented. In step S93, it is checked if the number "turn" representing the latch unit updated latest is equal to the number "turn_p" representing the latch unit updated previously. If the two values are equal to each other, the flow jumps to step S95; otherwise, the flow advances to step S94. In step S94, "turn_p" is substituted in "turn_pp", and "turn" is substituted in "turn_p". This processing is to prevent "turn" and "turn_p" from having the same value.

In step S95, the present value "present" is compared with the contents of the second to fourth latch units 1203 to 1205 (former[0–2]). If present=former[0], the flow advances to step S96; if present=former[1], the flow advances to step S98; if present=former[2], the flow advances to step S100; if "present" is equal to none of "former[0–2]", the flow advances to step S102.

In step S96, it is determined that the present value is equal to the content of the second latch unit 1203, and '00' is output to the control unit 1212. In step S97, a number, '0', of the second latch unit 1203 is substituted in "turn" as a latch number to be rewritten.

In step S98, it is determined that the present value is equal to the content of the third latch unit 1204, and '01' is output to the control unit 1212. In step S99, a number, '1', of the third latch unit 1204 is substituted in "turn" as a latch number to be rewritten.

In step S100, it is determined that the present value is equal to the content of the fourth latch unit 1205, and '10' is output to the control unit 1212. In step S101, a number, '2', of the fourth latch unit 1205 is substituted in "turn" as a latch number to be rewritten.

In step S102, it is determined that the present value is different from any latch units, and '11' is output to the control unit 1212. In step S103, the present value "present" is output. In step S104, the counter "count3" for counting a case wherein "present" is different from all of the first to fourth latch units 1202 to 1205 is incremented. In step S105, a latch number j different from "turn_p" and "turn_pp" are searched, and the searched j is substituted in "turn". This processing is to present "turn_p" and "turn_pp" from having the same value in steps S93 and S94, and one of the latch numbers, 0, 1, or 2, is searched in this case.

Subsequently, "next" is substituted in "former[next]" in step S106, and the flow returns to step S80 shown in FIG. 44.

Image Data Expansion Apparatus

Figure 46:
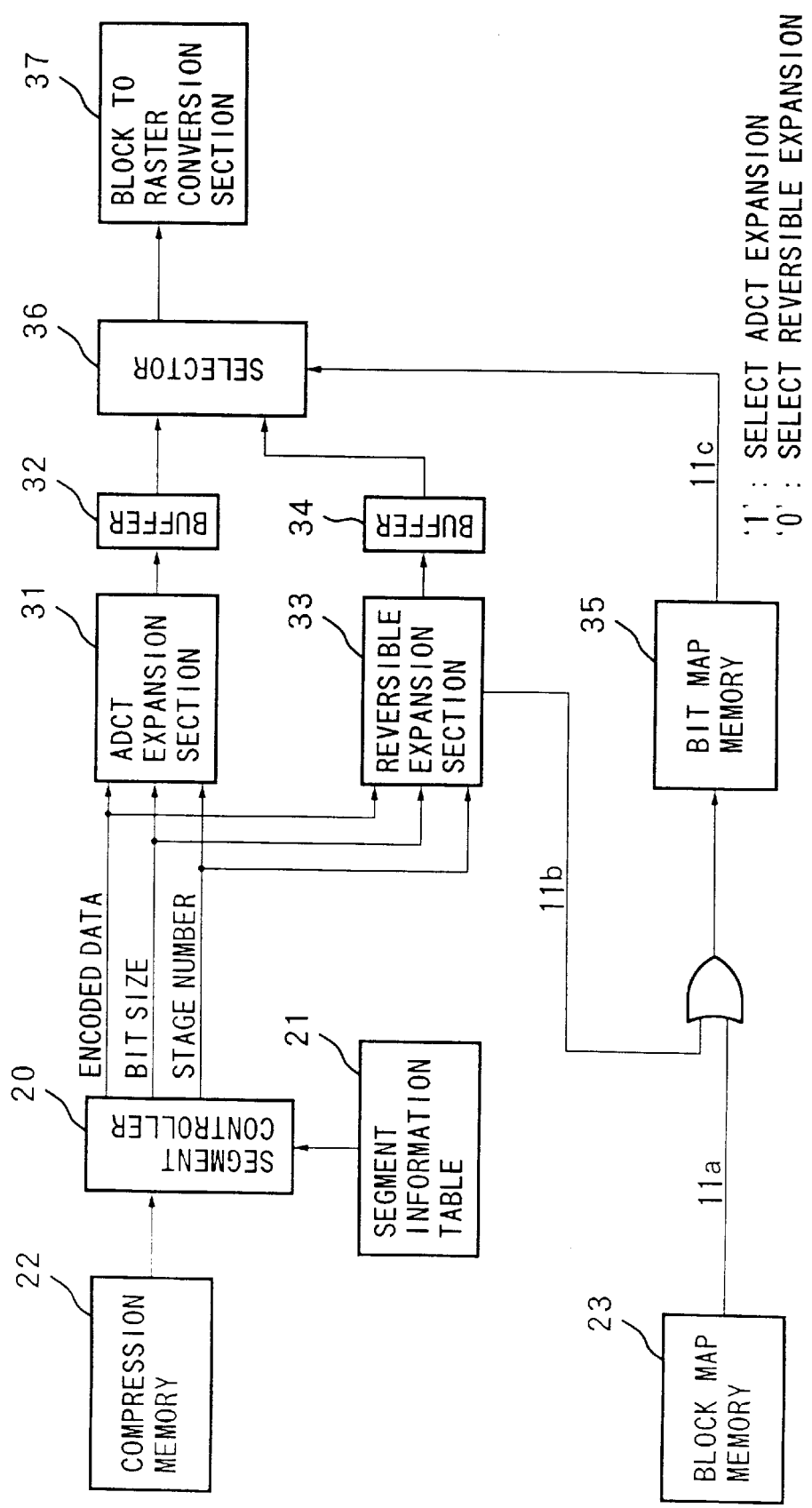
FIG. 46 is a block diagram showing an image data expansion apparatus according to the fifth embodiment.

FIG. 46 is a block diagram of an image expansion apparatus for expanding image data compressed by the above-mentioned processing.

A segment controller 20 distributes compressed data stored in a compression memory 22 to an ADCT expansion section 31 and a reversible expansion section 33 with reference to a segment information table 21.

Reference numeral 31 denotes an ADCT expansion section for expanding and outputting ADCT-compressed data. Reference numeral 32 denotes a buffer for temporarily holding image data expanded by the ADCT expansion section 31.

Reference numeral 33 denotes a reversible expansion section for expanding and outputting CG-compressed data. Reference numeral 34 denotes a buffer for temporarily holding image data expanded by the reversible expansion section 33.

Reference numeral 35 denotes a bit map memory for storing data obtained by logically ORing 1-bit information 11$a$ from a block map memory 23 and pixel type information 11$b$ analyzed by the reversible expansion section 33.

Reference numeral 36 denotes a selector for selecting and outputting one of the output from the buffer 32 and the output from the buffer 34 in units of pixels in accordance with a signal 11$c$ from the bit map memory 35.

Reference numeral 37 denotes a block-raster conversion section for storing image data selected by the selector 36, and forming a synthesized image.

Expansion Processing Sequence

Figure 47:
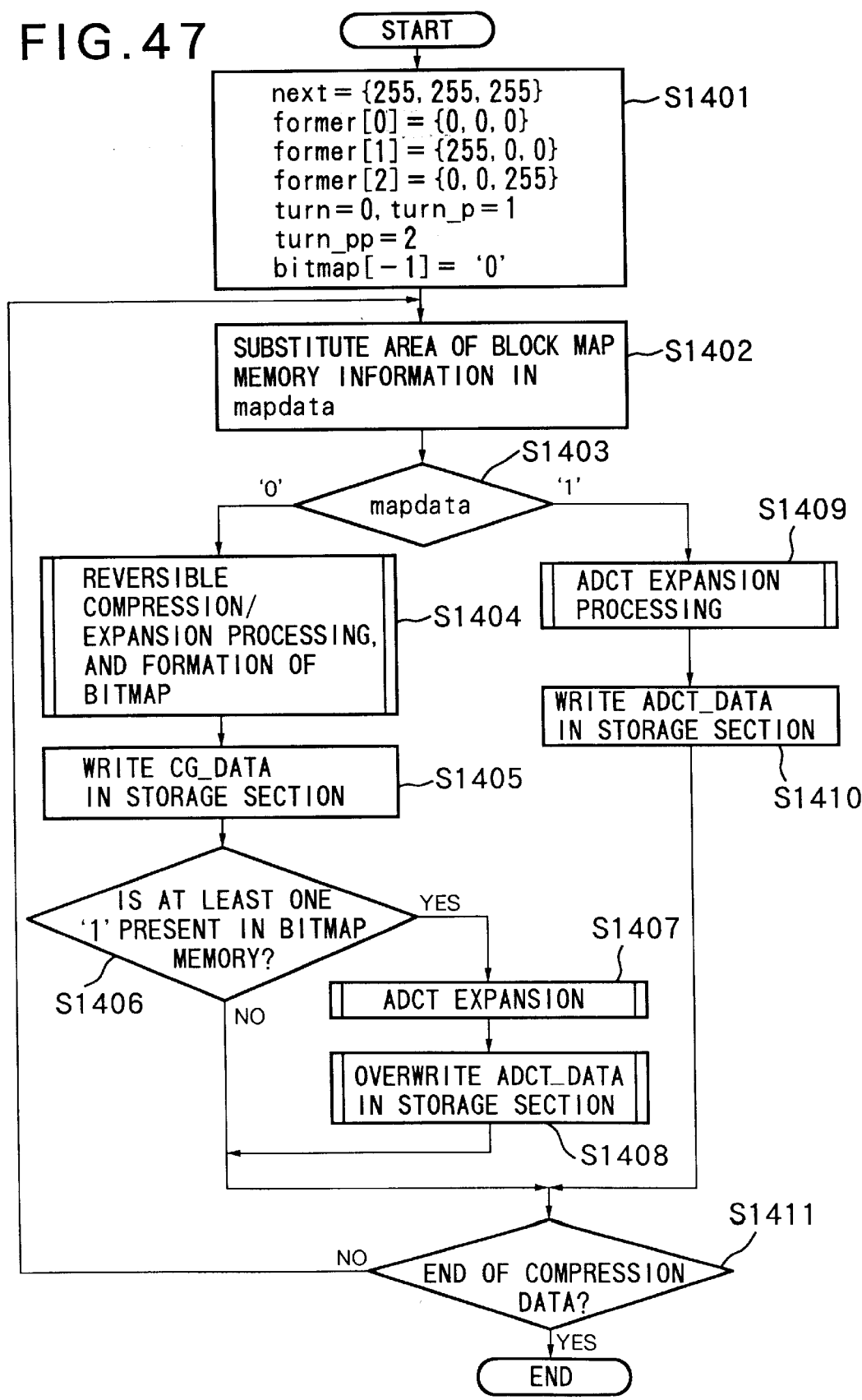
FIG. 47 is a flow chart showing an expansion processing sequence of the data expansion apparatus shown in FIG. 46.

FIG. 47 is a flow chart showing expansion processing.

In step S1401, "next" and "former[0–2]" (the contents of the first to fourth latch units 1202 to 1205) are reset to the same values as those in the compression processing. At the same time, the latch rewrite numbers are also reset to the same values as those in the compression processing. In addition, 0 is set in "bitmap[−1]" as bit map information of the last pixel in a previously processed block.

In step S1402, area information of the block is read out from the block map memory 23, and is substituted in "mapdata". In step S1403, it is analyzed if "mapdata" is '0' ("area 1") or '1' ("area 2"). If "area 1" is determined, the flow advances to step S1404; if "area 2" is determined, the flow advances to step S1409.

In step S1404, since "area 1" is determined, CG-compressed data are received from the compression memory 22 under the control of the segment controller 20, the compressed data are expanded, and expanded data are output. In addition, pixel type information 11$b$ is analyzed, and is written in the bit map memory 35. In step S1405, pixel data CG_DATA obtained by expanding the CG-compressed data are written in a storage section (raster-block conversion section 37).

In step S1406, it is checked if the content of the bit map memory 35 includes at least one '1'. If YES in step S1406, the flow advances to step S1407; otherwise, the flow advances to step S1411.

If the content of the bit map memory 35 includes at least one '1', since the block is constituted by data obtained by CG-compressing replaced pixel data, and data obtained by ADCT-compressing interpolated pixel data, ADCT-compressed data are received from the compression memory 22 under the control of the segment controller 20, and are ADCT-expanded in step S1407. In step S1408, pixel data ADCT_DATA obtained by expanding the ADCT-compressed data are overwritten at pixel positions, corresponding to value '1' on the bit map memory 35, on the storage section (block-raster conversion section 37).

In this manner, pixel data CG_DATA obtained by expanding CG-compressed data in step S1404 are written at pixel positions, corresponding to value '0' on the bit map memory 35, on the block-raster conversion section 37, and pixel data ADCT_DATA obtained by expanding ADCT-compressed data in step S1407 are written at pixel positions, corresponding to value '1' on the bit map memory 35, on the block-raster conversion section 37.

On the other hand, in step S1409, "area 2" is determined, ADCT-compressed data are received from the compression memory 22 under the control of the segment controller 20, the compressed data are ADCT-expanded, and expanded image data are output. In step S1410, pixel data ADCT_DATA obtained by expanding the ADCT_compressed data are written in the storage section (block-raster conversion section 37).

Subsequently, in step S1411, it is checked if all compressed data are expanded. If non-processed compressed data remain, the flow returns to step S1402; otherwise, the processing is ended.

Figure 48:
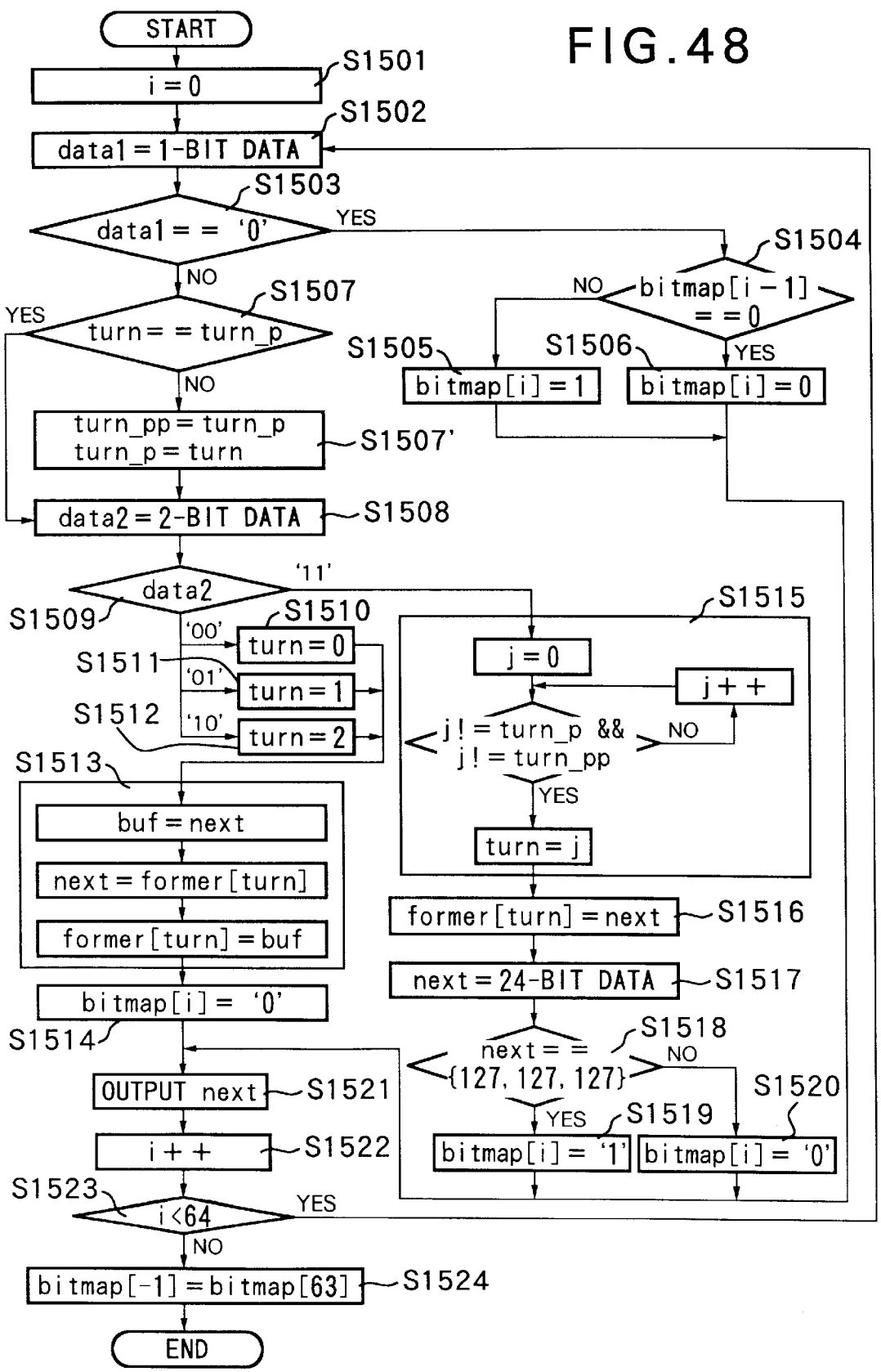
FIG. 48 is a flow chart of a reversible expansion section (step S1404 in FIG. 47) of FIG. 46.

FIG. 48 is a flow chart showing processing of the reversible expansion section 33 (step S1404).

In step S1501, a counter i for counting the number of pixels is reset to 0. In step S1502, 1-bit data (bit map information) is received from the compressed memory 22, and is substituted in "data1". It is checked in step S1503 if data1='0'. If data1 ='0', the flow advances to step S1504; if data1='1', the flow advances to step S1507.

In step S1504, the value of bit map information "bitmap [i−1]" of the immediately preceding pixel i−1 is checked. If bitmap[i−1]='0', '0' is substituted in bit map information "bitmap[i]" of a pixel of interest in step S1506; if bitmap [i−1]='1', '1' is substituted in "bitmap[i]" in step S1505, and thereafter, the flow advances to step S1521. Note that the same result can be obtained even when the value of "bitmap [i−1]" is substituted in bit map information "bitmap[i]" of the pixel of interest in step S1504.

In step S1507, it is checked if a latch number "turn" rewritten latest is equal to a latch number "turn_p" rewritten previously. If the two values are equal to each other, the flow jumps to step S1508; otherwise, "turn_p" is substituted in "turn_pp", and "turn" is substituted in "turn_p" in step S1507'. This processing is to prevent "turn" and "turn_p" from having the same value, and is also executed in the compression processing.

In step S1508, 2-bit data from the compression memory 22 is substituted in "data2", and in step S1509, "data2" is analyzed. If data2='00', 0 is substituted in "turn" to output a pixel stored in "former[0]" (second latch unit 1203) in step S1510; if data2='01', 1 is substituted in "turn" to output a pixel stored in "former[1]" (third latch unit 1204) in step S1511; if data2='10', 2 is substituted in "turn" to output a pixel stored in "former[2]" (fourth latch unit 1205) in step S1512. Thereafter, the flow advances to step S1513. If data2='11', the flow advances to step S1515.

In step S1513, pixel data in "next" (first latch unit 1202) and pixel data in "former[turn]" are exchanged with each other, and in step S1514, '0' is substituted in "bitmap[i]".

On the other hand, if a pixel to be output is present in none of "next" and "former[0–2]", a latch number j different from "turn_p" and "turn_pp" is searched in step S1515. Since the processing for preventing "turn_p" and "turn_pp" from having the same value is executed in steps S1507 and S1507', one of the latch numbers, 0, 1, or 2, is selected in this case. The searched latch number j is substituted in "turn".

In step S1516, "next" is substituted in "former[turn]". In step S1517, 24-bit data (pixel data) is received from the compression memory 22, and is substituted in "next". If it is determined in step S1518 that the value of "next" is a ({127, 127, 127}), the flow advances to step S1519; otherwise, the flow advances to step S1520. In step S1519, '1' is substituted in "bitmap[i]"; in step S1520, '0' is substituted in "bitmap[i]".

Subsequently, with the above-mentioned processing (steps S1502 to S1520), since pixel data to be output is stored in "next" in any case, the pixel data stored in "next" is output in step S1521.

In step S1522, the counter i is incremented. It is checked in step S1523 if processing of 64 pixels is completed. If NO in step S1523, the flow returns to step S1502; otherwise, the flow advances to step S1524.

In step S1524, "bitmap[63]" is substituted in "bitmap[-1]". This step is executed for the processing of the next processing, and thereafter, the processing is ended.

ADCT Compression

The ADCT section 14, the ADCT expansion section 31, the segment controller 20, the segment information table 21, and the compression memory 22 will be described in detail hereinafter.

As has been described previously in the paragraphs of the prior arts, ADCT compression allows adjustment of the data amount after compression. For this purpose, compression is executed by performing a pre-scan operation, parameters for compression are re-set on the basis of the compressed data amount, re-compression is executed, and such operations must be repeated. Thus, since a target compressed data amount is achieved in a try-and-error manner, a very long time is required until the end of compression.

Thus, in this embodiment, the above-mentioned problem is solved as follows.

Figure 49:
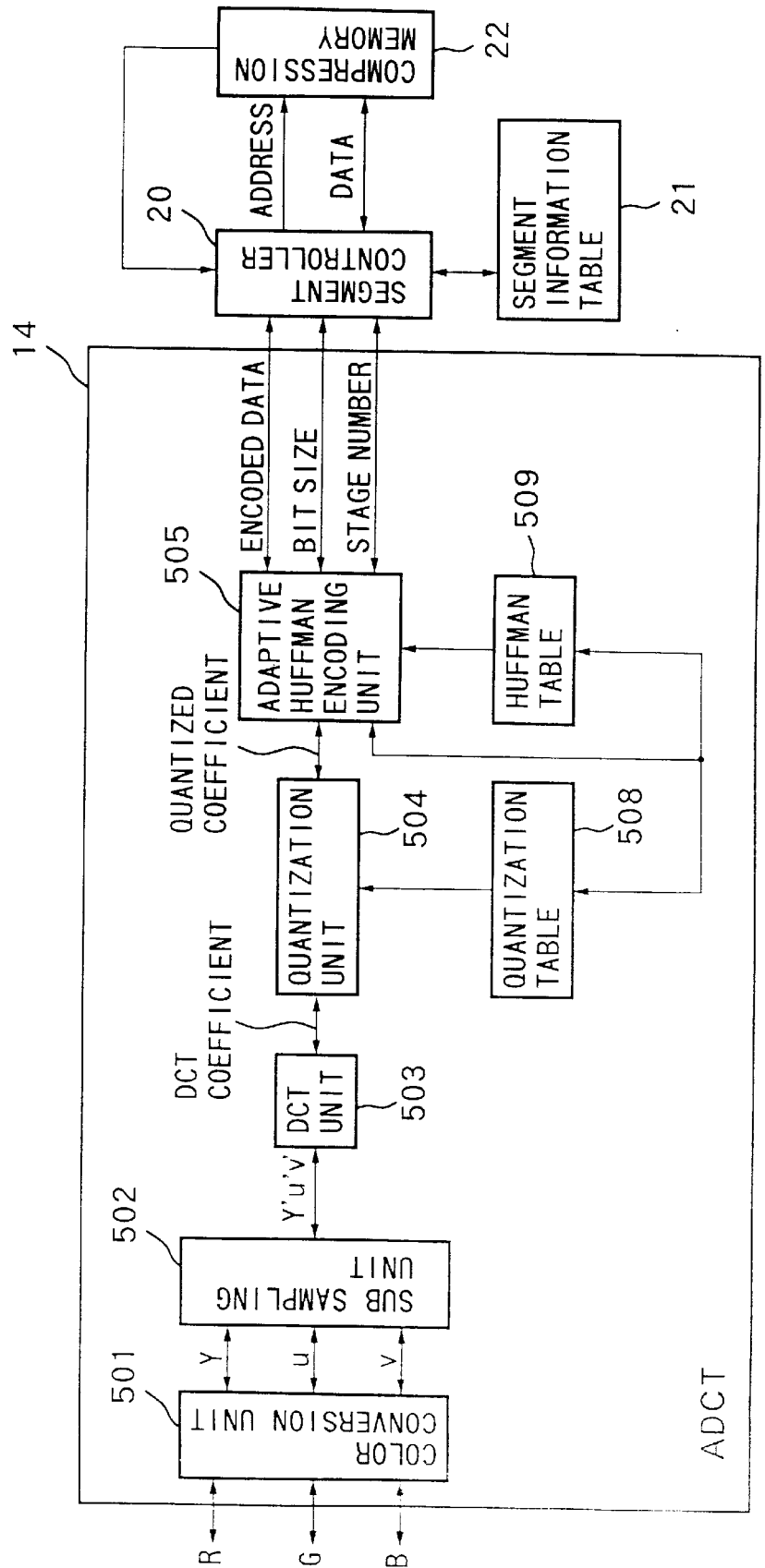
FIG. 49 is a block diagram showing a detailed arrangement of an ADCT 14 shown in FIG. 37.

FIG. 49 is a block diagram showing the detailed arrangement of the ADCT section 14 shown in FIG. 37.

Compression processing of image data will be described below with reference to FIG. 49.

In a color conversion unit 501, input RGB image data is converted into Y, u, and v components using 3×3 linear matrix conversion given by the following equation:

$$\begin{bmatrix} Y \\ u \\ v \end{bmatrix} = \begin{bmatrix} a11 & a12 & a13 \\ a21 & a22 & a23 \\ a31 & a32 & a33 \end{bmatrix} \begin{bmatrix} R \\ G \\ B \end{bmatrix}$$

where Y is the luminance component, and u and v are the chromaticity components.

A sub sampling unit 502 performs sub sampling to decrease chromaticity data by utilizing the nature that the sensitivity characteristics of human eyes are more sensitive to the luminance component (Y) than the chromaticity components (u, v). For example, image data is converted into Y:u:v=4:4:4 (without sub sampling), Y:u:v=4:2:2, or Y:u:v=4:1:1.

The outputs from the sub sampling unit 502 are output in units of 8×8 blocks in the order of Y1, u1, v1, Y2, u2, v2, ... in the case of Y:u:v=4:4:4, in the order of Y1, Y2, u1, v1, Y3, Y4, u2, v2, ... in the case of Y:u:v=4:2:2, or in the order of Y1, Y2, Y3, Y4, u1, v1, Y5, Y6, Y7, Y8, u2, v2, ... in the case of Y:u:v=4:1:1.

A DCT unit 503 DCT-transforms data output from the sub sampling unit 502 in units of 8×8 blocks, and outputs DCT coefficients.

A quantization unit 504 quantizes DCT coefficients output from the DCT unit 503 in units of 8×8 blocks using a quantization table 508, thus obtaining quantized coefficients.

Figure 21:
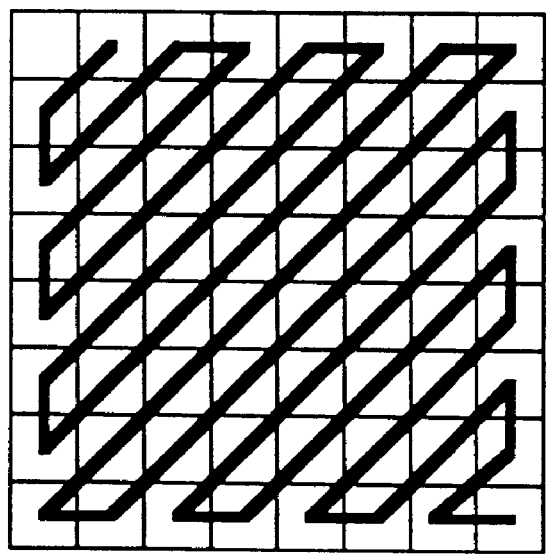
FIG. 21 is a view showing a state of sorting pixel data in a zigzag order.
Figure 25:
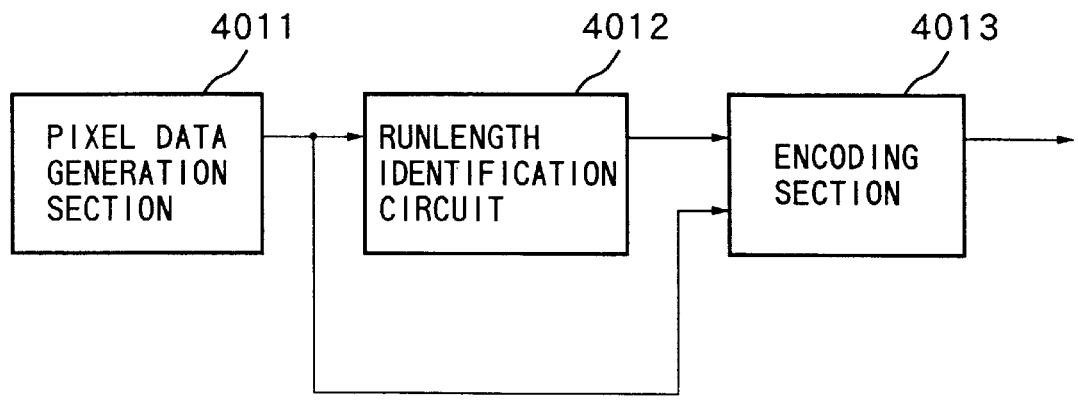
FIGS. 25 and 26 are diagrams showing compression methods for a color multi-value image created by a computer.
Figure 26:
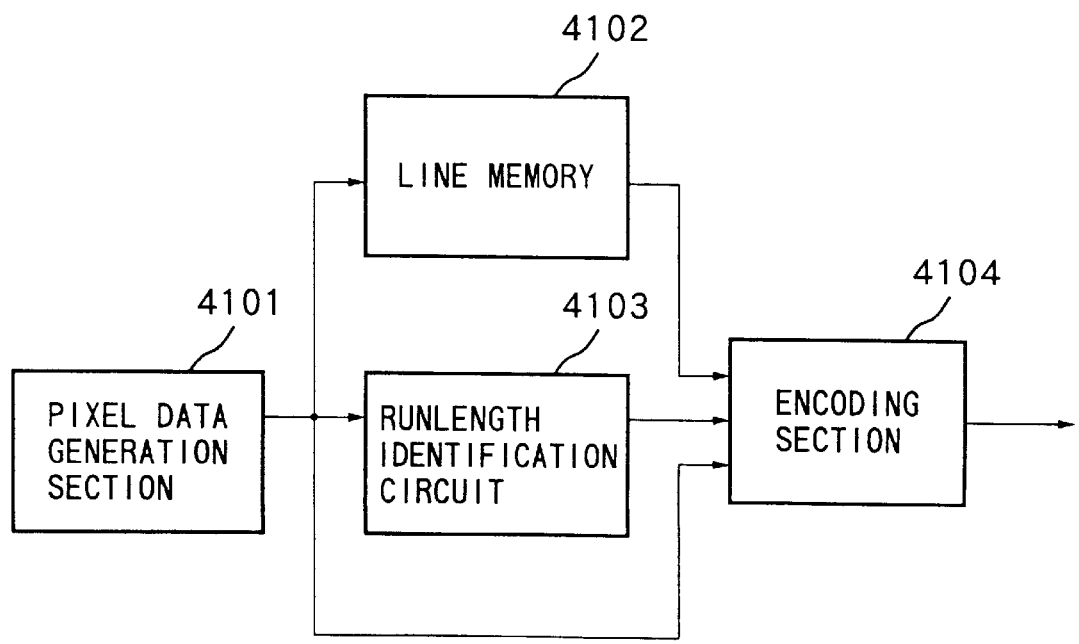

8×8 two-dimensional quantized coefficients are one-dimensionally sorted in the order from a low-frequency component to a high-frequency component by zigzag scan, as shown in FIG. 21, and the sorted coefficients are supplied to an adaptive Huffman encoding unit 505.

As will be described in detail later, the adaptive Huffman encoding unit 505 performs conversion in units of 64 one-dimensional data, and outputs the encoded data, bit sizes, and stage numbers. In this embodiment, four stages are prepared.

The segment controller 20 writes data in the compression memory 22 divided into segments in units of stages in accordance with the encoded data, bit sizes, and stage numbers output from the adaptive Huffman encoding unit 505. In addition, the controller 20 writes segment distribution information indicating write segments and stages of data in the segment information table 21. This information is used in expansion.

When the segments for storing data distributed in units of stages are controlled by the segment controller 20, fixed-length compression can be realized. This will be briefly described below. That is, data distributed to respective stages can be controlled to a target data amount by selecting the stages to be adopted, i.e., compressed data of only the first and second stages, or compressed data of only the first, second, and third stages, or all compressed data of the first, second, third, and fourth stages in accordance with the storage capacity of the compression memory 22 or the total compressed data amount of an image to be compressed. For example, if data of the first stage has 2.5 MB, data of the second stage has 1.5 MB, data of the third stage has 0.8 MB, data of the fourth stage has 0.5 MB, and the target data amount is 5.0 MB, a total compressed data amount of 4.8 MB is achieved by using the data of the three stages, i.e., the first, second, and third stages, and can be controlled to be equal to or smaller than the target data amount. Therefore, distribution of all encoded data in units of stages influences the precision of fixed-length compression.

The segment controller 20, the compression memory 22, and the segment information table 21 will be described in detail later.

The adaptive Huffman encoding unit shown in FIG. 50 will be briefly described below, and thereafter, the respective blocks will be described in detail.

Figure 50:
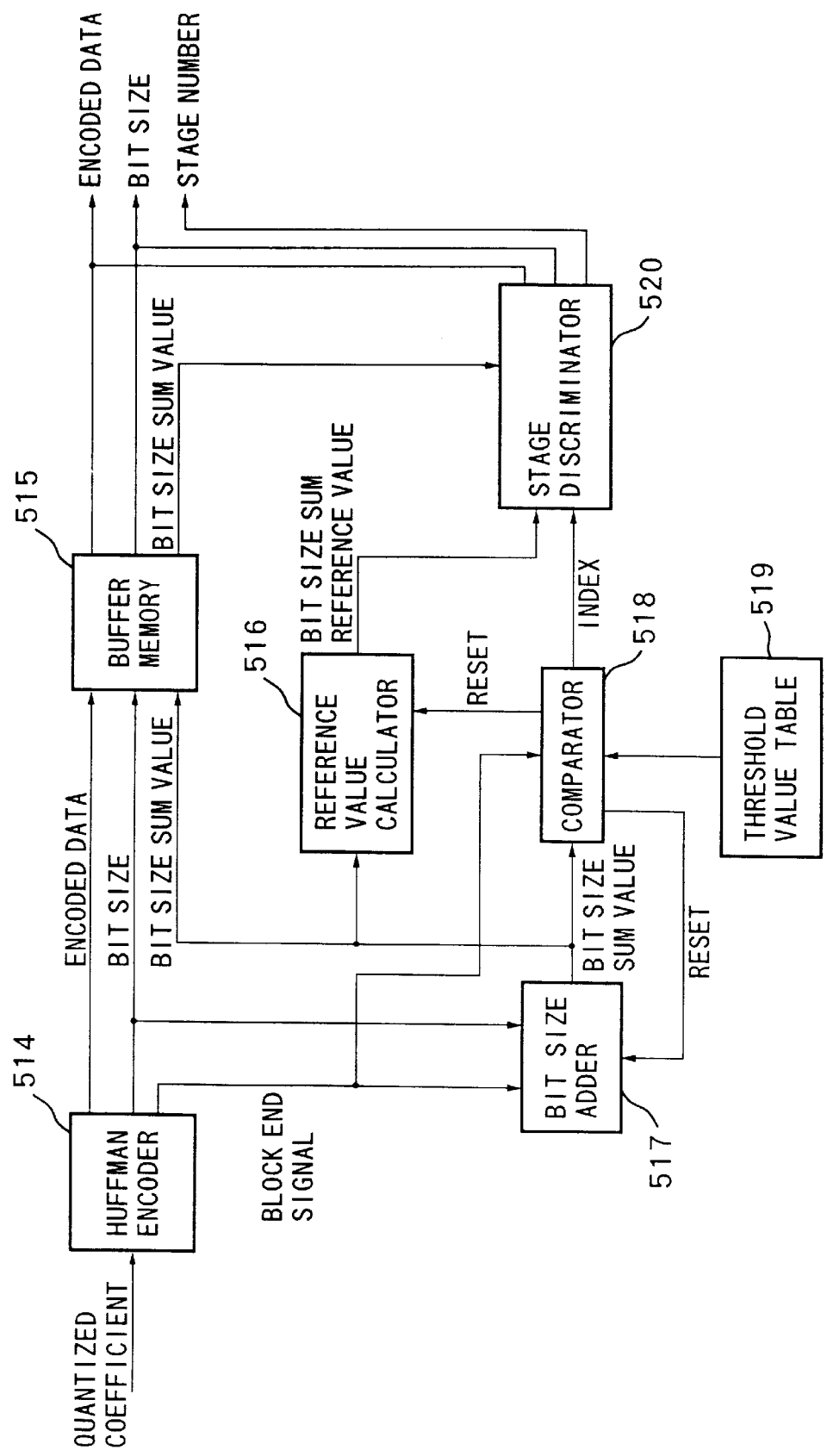
FIG. 50 is a schematic block diagram for explaining an adaptive Huffman encoding unit shown in FIG. 49.

The adaptive Huffman encoding unit shown in FIG. 50 outputs the encoded data, bit sizes, and stage numbers. That is, when the target bit rate (the bit rate is a unit representing a compression ratio, and is expressed by the number of bits per pixel [bits/pixel]) of the entire image is assumed to be 2.4 [bits/pixel], the target bit rate of the first stage is set to be 1.5 [bits/pixel] in an 8×8 block. Since the remaining number of stages is three (i.e., the second, third, and fourth stages), the remaining number of bits (2.4−1.5=0.9) in the block are substantially equally divided into three stages, and the divided bits are distributed to the second, third, and fourth stages.

Referring to FIG. 50, an adaptive Huffman encoder 514 Huffman-encodes one-dimensionally sorted quantized coefficients in units of 64 coefficients (in units of Y, u, and v components of an 8×8 block), and outputs encoded data, a bit size, and a block end signal indicating a division of a block.

A buffer memory 515 stores these data in the format shown in FIG. 51. Referring to FIG. 51, an index is a serial number of output encoded data in a single block, and the number of effective bits of encoded data is designated by a bit size. A bit size sum value is obtained from a bit size adder 517.

The bit size adder 517 starts addition of bit sizes of AC components in units of blocks in response to the block end signal, and outputs the sum value to a comparator 518. The comparator 518 compares the sum value with threshold tables 519 (see FIG. 52) prepared in units of Y, u, and v components. When the sum value exceeds a threshold value, the comparator 518 outputs an index before the sum value exceeds the threshold value, and resets the bit size adder 517 to restart addition from the bit size which has exceeded the threshold value. When the bit size adder 517 detects the end of a block in accordance with the block end signal, it supplies the final value to a reference value calculator 516. The reference value calculator 516 calculates a plurality of bit size sum reference values on the basis of the final bit size sum value.

These operations will be described in detail below with reference to FIGS. 51 and 52. Since the target bit rate of the first stage is set to be 1.5 [bits/pixel], the numbers of bits of Y, u, and v components are respectively set to be 40, 28, and 28 [bits] in FIG. 52 so as to realize this bit rate.

FIG. 51 shows encoded data, bit sizes, and bit size sum values of Y components in a certain 8×8 block. The bit size of index 0 is not added since index 0 corresponds to a DC component, and the bit size is written in the bit size sum value from the first bit size '18' of an AC component of index 1. Since the bit size of index 2 is '7', the bit size sum value of index 2 becomes 25 (=18+7), and the bit size sum value of index 3 becomes 39 (=25+14).

Since the bit size of index 4 is '22', the bit size sum value becomes 61. In this case, since the comparator 518 determines that the bit size sum value exceeds the value (40 [bits]) of the Y-component threshold value table 519, index 3 immediately before index 4 is supplied to a stage discriminator 520. The bit size adder 517 is reset, and the bit size '22' of index 4 is directly written in the bit size sum value.

Since the bit size of index 5 is '9', the bit size sum value becomes 31 (=22+9).

Similarly, the bit sizes are added, and are written in the bit size sum value until the corresponding block ends. The final bit size sum value '95' is transferred to the reference value calculator 516, and the reference value calculator 516 divides '95' with 3 since three stages remain. Thus, a value '30', and a value '60' twice the value '30' are supplied to the stage discriminator 520 as bit size sum reference values.

The stage discriminator 520 determines stages, to which encoded data and bit sizes are distributed, on the basis of the index obtained from the comparator 518, and the bit size sum reference values obtained from the reference value calculator 516.

As described above, the obtained data are index 3, and the bit size reference values '30' and '60'. The buffer memory 515 counts the input bit size sum values, and outputs stage number #1 for data up to index 3. Then, as for the following data, the bit size sum value is compared with the bit size sum reference value '30', and when the bit size sum value is equal to or larger than 0 and equal to or smaller than 30, stage number #2 is output; when the bit size sum value is equal to or larger than 31 and equal to or smaller than 60, stage number #3 is output; when the bit size sum value is larger than 60, stage number #4 is output. At the division of each stage, an EOS (End of Stage) code indicating the division of the stage is inserted.

Thus, each of different encoded amounts in units of 8×8 blocks is distributed to the first stage at the bit rate of about 1.5 [bits/pixel], and the remaining data can be equally divided into three stages.

In the above-mentioned example, the bit size sum value of an 8×8 block exceeds 40. However, if the bit sum value does not exceed 40, an EOB (End of Block) code is inserted, and all encoded data of the 8×8 block are written in the segment of the first stage.

ADCT Expansion

Expansion of data compressed by the above-mentioned compression process will be described below.

The arrangement of the ADCT expansion section 31 is substantially the same as that of the ADCT section 14 shown in FIG. 49 although the data flow is reversed to that in the compression process. Therefore, the DCT unit 503 in FIG. 49 is replaced with an inverse DCT unit 503, the quantization unit 504 is replaced with an inverse quantization unit 504, and the adaptive Huffman encoding unit 505 is replaced with an adaptive Huffman decoding unit 505. Also, the quantization table 508 and the Huffman table 509 are respectively replaced with an inverse quantization table 508 and a Huffman decoding table 509.

Since encoded data constituting a single 8×8 block are stored in the compression memory 22 while being divided into a plurality of stages, the adaptive Huffman decoding unit 505 receives and decodes encoded data from the plurality of stages to re-constitute the single 8×8 block.

For this purpose, the adaptive Huffman decoding unit 505 requests encoded data of stage number #1 to the segment controller 20. The segment controller 20 reads the encoded data of the first stage from the compression memory 22 with reference to the content of the segment information table 21, and transfers the read data to the adaptive Huffman decoding unit 505. The adaptive Huffman decoding unit 505 sequentially decodes transferred encoded data, and transfers decoded results to the inverse quantization unit 504 until it detects an EOS code. Upon detection of an EOS code, the decoding unit 505 requests encoded data of stage number #2.

The segment controller 20 reads encoded data of stage number #2 from the compression memory 22 with reference to the content of the segment information table 21, and transfers the read data to the adaptive Huffman decoding unit 505. The adaptive Huffman decoding unit 505 performs decoding until it detects another EOS code in the same manner as described above.

The decoding unit 505 similarly decodes data of the third and fourth stages, thus completing encoding of a single 8×8 block. If the decoding unit 505 detects an EOB code during decoding of a certain stage, it does not request encoded data of the next stage, and starts decoding of the next 8×8 block. When compressed data are not stored up to its final stage due to too large a compressed data amount or a short capacity of the compression memory 22, the decoder performs expansion using data up to intermediate stages.

Quantized coefficients obtained in this manner are inversely quantized by the inverse quantization unit 504 using the inverse quantization table 508, and are supplied to the inverse DCT unit 503.

The inverse DCT unit 503 inversely DCT-transforms obtained DCT coefficients to obtain Y', u', and v' data.

The sub sampling unit 502 performs an enlargement operation according to a sub sampling ratio (Y:u:v=4:4:4, 4:2:2, or 4:1:1).

The color conversion unit 501 performs inverse conversion using the following equation, thus reproducing an original image:

$$\begin{bmatrix} R \\ G \\ B \end{bmatrix} = \begin{bmatrix} a11' & a12' & a13' \\ a21' & a22' & a23' \\ a31' & a32' & a33' \end{bmatrix} \begin{bmatrix} Y \\ u \\ v \end{bmatrix}$$

Multi-Stage Storage

Storage of compressed data divided into multiple stages in compression/expansion processing of image data, storage of data compressed by the reversible compression section 18 to the compression memory 22 constituted by a plurality of segments, and storage of selected segment information in the segment information table 11 will be described in detail below. Note that data compressed by the reversible compression section 18 is processed as one of compressed data divided into multiple stages, and is processed as data of the first stage since necessity of preservation of information is high.

As shown in FIG. 53, the compression memory 22 is divided into segments S-1 to S-N (e.g., one segment=100 KBytes).

The segment information table 21 has an architecture shown in FIG. 54. The first to fourth rows of the segment information table 21 store information associated with the first to fourth stages. In the first column, 1-bit data representing if the corresponding stage is effective or ineffective is stored, and '1' indicates that the corresponding stage is effective; '0' indicates that the corresponding stage is ineffective. In the second and subsequent columns, the selected segment numbers (S-1 to S-N) of the compression memory 22 in which encoded data of the respective stages are written are stored. The left end of these columns corresponds to the head of an image, and the right end of these columns corresponds to the end of an image. "END" indicates the end of encoded data in each stage.

A sequence for writing encoded data in the compression memory 22 in units of stages will be described below.

Note that the compressed data amounts distributed to the respective stages vary depending on a compression method for distributing data to the stages or the characteristics of original image data. A case will be exemplified below where the output compressed data amount of the first stage is larger than that in the fourth stage upon comparison of the first to fourth stages.

Figure 55:
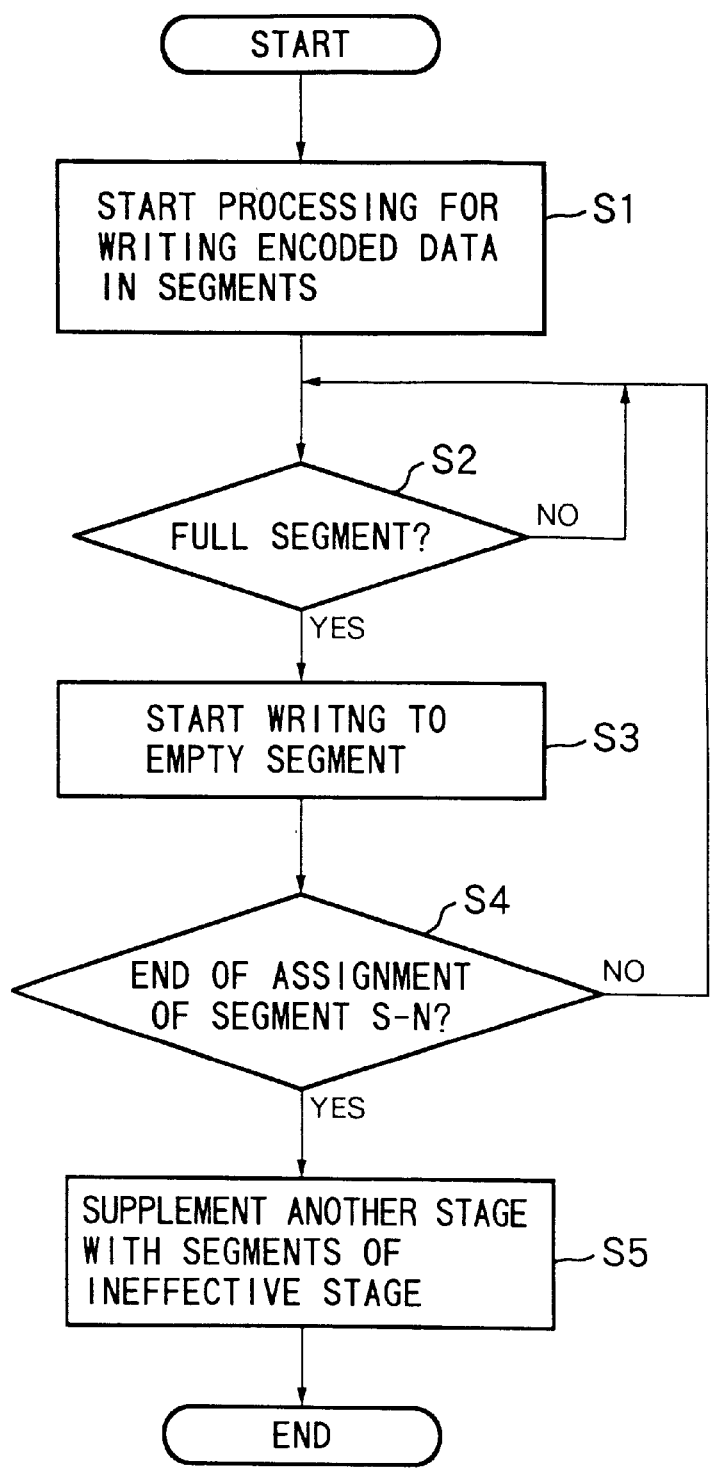
FIG. 55 is a flow chart showing encoded data storage processing in compression processing.

Encoded data storage processing will be described below with reference to the flow chart of encoded data storage processing in compression processing shown in FIG. 55, and the segment information table shown in FIG. 54.

As shown in the second column (column No. 2) in FIG. 54, encoded data output in the respective stages begin to be written in the segments S-1, S-2, S-3, and S-4, respectively (step S1).

In the first stage 1, since the segment S-1 becomes full of data earlier than other stages, data begins to be written in the segment S-5 (steps S2 and S3).

In the second and third stages, since the segments S-2 and S-3 become full of data, data begin to be written in the segments S-5 and S-6 (steps S2 and S3).

Since encoded data of the first stage fill the segment S-5 before the segment S-4 becomes full of encoded data of the fourth stage, an empty segment S-8 is assigned not to the fourth stage but to the first stage (steps S2 and S3). Such a phenomenon occurs since the code amount generated in the first stage is larger than that generated in the fourth stage.

Similarly, when a segment in which data are written becomes full of data in each stage, an empty segment is selected, and encoded data is written in the selected segment (steps S2, S3, and S4).

In this embodiment, a method of encoding an original image while dividing it into some stages is used. Thus, when the code amount of each stage is smaller than the target compressed data amount, no ineffective stage appears. However, when the target amount is reached during encoding, a designated stage is made ineffective (the fourth stage in FIG. 54), and encoded data of the remaining first, second, or third stage are written in the segments S-4, S-11, S-15, . . . assigned to the designated stage (step S5).

The eighth to 11th columns (Nos. 8 to 11) in FIG. 54 correspond to the above description. Since the segment S-N is assigned in the second stage of the eighth column, this means that all the segments of the compression memory 22 have been assigned, and the fourth stage is made ineffective ('0') so as to compensate for the shortage of the compression memory. As shown in the ninth column, the segment S-4 used in the fourth stage is assigned to the first stage, and the segment S-11 is assigned to the second stage. Since the encoded data of the second stage are ended when they are written in the segment S-11, an END mark is stored in the 10th column, as shown in FIG. 54.

Since the encoded data of the first stage are ended when they are written in the segment S-15 of the 10th column, an END mark is stored in the 11th column.

When the compressed data stored in the compression memory 22 are expanded, image data is decoded using only the effective stages (the first to third stages in FIG. 54).

In this manner, with the compression/expansion processing, compression can be performed without losing any data in CG compression, and when the CG-compressed data amount exceeds the limit value L=(C+S) given to the block, the ADCT compression processing is performed, so that the final memory amount can be maintained to be equal to or smaller than a predetermined amount, and image quality can be preserved. As for a block including different pixel types, which poses problems associated with image quality and the compression ratio in the conventional method, both the ADCT compression and CG compression are performed. That is, in the ADCT compression processing, image quality is preserved by inputting interpolated data, and in the CG compression processing, the compression ratio is maintained by inputting replaced data. Furthermore, since pixel type information in units of pixels of a block including different pixel types can be inserted in CG-compressed data, no extra bit map memory is required.

According to the above-mentioned multi-stage storage method, memory management can be easily performed according to the importance of image data, and since both ADCT-compressed data and CG-compressed data are processed in a single memory space, address control in a read-out mode and synchronous control in a write mode can be facilitated.

Modification of Fifth Embodiment

In the fifth embodiment described above, the signals $2a$, $2b$, and $2c$ can be stored at different addresses. In this case, these signals are stored at different addresses by the segment controller 21.

In the fifth embodiment described above, CG-compressed data (signals $2a$ and $2b$) stored in the compressed data holding section 19 are constituted by a flag system indicating ON/OFF ('0'/'1'). However, these signals may be constituted by a trigger system.

As shown in FIGS. 13A and 13B, identical data tend to continue for a longer period in the trigger system than in the flag system. By utilizing this nature, the signals $2a$ and $2b$ may be subjected to another run length compression such as MH to decrease the data amount.

The present invention is not limited to MH. For example, completed compressed data may be subjected to Huffman encoding or Lempel-ziv encoding to be further compressed. Note that it is also effective to perform Huffman encoding or Lempel-Ziv encoding of the signal $2c$.

In the reversible compression section 18 of the above-mentioned fifth embodiment, the present value "present" to be output in step S103 may be stored as a look-up table.

A computer-created image created by, e.g., DTP has a feature of a small number of used colors, and most of images can be expressed by 256 colors. Also, an 8-bit (256 colors) memory may be prepared as a table, and when the 256th color appears, 24-bit data may be directly output. Thus, the number of expressible colors is not limited, and since most of color data can be expressed by 8 bits in place of 24-bit data required in the above system, the compression ratio can be increased. Therefore, the number of blocks to be subjected to CG compression processing is increased as compared to the fifth embodiment, and image quality can be improved.

In the reversible compression section 18 of the fifth embodiment described above, the number of latch units (former) for storing previous pixel data is 3, but may be decreased to 1. In this case, a signal corresponding to steps S96, S98, S100, and S102 becomes a 1-bit signal, and since the number of latch units to be written (in which "next" is substituted) is 1, processing such as "turn" indicating the order of rewriting is unnecessary. In this case, an equation for calculating the compressed data amount is rewritten as follows:

$$D=64+1\times count2+24\times count3$$

In the reversible compression section 18 of the fifth embodiment described above, the present value "present" to be output in step S103 may be, e.g., 18-bit data in place of 24-bit data. In this case, although expanded data has a different value from that of original image data, and reversible compression is disabled, since a high-frequency image such as a computer-created image does not require too good gradation characteristics for human eyes, deterioration of image quality is not conspicuous, and the compressed data amount is decreased as in the following equation:

$$D=64+2\times count2+18\times count3$$

In the reversible compression section 18 of the fifth embodiment described above, latch rewrite information (turn, turn_p, turn_pp) may be omitted, and a latch unit to be rewritten when the same color is not present in any latch unit may be permanently determined. For example, when the signal $2a$ is '1', and the signal $2b$ is '11', a latch unit to be rewritten is permanently determined as the second latch unit 1203. In this case, although compression efficiency is slightly impaired, the hardware scale can be reduced.

In the reversible compression section 18 of the fifth embodiment described above, the buffer 1307 for storing the stock S is arranged, and the limit value L of a block to be processed is defined by C+S. However, L=C may be used.

In the fifth embodiment described above, the segment controller 20 is used in memory control, and compression is performed in a real-time manner. Alternatively, pre-scan (pre-development) may be performed to determine a δ-factor of ADCT compression in advance, and then, compression may be performed. In this case, memory control can be further facilitated.

In the reversible compression section 18 in the fifth embodiment described above, the image data sorting unit 1201 adopts a zigzag order shown in FIG. 41. However, the present invention is not limited to this. If the sorting order at this time is determined in correspondence with an order of data sent from the raster-block conversion section 11, the function of the image data sorting unit 1201 can be omitted.

In the fifth embodiment described above, the pixel data replacing section 17 replaces values of pixels having the pixel type A to reduce the compressed data amount of the reversible compression section 18 and to realize insertion of bit map data. However, instead of replacing pixel data, a reversible compressed code representing the pixel type A may be determined in advance, and the code may be output in correspondence with the pixel type A.

For example, three latch units may be used in place of the four latch units in the fifth embodiment, and a code corresponding to the pixel type A (a code upon detection of a coincidence with the fourth latch unit 1205) may be set to be '110'. Thereafter, when pixels of the pixel type A continue, '0' is similarly output. When a pixel of the pixel type B appears, '1' is output, and the color of the pixel is compared with the contents of the second and third latch units 1203 and 1204 to output a code. In this case, if the color of the pixel does not coincide with the contents of the second and third latch units 1203 and 1204 ('111' is output), updating processing by updating means is not performed. That is, upon switching from the pixel type A to the pixel type B, the code '0' indicating that input data is the same as data in the first latch unit 1202 becomes a code representing the pixel type A. For this reason, if the input data is compared with data in the second and third latch units 1203 and 1204, and if it is determined that the input data coincides with neither of the data in the second and third latch units 1203 and 1204 (pixel data is output) to rewrite data in one of the second and third latch units 1203 and 1204 with data in the first latch unit 1202, the same data may be undesirably stored in the three latch units when input pixel data coincides with data in the first latch unit 1202.

In the fifth embodiment described above, the compression method is realized by hardware but may be realized by software.

Sixth Embodiment

Figure 57:
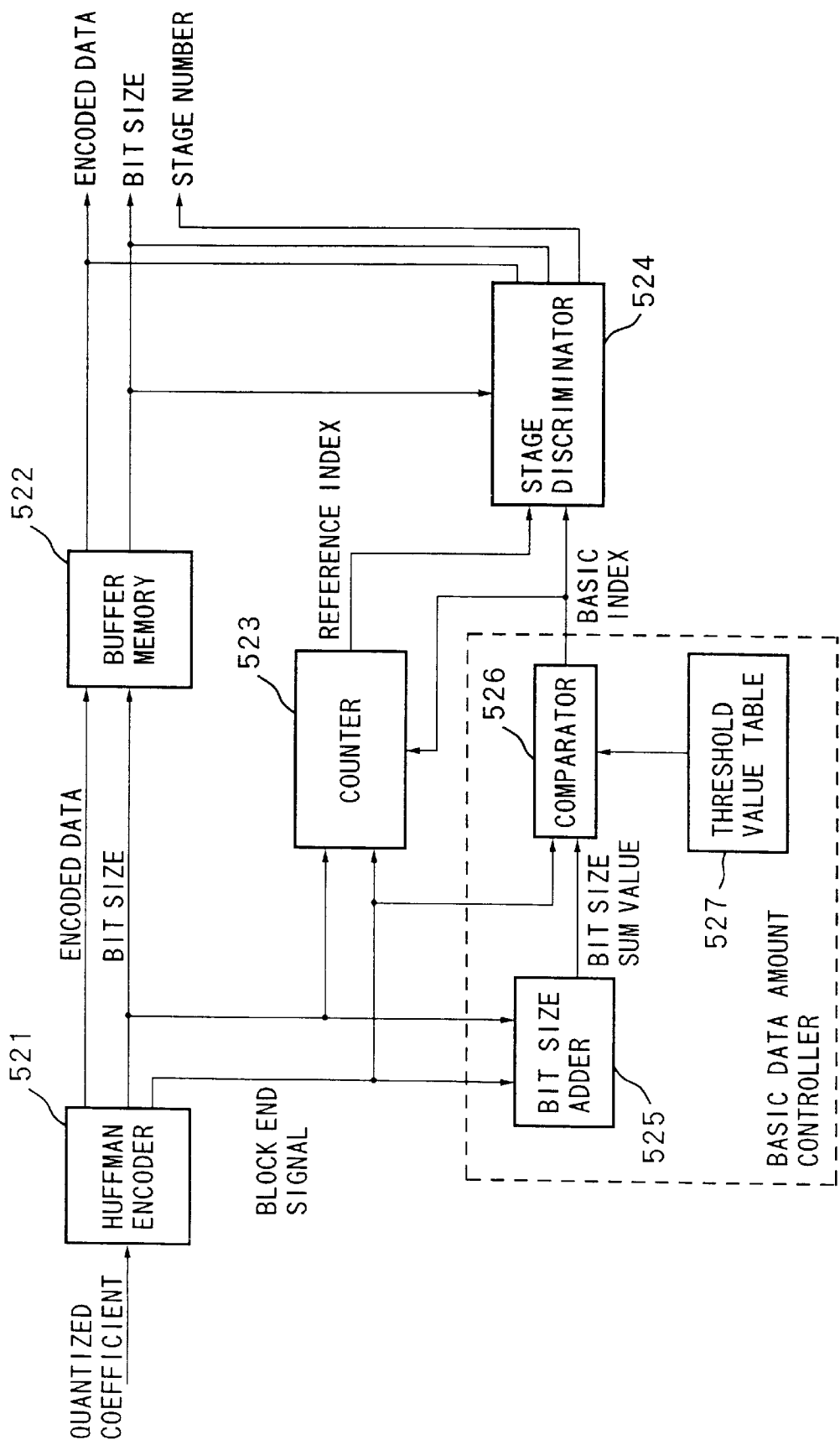
FIG. 57 is a block diagram showing an arrangement of an adaptive Huffman encoding unit according to the sixth embodiment of the present invention.

A case will be described below wherein the first example of an adaptive Huffman encoding unit based on indices shown in FIG. 57 is used as the adaptive Huffman encoding unit 505 shown in FIG. 49.

A Huffman encoder 521 Huffman-encodes one-dimensionally sorted quantized coefficients in units of 64 coefficients (Y, u, and v components of an 8×8 block), and outputs encoded data, bit sizes, and a block end signal indicating the division of a block.

A buffer memory 522 stores these data in the format shown in FIG. 58. Referring to FIG. 58, an index is a serial number of output encoded data in a single block, and the number of effective bits of encoded data is designated by a bit size.

A bit size adder 525 adds bit sizes of AC components in units of blocks in response to the block end signal, and outputs the sum value to a comparator 526.

The comparator 526 compares the sum value with threshold value tables 527 (see FIG. 52) prepared in units of Y, u, and v components. When the sum value exceeds the threshold value, the comparator 526 outputs an index before the sum value exceeds the threshold value as a basic index to a counter 523 and a stage discriminator 524. In the case of FIGS. 52 and 58, since the basic index of Y becomes 3, indices 0 to 3 are written in the first stage.

The counter 523 counts the indices from the input signal of the bit size of the first AC component of an 8×8 block. Upon detection of one block based on the block end signal, the counter 523 calculates a reference index on the basis of the final index and the basic index obtained from the comparator 526, and outputs the reference index to the stage discriminator 524. In the example shown in FIG. 58, since the basic index is 3, and the final index is 18, data written in the second and subsequent stages are indices 4 to 18. Therefore, in order to divide data of index 4 and subsequent indices into three stages, 18−3=15 is divided into three stages, and 8 (=3+5) and 13 (=8+5) are output as the reference indices.

Also, the block end signal from the Huffman encoder 521 resets the bit size adder 525 and the comparator 526.

The stage discriminator 524 counts indices based on the bit size signals supplied from the buffer memory 522, and outputs a stage number on the basis of the count value, the obtained basic index, and the reference indices. Since the basic index is 3, and the reference indices are 8 and 13, the discriminator 524 outputs stage number #1 for data up to index 3 in FIG. 58; stage number #2 for data from indices 4 to 8; stage number #3 for data from indices 9 to 13; and stage number #4 for the following data until this block ends. In this case, when the stage number is changed, an EOS code required in expansion is inserted.

The adaptive Huffman decoding unit 505 for expanding encoded data encoded by the above-mentioned method can be realized by the same method as in the first example.

Seventh Embodiment

Figure 59:
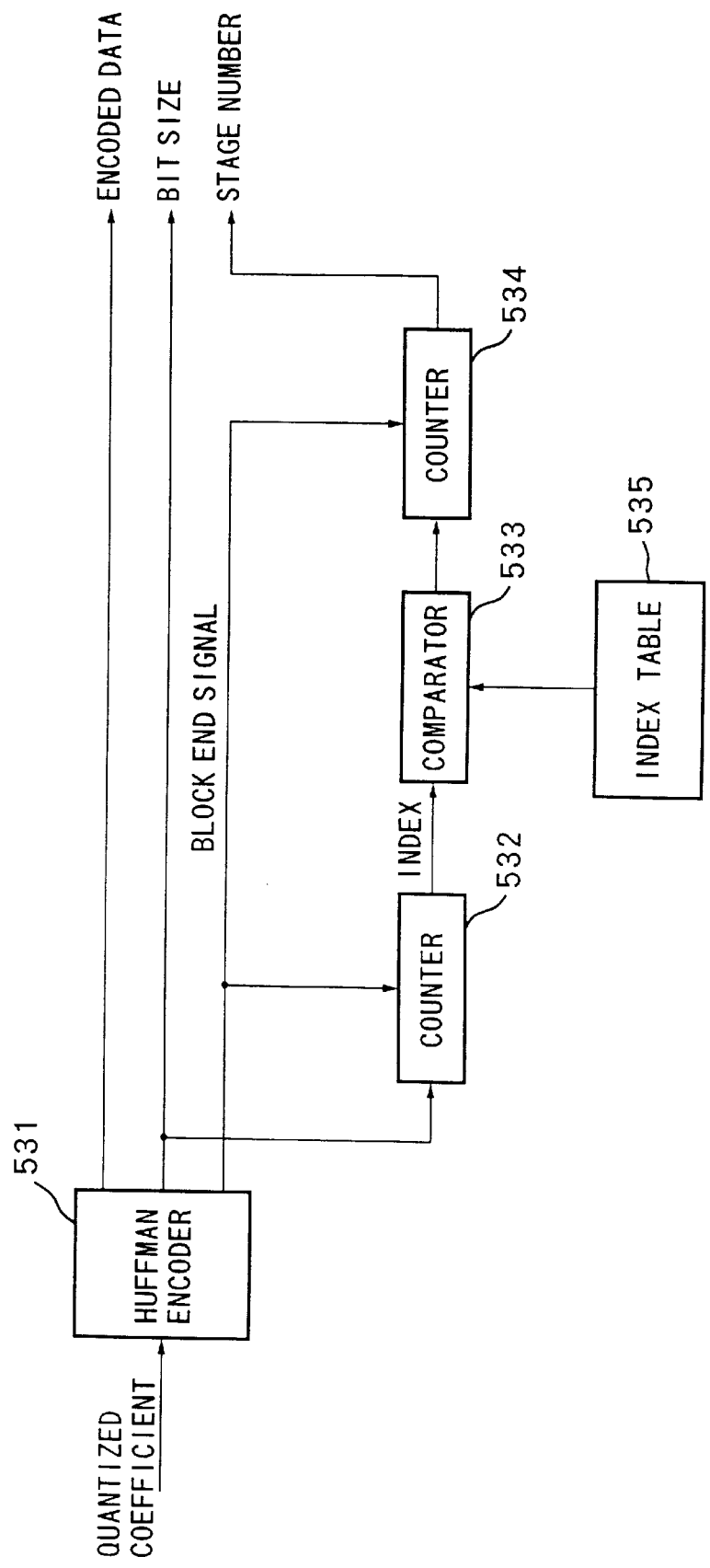
FIG. 59 is a block diagram showing an arrangement of an adaptive Huffman encoding unit according to the seventh embodiment of the present invention.

A case will be described below wherein the second example of an adaptive Huffman encoding unit based on indices shown in FIG. 59 is used as the adaptive Huffman encoding unit 505 shown in FIG. 49.

A Huffman encoder 531 Huffman-encodes one-dimensionally sorted quantized coefficients in units of 64 coefficients (Y, u, and v components of an 8×8 block), and outputs encoded data, bit sizes, and a block end signal indicating the division of a block.

A counter 532 counts bit size signals, and transfers the count result, i.e., an index to a comparator 533.

The comparator 533 compares the transferred index with a value of an index table 535 shown in FIG. 60. When the index value exceeds a table value, the comparator 533 supplies a signal to a counter 534.

The output (stage number) from the counter 534 has an initial value of 1, and the counter 534 increments an output value in response to an input signal. More specifically, the stage number is incremented by one.

In the index table shown in FIG. 60, for an 8×8 block of Y components, the output (stage number) from the counter 534 is 1 up to index 3, the stage number becomes 2 from indices 4 to 8, the stage number becomes 3 from indices 9 to 15, and thereafter, the stage number becomes 4 until the counters 532 and 534 are reset by the block end signal, and the 8×8 block ends.

In order to expand data encoded by this encoding method, the adaptive Huffman decoding unit requests encoded data of stage number #1 to the segment controller 20. The segment controller 20 reads encoded data of the first stage from the compression memory 22 with reference to the content of the segment information table 21, and transfers the read data to the adaptive Huffman decoding unit 505. The adaptive Huffman decoding unit 505 decodes the obtained encoded data, and outputs the next stage number to be requested with reference to the index table. Thereafter, the stage number request and decoding of obtained encoded data are repeated until the number of decoded quantized coefficients becomes 64 (the number of pixels in an 8×8 block). After the 64 quantized coefficients are decoded, the next 8×8 block is decoded.

In the adaptive Huffman decoding unit 505 shown in FIG. 50 or 57, the bit rates are distributed to the respective stages on the basis of bit sizes. As compared to this method, when the method of this embodiment (FIG. 59) is used, the hardware scale can be reduced due to a simple algorithm, and the system can be realized at low cost although precision is slightly impaired. In this method (FIG. 59), no EOS code is needed at the divisions of stages in a single 8×8 block, and the encoded data amount can be reduced accordingly.

Modification of Fifth, Sixth, and Seventh Embodiments

In the fifth, sixth, and seventh embodiments described above, the number of stages to which compressed data are distributed in the ADCT section 14 is 4, but is not particularly limited (e.g., 2, 3, 5, or 6 stages may be used).

In the fifth embodiment, the target bit rate of the entire image is set to be 2.4 [bits/pixel], but is not particularly limited to this value.

In the fifth and sixth embodiments, the target bit rate of the first stage is set to be 1.5 [bits/pixel], and the threshold value shown in FIG. 52 is determined based on this bit rate. However, the present invention is not limited to this value, and any other values may be used. Encoded data of the second and subsequent stages are distributed to be equally divided to three stages. However, the present invention is not limited to this. For example, encoded data may be distributed to the second, third, and fourth stages at any ratio (e.g., 3:2:1, 5:3:1, and the like).

In the seventh embodiment, the index table as a reference for stage distribution shown in FIG. 60 is used. However, the table values are not limited to those shown in FIG. 60.

In the fifth embodiment, when compressed data divided into multiple stages are stored in the compression memory 22 divided into a plurality of segments, the stage is made ineffective in an order from a stage having a larger stage number (stage number #4) to a stage having a smaller stage number (stage number #1). However, the present invention is not limited to this. For example, the stage to be made ineffective may be adaptively selected.

In the fifth embodiment described above, the segment information table shown in FIG. 54 is used. However, the present invention is not limited to this, and various modifications may be made within the spirit and scope of the invention.

Modification of Fourth Embodiment

In the fourth embodiment described above, the present invention is utilized in communications. However, the present invention is not limited to this. For example, the present invention may be utilized in data amount compression to reduce the sizes of, e.g., image files or the memory amount of a copying machine.

In both the encoding and decoding modes, the three FF sections for storing colors are used. However, the number of FF sections is not particularly limited (e.g., four, five, or a hundred FF sections may be used). As the number of FF sections is increased, the number of colors which can be stored can be increased.

When the color of a pixel of interest does not coincide with any color data held in the FF sections, color data (24 bits) is added after code data. In this case, color data of m (m<24) bits may be added, and in this case, the number of bits to be compared in the comparison section may also be m. In this case, although a reversible encoding method is disabled, since a high-frequency image (e.g., a character image) created by a computer does not require many gradation levels, deterioration of image quality is not conspicuous, and a high compression ratio can be achieved.

Furthermore, pallet data may be added after code data in place of color data. In this case, although the compression ratio can be expected to be improved, a device for converting color data into pallet data is additionally required.

Upon combination of reversible compression (CG compression) and ADCT compression with multi-stage storage according to the present invention, a natural image read by an image scanner, and a low-frequency image such as a gradation image having a large number of colors can be ADCT-compressed, and other image portions can be CG-compressed, thereby improving the compression ratio without deteriorating image quality.

According to the present invention, when a pixel of interest has the same value as color data $C_1$ of the immediately preceding pixel, the shortest code '1' is output; when the pixel of interest has a value different from $C_1$ but has the same value as color data $C_2$ of a pixel which appears latest, the second shortest code '01' is output; when the pixel of interest has a value different from $C_1$ and $C_2$ but has the same value as color data $C_3$ of a pixel which appears latest, the third shortest code '001' is output. On the other hand, when the pixel of interest has a value different from $C_1$, $C_2$, and $C_3$, an unused code '000' and color data at that time are output. In this manner, a computer-created image can be reversibly encoded at a high compression ratio without causing conspicuous deterioration of image quality.

The memory amount required at that time is given by (depth of pixel data)×n. When the number n of color data=3, and (depth of pixel data)=24 bits like in the above embodiment, a memory for storing color data need only have a memory amount as small as 72 bits.

Complicated circuits such as a run identification circuit, a Huffman encoding circuit, and the like are not required, and input pixel data can be sequentially processed. Color data to be stored in a memory need not have additional information such as strict positional information, and upper l bits ($1 \leq$depth of pixel data) need only be simply compared with upper l bits of a pixel of interest to output a comparison result. As can be apparent from FIGS. 28 (encoding) and 33 (decoding), a circuit can be realized by a simple arrangement using flip-flops and comparators.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus having first compression means for performing lossless compression on image data, which is suitable to one kind or image, and second compression means for performing lossy compression on image data, which is suitable to a different kind of image, comprising:

allocation means for adaptively allocating a target code amount of object image data to be coded in accordance with a code amount of other image data that has been coded;

estimating means for estimating a code amount of compressed object image data when the object image data is compressed by said first compression means; and selection means for selecting either one of outputs of said first and second compression means as compressed data of the object image data so that a code amount of the compressed data is less than the target code amount, in accordance with the estimated code amount by said estimation means, wherein said selection means preferentially selects the output of said first compression means over the output of said second compression means, the compression performed by said first and second compression means maintains a resolution of the object image data, and when the lossy compression and an expansion have been performed on image data, the one kind of image has a characteristic that deterioration of image quality is conspicuous, and the different kind of image has a characteristic that the deterioration of image quality is not conspicuous.

2. The apparatus according to claim 1, further comprising storing means for exclusively storing a plurality of compressed data respectively compressed by said first and second compression means.

3. The apparatus according to claim 1, wherein said first compression means performs the compression on each pixel of image data, said second compression means performs the compression on each of blocks having plural pixels of image data.

4. An image processing method having a first compression method for performing lossless compression on image data, which is suitable to one kind of image, and a second compression method for performing lossy compression on image data, which is suitable to a different kind of image, comprising the steps of:

adaptively allocating a target code amount of object image data to be coded in accordance with a code amount of other image data that has been coded;

estimating a code amount of compressed object image data when the object image data are compressed by the first compression method; and selecting compressed data of the object image data compressed by the first or second compression method so that a code amount of the compressed data is less than the target code amount, in accordance with the estimated code amount, wherein in said selection step, the compressed data compressed by the first compression method is preferentially selected over the compressed data compressed by the second compression method, the first and second compression methods maintaining a resolution of the object image data, and when the lossy compression and an expansion have been performed on image data, the one kind of image has a characteristic that deterioration of image quality is conspicuous, and the different kind of image has a characteristic that the deterioration of image quality is not conspicuous.

5. An image processing apparatus, comprising:

lossless compression means for performing lossless compression on each pixel of image data;

lossy compression means for performing lossy compression on each of blocks which have plural pixels of image data;

allocation means for adaptively allocating a target code amount of object image data to be coded in accordance with a code amount of other image data that has been coded;

estimation means for estimating a code amount of compressed object image data when the object image data is compressed by said lossless compression means; and selection means for selecting either one of outputs of said lossless and lossy compression means as compressed data of the object image data so that a code amount of the compressed data is less than the target code amount, in accordance with the code amount obtained by said estimation means, wherein said selection means preferentially selects the output of said lossless compression means over the output of said lossy compression means, and the compression performed by said lossless and lossy compression means maintains a resolution of the object image data.

6. The apparatus according to claim 5, further comprising storing means for exclusively storing a plurality of compressed data respectively compressed by said lossless and lossy compression means.

7. The apparatus according to claim 5, wherein the image data comprises color image data having a plurality of color components.

8. An image processing method, comprising the steps of:

performing lossless compression on each pixel of image data;

performing lossy compression on each of blocks having plural pixels of image data;

adaptively allocating a target code amount of object image data to be coded in accordance with a code amount of other image data that has been coded;

estimating a code amount of compressed data of the object image data compressed by the lossless compression; and selecting compressed data of the object image data compressed by the lossless or lossy compression so that a code amount of the compressed data is less than the target code amount, in accordance with the estimated code amount, wherein in said selection step, the compressed data compressed by the lossless compression is preferentially selected over the compressed data compressed by the lossy compression, and the lossless and lossy compression maintains a resolution of the object image data.

9. The apparatus according to claim 1, wherein the one kind of image includes a computer graphic image, and the different kind of image includes at least one of a photographic image and a gradation image.

* * * * *

UNITED STATES PATENT AND TRADEMARK OFFICE
CERTIFICATE OF CORRECTION

PATENT NO. : 6,028,961

DATED : February 22, 2000

INVENTOR(S) : YUKARI SHIMOMURA

It is certified that error appears in the above-identified patent and that said Letters Patent is hereby corrected as shown below:

ON THE TITLE PAGE:

Insert: --[*] Notice: This patent issued on a continued prosecution application filed under 37 CFR 1.53(d), and is subject to the twenty year patent term provisions of 35 U.S.C. 154(a)(2).

[56] References Cited, under FOREIGN PATENT DOCUMENTS

"487282 5/1992 European Pat. Off. ...G06F 15/64" should be deleted;
"075773 4/1987 Japan ...G06F 15/62" should be deleted; and
"276263 12/1991 Japan ...G06F 15/62" should be deleted.

IN THE DRAWINGS:

Sheet 33 of 58, FIG. 35, "LORRESPONDING" should read --CORRESPONDING--.

COLUMN 4:

Line 29, "tech nique" should read --technique--.

COLUMN 8:

Line 41, "accordance" should read --in accordance--.

UNITED STATES PATENT AND TRADEMARK OFFICE
CERTIFICATE OF CORRECTION

PATENT NO.    : 6,028,961
DATED         : February 22, 2000
INVENTOR(S)   : YUKARI SHIMOMURA It is certified that error appears in the above-identified patent and that said Letters Patent is hereby corrected as shown below:

COLUMN 30:

Line 24, ""2a,2b:2d,2e,2f'," should read --"2a,2b:2d,2e,2f",--.

COLUMN 48:

Line 27, "or" should read --of--.

Signed and Sealed this

Twenty-fourth Day of April, 2001

Attest:

NICHOLAS P. GODICI

Attesting Officer     Acting Director of the United States Patent and Trademark Office